(12) United States Patent (10) Patent No.: US 8,774,283 B2
Sunahara et al. (45) Date of Patent: Jul. 8, 2014

(54) INFORMATION PROCESSING DEVICE AND METHOD

(75) Inventors: Sei Sunahara, Tokyo (JP); Atsushi Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 12/442,746

(22) PCT Filed: Mar. 31, 2008

(86) PCT No.: PCT/JP2008/056331
§ 371 (c)(1),
(2), (4) Date: Mar. 25, 2009

(87) PCT Pub. No.: WO2008/123496
PCT Pub. Date: Oct. 16, 2008

(65) Prior Publication Data
US 2010/0027679 A1 Feb. 4, 2010

(30) Foreign Application Priority Data
Mar. 30, 2007 (JP) ................................. 2007-094005

(51) Int. Cl.
*H04N 11/02* (2006.01)
(52) U.S. Cl.
USPC .................................................... 375/240.24
(58) Field of Classification Search
USPC ...................... 375/240.24; 381/106
See application file for complete search history.

(56) References Cited

U.S. PATENT DOCUMENTS

| 5,418,620 | A | 5/1995 | Nishino et al. |
| 5,717,705 | A | 2/1998 | Shikakura et al. |
| 5,778,134 | A * | 7/1998 | Sakai et al. .................. 386/326 |
| 5,880,856 | A | 3/1999 | Ferriere |
| 6,101,284 | A | 8/2000 | Matsubara et al. |
| 6,259,735 | B1 | 7/2001 | Aono et al. |

(Continued)

FOREIGN PATENT DOCUMENTS

| JP | 4 103247 | 4/1992 |
| JP | 4-103247 A | 4/1992 |

(Continued)

OTHER PUBLICATIONS

Sweldens, W. et al., "The Lifting Scheme: A Custom-Design Construction of Biorthogonal Wavelets", Applied and Computational Harmonic Analysis, vol. 3, No. 2, pp. 186-200, (1996).

(Continued)

*Primary Examiner* — Dave Czekaj
*Assistant Examiner* — Leron Beck
(74) *Attorney, Agent, or Firm* — Oblon, Spivak, McClelland, Maier & Neustadt, L.L.P.

(57) ABSTRACT

An information processing apparatus and method for reducing an unnecessary waiting time in a depacketizing process and enabling processing to be easily performed at high speeds applicable to, for example, an encoding apparatus. An analysis unit compares input image data with image data of one previous picture read out from a storage unit. On the basis of the analysis result, a concealment header generation unit generates a concealment header that is referred to by a receiving apparatus at the time of an error concealment process. On the basis of the concealment header, a loss analysis unit performs error concealment for the occurrence of a transmission error by suitably using encoded data stored in a storage unit.

18 Claims, 51 Drawing Sheets

(56) References Cited

U.S. PATENT DOCUMENTS

| | | | |
|---|---|---|---|
| 6,295,624 | B1 | 9/2001 | Gillard |
| 6,456,719 | B1 * | 9/2002 | Yuh .............................. 381/106 |
| 6,707,948 | B1 | 3/2004 | Cosman et al. |
| 6,813,314 | B2 | 11/2004 | Aono et al. |
| 6,847,468 | B2 | 1/2005 | Ferriere |
| 7,031,386 | B2 | 4/2006 | Yamamoto et al. |
| 7,760,719 | B2 * | 7/2010 | Yik et al. ...................... 370/389 |
| 7,808,405 | B1 * | 10/2010 | Chen ................................ 341/65 |
| 2002/0064232 | A1 | 5/2002 | Fukuhara et al. |
| 2003/0001948 | A1 * | 1/2003 | Mochizuki ................ 348/14.01 |
| 2003/0044089 | A1 | 3/2003 | Yamamoto |
| 2004/0062311 | A1 | 4/2004 | Hashino et al. |
| 2004/0141652 | A1 | 7/2004 | Fukuhara et al. |
| 2004/0258163 | A1 * | 12/2004 | Yu et al. ................... 375/240.27 |
| 2007/0009041 | A1 | 1/2007 | Wang |
| 2010/0020886 | A1 * | 1/2010 | Raveendran et al. .... 375/240.27 |

FOREIGN PATENT DOCUMENTS

| | | |
|---|---|---|
| JP | 4 252689 | 9/1992 |
| JP | 4-252689 A | 9/1992 |
| JP | 5 153550 | 6/1993 |
| JP | 6 292179 | 10/1994 |
| JP | 6 311052 | 11/1994 |
| JP | 6-311052 A | 11/1994 |
| JP | 9 130800 | 5/1997 |
| JP | 11 27675 | 1/1999 |
| JP | 11-27675 A | 1/1999 |
| JP | 2962329 | 10/1999 |
| JP | 2000 59781 | 2/2000 |
| JP | 2001 25018 | 1/2001 |
| JP | 2002 165098 | 6/2002 |
| JP | 2002-165098 A | 6/2002 |
| JP | 2002 281507 | 9/2002 |
| JP | 2002-281507 A | 9/2002 |
| JP | 2002 359853 | 12/2002 |
| JP | 2003 69998 | 3/2003 |
| JP | 2003-69998 A | 3/2003 |
| JP | 2004 166254 | 6/2004 |
| JP | 2004 194694 | 7/2004 |
| JP | 2005 12753 | 1/2005 |

OTHER PUBLICATIONS

Chrysafis, C. et al., "Line-Based, Reduced Memory, Wavelet Image Compression", IEEE Transactions on Image Processing, vol. 9, No. 3, pp. 378-389, (2000).

International Search Report filed Jul. 20, 2012 in European App. No. EP 08 73 9445.

Zargari, Farzad et al., "Error Concealment of Damaged LL Sub-band in Motion JPEG 2000," 2005 IEEE International Symposium on Signal Processing and Information Technology, Piscataway, NJ, USA, Dec. 18, 2005, pp. 606-611.

Kang, Li-Wei, et al., "Two Error Resilient Coding Schemes for Wavelet-based Image Transmission Based on Data Embedding and Genetic Algorithms," Journal of Visual Communication and Image Representation, Academic Press, Inc., USA, vol. 17, No. 6, Dec. 1, 2006, pp. 1127-1144.

Kurosaki, Masayuki et al., "Error Correction Using Data Hiding Technique for JPEG2000 Images," Proceedings 2003 International Conference on Image Processing, Barcelona, Spain, Sep. 14, 2003, pp. 473-476.

Office Action issued Jan. 29, 2013, in Japanese Patent Application No. 2009-509248.

Office Action issued on Oct. 29, 2013 in Japanese Patent Application No. 2009-509248.

Office Action issued on Feb. 27, 2014 in Korean Patent Application No. 10-2009-7005749 and its English translation.

* cited by examiner

FIG. 3

| 0LL | 1HL | 2HL | 3HL |
| 1LH | 1HH | | |
| 2LH | 2HH | | |
| 3LH | | 3HH | |

FIG. 4
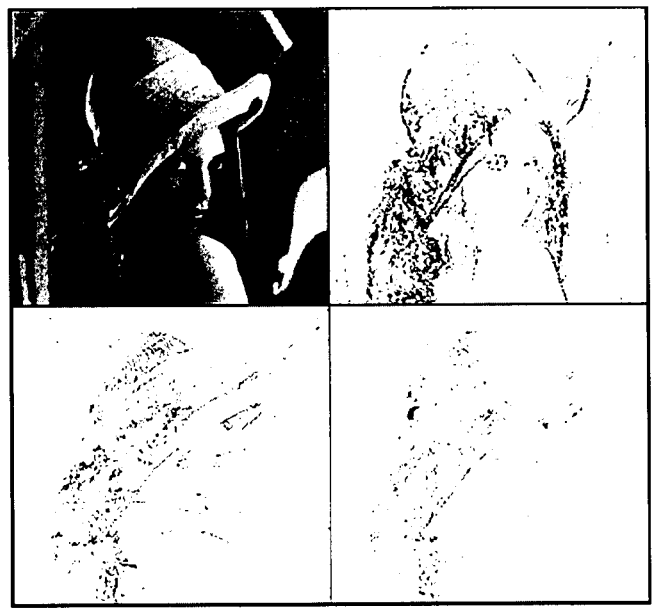
A
SPLITTING LEVEL = 1
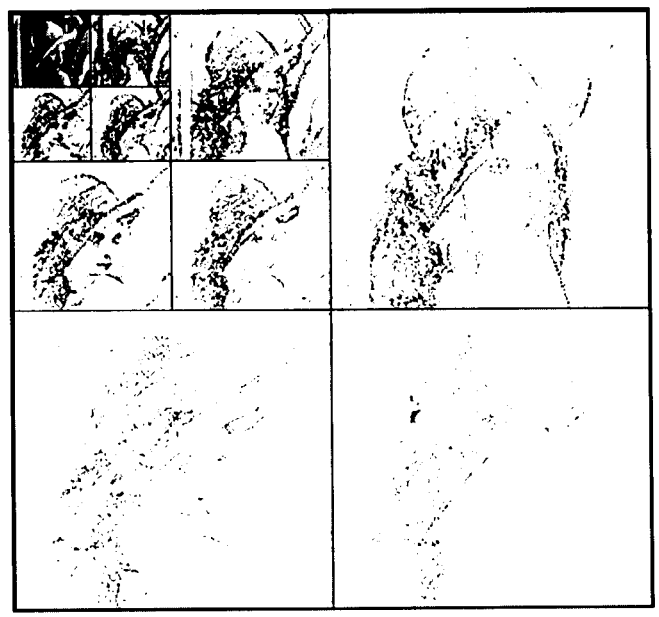
B
SPLITTING LEVEL = 3

| | 31: | 27,26: | 24,23: | 19,18: | 16,15,14,13,12: | 8,7 | 5,4,3 | 2,1,0 |
|---|---|---|---|---|---|---|---|---|
| Word 0 | Reserved | | PI [7:0] | Reserved | W / C_EF / CBD [4:0] | DL | WF | P_DI / SF |
| Word 1 | FR [7:0] | | AR [5:0] | DBSZ [3:0] | Full Time Stamp [45:32] | | | 0 |
| Word 2 | Full Time Stamp [31:0] | | | | | | | 0 |
| Word 3 | V0 Start Position [12:0] | | | SD | H Start Position [12:0] | | | 0 |
| Word 4 | V Total Size [12:0] | | | TSD | H Total Size [12:0] | | | 0 |
| Word 5 | V Size [12:0] | | | VSD | H Size [12:0] | | VF | 0 |
| Word 6 | CTS [15:0] | | | | WT1 [15:0] | | PXCS | |
| Word 7 | WT2 [15:0] | | | | WT3 [15:0] | | BRT | 0 |
| ... | | | | | | | | |
| Word 24 | WT36 [15:0] | | | | WT37 [15:0] | | | |
| Word 25 | WT38 [15:0] | | | | WT39 [15:0] | | | |

| MSB | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
| ET | | | | | FTI | | | | | EXTENDED BY FTI | | | | | | | | | | | | | | | | | | | | | X |

234

B

FTI=00001 (Bayer Info)

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| ET | | | | | FTI | | | | | MT | | | | | SMT | | | | BLF | VL OF | SS F | EV F | DC | | | reserved | | | | | X |
| | | | | | | | | | | | | | | | BL | | | | | | | | | | | | | | | | |
| | | | | | | | | | | | | | | | RBL | | | | | | | | | | | | | | | | |
| | | | | | | | | | | | | | | | RVLO | | | | | | | | | | | | | | | | |
| | | | | | | | | | | | | | | | DSS | | | | | | | | | | | | | | | | |
| | | | | | | | | | | | | | | | NSS | | | | | | | | | | | | | | | | |
| | | | | | | | | | | | | | | | EV | | | | | | | | | | | | | | | | |

| MSB | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| ET | | | | POS | | | | | | | | AT | | | | AID | | | | | | | FF | M | TS/F | NF | FT | | CF | | | IF | X |

{ 431

TS

FIG. 48
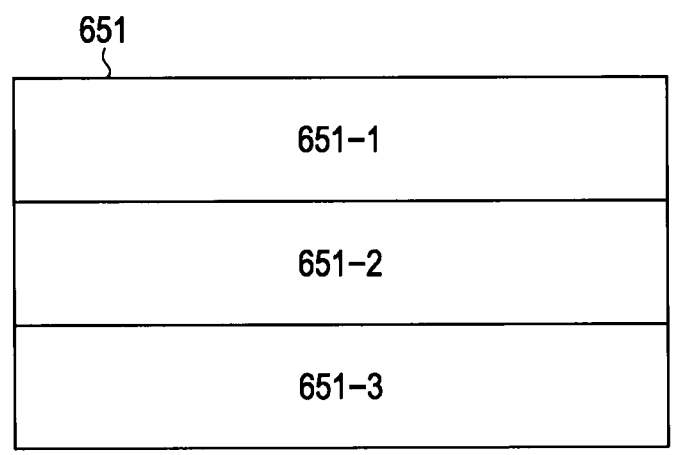
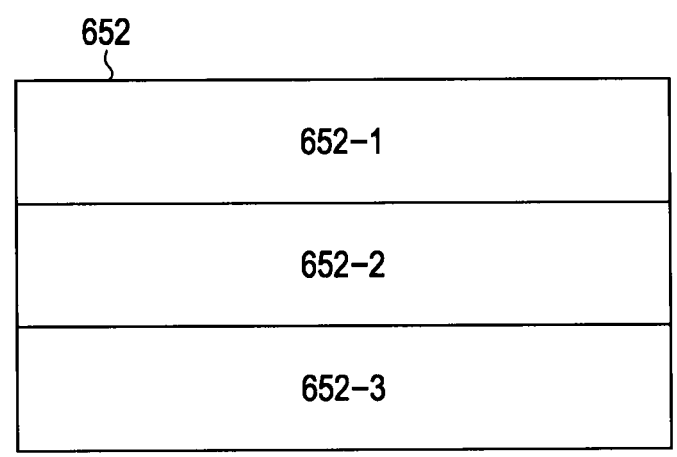
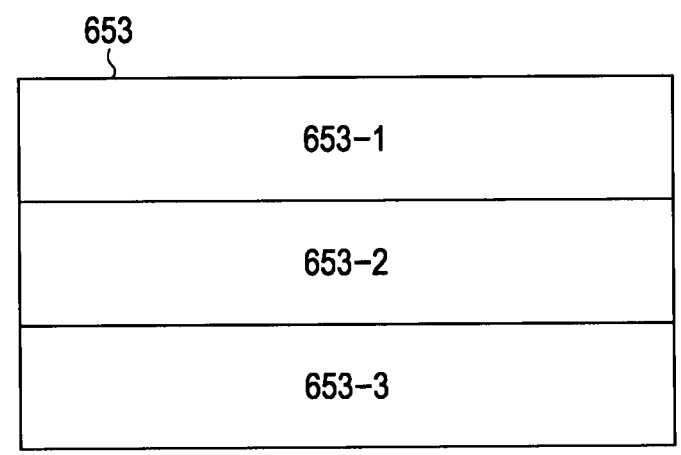

INFORMATION PROCESSING DEVICE AND METHOD

TECHNICAL FIELD

The present invention relates to an information processing apparatus and method, and more particularly, to an information processing apparatus and method which enables reduction of delay at the time of packet transmission/reception.

BACKGROUND ART

Hitherto, it has been demanded to transmit video and audio data with least delay in, for example, communication systems using video and audio, such as bidirectional video conference systems, and in mixed systems with a non-compression environment in broadcasting stations or the like. In recent years in particular, the amount of data has been increasing as the quality of video and audio has been improved, and accordingly, data transmission with further reduced delay has been demanded.

For example, in MPEG (Moving Picture Experts Group) and H.26x compression systems, the compression ratio has been increased based on motion prediction. When motion prediction is performed, the algorithm becomes complicated, and the processing time involved increases in proportion to the square of the frame size. In principle, a coding delay of a few frames occurs. When bidirectional real-time communication is to be performed, the delay time becomes almost an allowable delay time of 250 ms, which is a length that is not negligible.

Also, intraframe codecs represented by JPEG (Joint Photographic Experts Group) 2000 do not use interframe difference information. Thus, the above-described delay does not occur. However, since compression is done on a frame-by-frame basis, the codec must wait at least one frame before the start of encoding. Since current general systems employ 30 frames per second in many cases, a waiting time of about 16 ms is necessary before the start of encoding.

Therefore, it has been demanded to further reduce this delay, and a reduction of delay in portions other than encoding and decoding, such as in a packetizing process and a depacketizing process, has become necessary as well. For example, a method of reducing the capacity of a buffer memory has been conceived to reduce transmission delay (for example, see Patent Citation 1).

Now, it frequently occurs that transmission errors occur in a communication process in digital video communication of transmitting video and audio data and affect the quality of reproduction.

Patent Citation 1: Japanese Unexamined Patent Application Publication No. 2005-12753

DISCLOSURE OF INVENTION

Technical Problem

Measures of some sorts are taken against such transmission errors. In order to further reduce delay in data transmission, a reduction of delay is demanded also in this processing against transmission errors.

The present invention is proposed in view of such conventional circumstances and is to enable reduction of delay time that occurs at the time of sending/receiving data.

Technical Solution

An aspect of the present invention is an information processing apparatus that encodes image data, including: comparison means for comparing frames or fields constituting image data in increments of a line block including image data equivalent to a number of lines needed to generate coefficient data equivalent to one line of sub-bands of at least lowest frequency components; generation means for generating concealment information indicating a method of concealing an error in a line block in accordance with a comparison result obtained by the comparison means; encoding means for generating encoded data by encoding coefficient data reordered in advance in the order in which the coefficient data is used in executing a combining process of combining coefficient data of a plurality of sub-bands decomposed in frequency bands to generate image data; and control means for controlling the encoding means so as to multiplex the concealment information generated by the generation means with the encoded data generated by the encoding means.

The control means may control the encoding means so as to packetize the encoded data with the concealment information being used as a header.

The encoding means may include coefficient encoding means for encoding the coefficient data to generate encoded data; and packetizing means for packetizing the encoded data.

The concealment information may include flag information indicating whether or not a line block constituting a frame or a field is replaceable with a line block constituting another frame or another field.

The comparison means may compare, with respect to the image data, a difference value between frames or a difference value between fields with a threshold.

The generation means may set the flag information to replaceable when the difference value between the frames or the difference value between the fields is less than or equal to the threshold.

The concealment information may include information indicating, when a line block constituting a frame or a field is replaceable with a line block constituting another frame or another field, the extent of previous pictures or fields that can be used for replacement.

The concealment information may include flag information indicating, when a line block constituting a frame or a field is replaceable with a line block constituting another frame or another field, whether or not replacement can be performed using a picture or field subsequent to a picture or field capable of being used for replacement.

The coefficient data may be reordered in order from low frequency components to high frequency components in increments of a line block.

Further, an aspect of the present invention is an information processing method for an information processing apparatus that encodes image data, wherein: comparison means compares frames or fields constituting image data in increments of a line block including image data equivalent to a number of lines needed to generate coefficient data equivalent to one line of sub-bands of at least lowest frequency components; generation means generates concealment information indicating a method of concealing an error in a line block in accordance with a comparison result obtained by the comparison means; encoding means generates encoded data by encoding coefficient data reordered in advance in the order in which the coefficient data is used in executing a combining process of combining coefficient data of a plurality of sub-bands decomposed in frequency bands to generate image data; and control means controls the encoding means so as to multiplex the concealment information generated by the generation means with the encoded data generated by the encoding means.

Another aspect of the present invention is an information processing apparatus that performs an error concealment process on encoded data obtained by encoding image data, including: obtaining means for obtaining, for frames or fields constituting image data, concealment information indicating a method of concealing an error in a line block, in increments of a line block including image data equivalent to a number of lines needed to generate coefficient data equivalent to one line of sub-bands of at least lowest frequency components, from encoded data obtained by encoding coefficient data reordered in advance in the order in which the coefficient data is used in executing a combining process of combining coefficient data of a plurality of sub-bands obtained by decomposing the image data in frequency bands to generate image data; and concealment means for performing, in increments of a line block, a process of concealing an error included in the encoded data in accordance with the method of concealing an error indicated by error concealment information obtained by the obtaining means.

The encoded data may be packetized with the concealment information being used as a header, and the obtaining means may obtain the concealment information as a header.

The information processing apparatus may further include decoding means for decoding the encoded data which has been concealment-processed by the concealment means to generate image data.

The information processing apparatus may further include recording means for recording the encoded data which has been concealment-processed by the concealment means in a recording medium.

Further, another aspect of the present invention is an information processing method for an information processing apparatus that performs an error concealment process on encoded data obtained by encoding image data, wherein: obtaining means obtains, for frames or fields constituting image data, concealment information indicating a method of concealing an error in a line block, in increments of a line block including image data equivalent to a number of lines needed to generate coefficient data equivalent to one line of sub-bands of at least lowest frequency components, from encoded data obtained by encoding coefficient data reordered in advance in the order in which the coefficient data is used in executing a combining process of combining coefficient data of a plurality of sub-bands obtained by decomposing the image data in frequency bands to generate image data; and concealment means performs, in increments of a line block, a process of concealing an error included in the encoded data in accordance with error concealment information indicated by error concealment information obtained by the obtaining means.

According to an aspect of the present invention, frames or fields constituting image data are compared in increments of a line block including image data equivalent to a number of lines needed to generate coefficient data equivalent to one line of sub-bands of at least lowest frequency components; concealment information indicating a method of concealing an error in a line block is generated in accordance with the comparison result; encoded data is generated by encoding coefficient data reordered in advance in the order in which the coefficient data is used in executing a combining process of combining coefficient data of a plurality of sub-bands decomposed in frequency bands to generate image data; and control is performed so as to multiplex the generated concealment information with the encoded data.

According to another aspect of the present invention, for frames or fields constituting image data, concealment information indicating a method of concealing an error in a line block is obtained, in increments of a line block including image data equivalent to a number of lines needed to generate coefficient data equivalent to one line of sub-bands of at least lowest frequency components, from encoded data obtained by encoding coefficient data reordered in advance in the order in which the coefficient data is used in executing a combining process of combining coefficient data of a plurality of sub-bands obtained by decomposing the image data in frequency bands to generate image data; and a process of concealing an error included in the encoded data is performed, in increments of a line block, in accordance with error concealment information indicated by obtained error concealment information.

Advantageous Effects

According to the present invention, data can be sent/received. In particular, a delay time that occurs in data transmission/reception can be reduced.

BRIEF DESCRIPTION OF DRAWINGS

FIG. 3 is an outline diagram for describing the outline of wavelet transform.

FIG. 4 includes outline diagrams for describing the outline of wavelet transform.

FIG. 8 is a diagram showing an exemplary structure of a picture header.

FIG. 18 includes diagrams showing exemplary structures of format information.

FIG. 19 is a diagram showing an exemplary structure of picture information.

FIG. 37 is a diagram showing an exemplary structure of segment information.

FIG. 48 is a schematic diagram showing an exemplary structure of image data to be transmitted.

EXPLANATION OF REFERENCE NUMERALS

100: transmission system, 102: sending apparatus, 103: receiving apparatus, 110: line, 132: depacketizing processing unit, 133: decoding unit, 202: RTP header generation unit, 203: common header generation unit, 204: extension header generation unit, 205: picture information generation unit, 206: flag checking unit, 207: size checking unit, 208: fragment processing unit, 209: packetizing unit, 252: header information analysis unit, 253: control mode changing unit, 254: control unit, 255: header supplying unit, 256: data supplying unit, 257: error notification unit, 258: control signal supplying unit, 351: control information obtaining unit, 352: decoding control unit, 353: decoding processing execution unit, 354: header obtaining unit, 355: data obtaining unit, 356: error notification obtaining unit, 357: discarding processing unit, 602: sending apparatus, 603: receiving apparatus, 621: analysis unit, 622: storage unit, 623: concealment header generation unit, 631: loss analysis unit, 632: storage unit, 640: concealment header, 643: replacement head picture ID, 644: RF, 645: SF, 646: replacement head precinct ID

BEST MODES FOR CARRYING OUT THE INVENTION

Hereinafter, embodiments of the present invention will be described.

Figure 1:
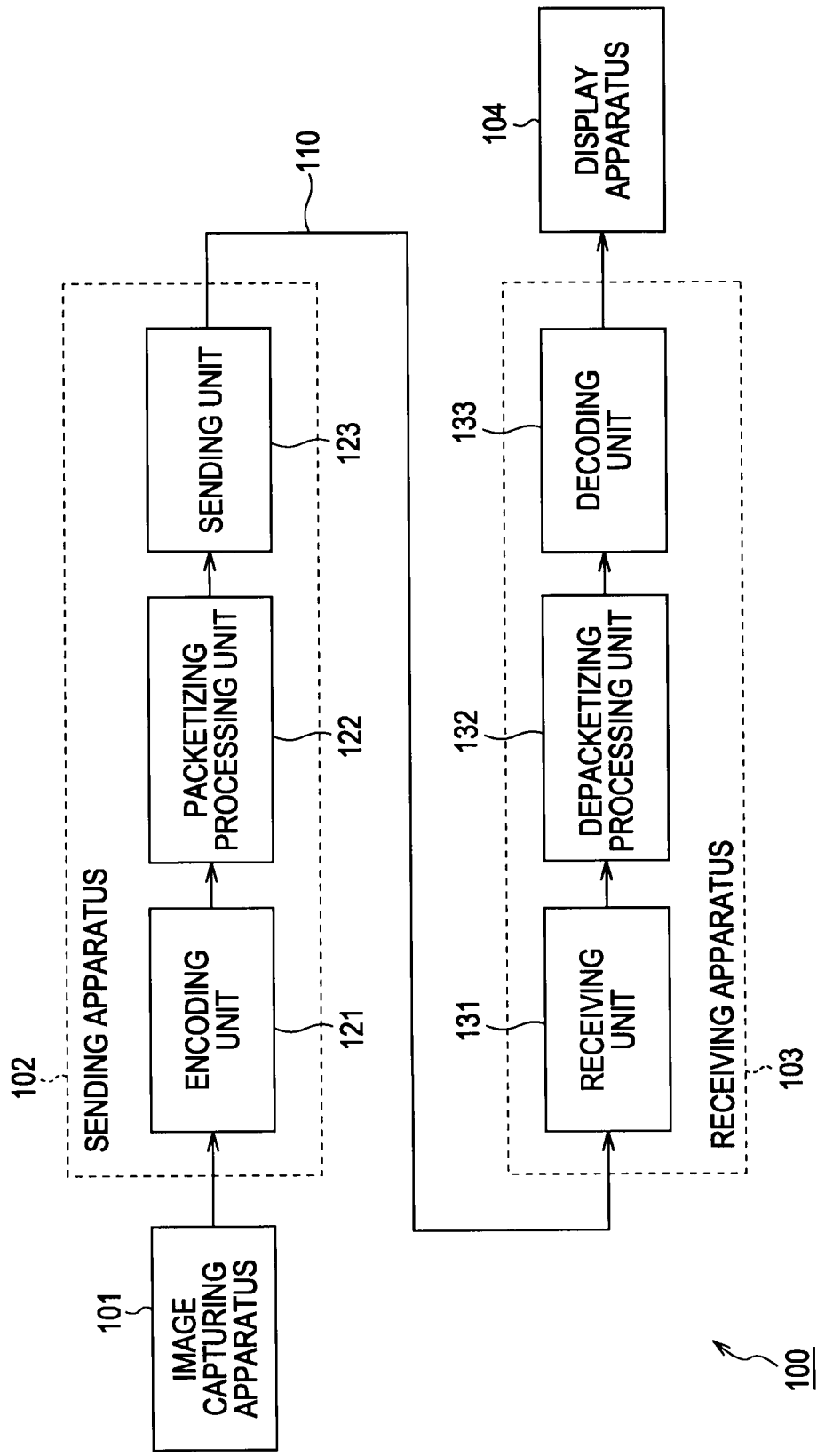
FIG. 1 is a block diagram showing an exemplary configuration of a transmission system to which the present invention is applied.

FIG. 1 is a block diagram showing an exemplary configuration of a transmission system to which the present invention is applied.

In FIG. 1, a transmission system 100 is a data transmission system in which a sending apparatus 102 compresses and encodes image data generated by an image capturing apparatus 101, and packetizes and sends the image data; a receiving apparatus 103 receives the packets transmitted via a line 110, and depacketizes and decodes the packets; and a display apparatus 104 displays an image based on the obtained image data.

The image capturing apparatus 101 has an image pickup device using a CCD (Charge Coupled Device), a CMOS (Complementary Metal Oxide Semiconductor), or the like. The image capturing apparatus 101 captures an image of a subject, converts the captured image into image data which is digital data, and supplies the obtained image data to the sending apparatus 102.

The sending apparatus 102 includes an encoding unit 121, a packetizing processing unit 122, and a sending unit 123. The sending apparatus 102 encodes, at the encoding unit 121, the image data supplied from the image capturing apparatus 101 using a predetermined method; packetizes, at the packetizing processing unit 122, encoded data obtained by the encoding; and sends, at the sending unit 123, generated packets to the line 110 using a predetermined communication method.

The line 110 is an arbitrary transmission medium that connects the sending apparatus 102 and the receiving apparatus 103 and transmits the packets sent from the sending apparatus 102 to the receiving apparatus 103.

The receiving apparatus 103 includes a receiving unit 131, a depacketizing processing unit 132, and a decoding unit 133. The receiving apparatus 103 receives, at the receiving unit 131, the packets transmitted via the line 110; extracts, at the depacketizing processing unit 132, the encoded data from the received packets; decodes, at the decoding unit 133, the extracted encoded data using a decoding method corresponding to the encoding unit 121 in the sending apparatus 102; and outputs the obtained baseband image data to the display apparatus 104.

The display apparatus 104 includes a display and displays, on the display, an image based on the image data supplied from the receiving apparatus 103.

This transmission system 100 in FIG. 1 is a system that can reduce a delay time from when an image is captured by the image capturing apparatus 101 to when the image is displayed on the display apparatus 104 by reducing a delay time due to a packetizing process performed by the packetizing processing unit 122 and a delay time due to a depacketizing process performed by the depacketizing processing unit 132.

In the transmission system 100 in FIG. 1, the image capturing apparatus 101 is shown as an apparatus that provides image data to be sent by the sending apparatus 102. However, this apparatus can be any apparatus as long as it can provide image data. Also, the display apparatus 104 is shown as an apparatus that uses image data received by the receiving apparatus 103. However, this apparatus can be any apparatus as long as it can use image data.

Also, only image data is described as data to be transmitted. However, other data, such as audio data, may be transmitted together with the image data.

A packet sending method performed by the sending apparatus 102 may be unicast which is the sending only to the receiving apparatus 103, multicast which is the sending to a plurality of apparatuses including the receiving apparatus 103, or broadcast which is the sending to many and unspecified apparatuses.

The line 110 can be of any form as long as the line 110 can transmit packets. The line 110 may be wired or wireless, or may include both thereof. Also, although the line 110 in FIG. 1 is shown using one arrow, the line 110 may be a dedicated or general transmission cable, may include one or a plurality of communication networks, such as a LAN (Local Area Network) and the Internet, or may include some sort of communication relay apparatus. Further, the number of lines (the number of channels) of the line 110 can be any number.

Next, the details of individual units of the sending apparatus 102 and the receiving apparatus 103 shown in FIG. 1 will be described.

Figure 2:
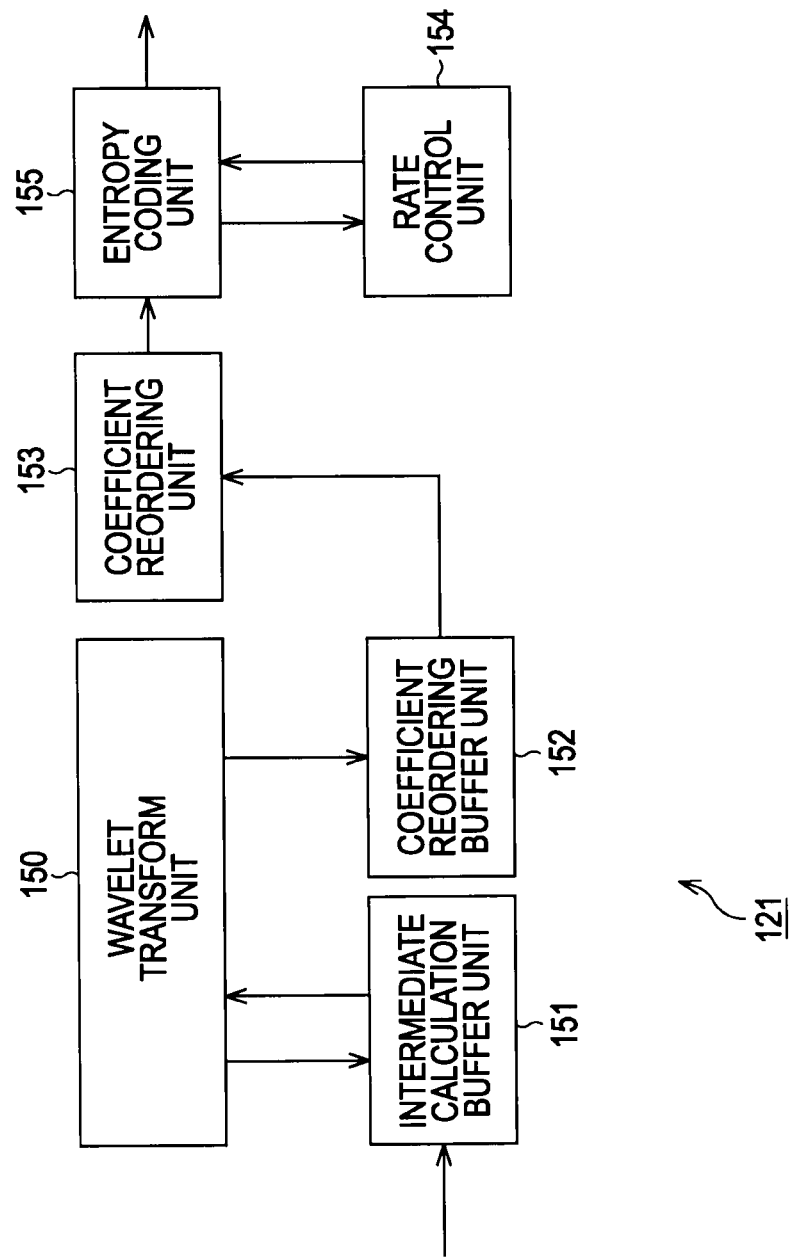
FIG. 2 is a block diagram showing an exemplary structure of an encoding unit in FIG. 1.

FIG. 2 is a block diagram showing an exemplary structure of the interior of the encoding unit 121 in the sending apparatus 102 in FIG. 1. In FIG. 2, the encoding unit 121 includes a wavelet transform unit 150, an intermediate calculation buffer unit 151, a coefficient reordering buffer unit 152, a coefficient reordering unit 153, a rate control unit 154, and an entropy coding unit 155.

Image data input to the encoding unit 121 is temporarily accumulated in the intermediate calculation buffer unit 151. The wavelet transform unit 150 applies wavelet transform to the image data accumulated in the intermediate calculation buffer unit 151. That is, the wavelet transform unit 150 reads out the image data from the intermediate calculation buffer unit 151, applies a filtering process using analysis filters to generate coefficient data of low frequency components and high frequency components, and stores the generated coefficient data in the intermediate calculation buffer unit 151. The wavelet transform unit 150 includes a horizontal analysis filter and a vertical analysis filter and performs an analysis filtering process in both a screen horizontal direction and a screen vertical direction on a group of items of image data. The wavelet transform unit 150 reads out again the coefficient data of the low frequency components, which is stored in the intermediate calculation buffer unit 151, and applies a filtering process using the analysis filters to the read-out coefficient data to further generate coefficient data of high frequency components and low frequency components. The generated coefficient data is stored in the intermediate calculation buffer unit 151.

The wavelet transform unit 150 repeats this process. When a decomposition level reaches a predetermined level, the wavelet transform unit 150 reads out the coefficient data from the intermediate calculation buffer unit 151 and writes the read-out coefficient data into the coefficient reordering buffer unit 152.

The coefficient reordering unit 153 reads out items of coefficient data written in the coefficient reordering buffer unit 152 in a predetermined order and supplies the read-out coefficient data to the entropy coding unit 155. The entropy coding unit 155 performs coding of the supplied coefficient data using a predetermined entropy coding system, such as Huffman coding or arithmetic coding.

The entropy coding unit 155 operates in conjunction with the rate control unit 154. The bit rate of compressed and encoded data to be output is controlled to be a substantially constant value. That is, the rate control unit 154 supplies, on the basis of encoded data information from the entropy coding unit 155, a control signal to the entropy coding unit 155 so as to perform control to terminate an encoding process performed by the entropy coding unit 155 at the point of time at which the bit rate of data compressed and encoded by the entropy coding unit 155 reaches a target value or immediately before the bit rate reaches the target value. The entropy coding unit 155 outputs the encoded data at the point of time at which the encoding process is terminated in response to the control signal supplied from the rate control unit 154.

Note that further improvement of the compression effect can be expected when the entropy coding unit 155 initially performs quantization of coefficient data read out from the coefficient reordering unit 153 and applies an information source coding process, such as Huffman coding or arithmetic coding, to the obtained quantized coefficients. Any method can be used as the quantization method. For example, general means, that is, a technique of dividing coefficient data W by a quantization step size $\Delta$, as indicated by Equation (1) below, may be used:

$$\text{Quantization coefficient} = W/\Delta \tag{1}$$

The quantization step size $\Delta$ on this occasion is calculated in, for example, the rate control unit 154.

The entropy coding unit 155 supplies the encoded data obtained by the encoding to the packetizing processing unit 122.

Figure 3:
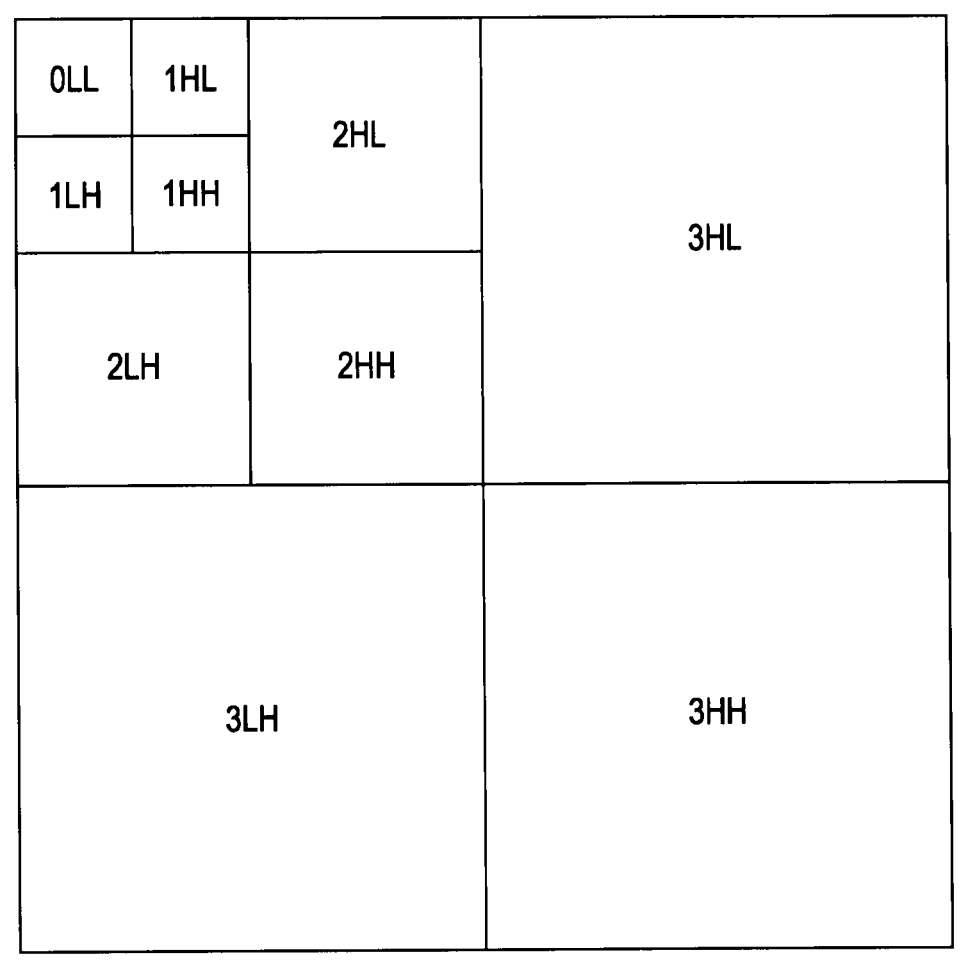

Next, a process performed by the wavelet transform unit 150 in FIG. 2 will be described in more detail. At first, the outline of wavelet transform is described. In the wavelet transform of image data, as schematically shown in FIG. 3, a process of splitting image data into a high spatial frequency band and a low spatial frequency band is recursively repeated on data in the low spatial frequency band, which is obtained as a result of the splitting. Accordingly, efficient compression and coding is enabled by driving data in a low spatial frequency band into a smaller region.

Note that FIG. 3 corresponds to an example in the case where a process of splitting the lowest frequency component region of image data into a region L of low frequency components and a region H of high frequency components is repeated three times, and a decomposition level indicating the total number of split layers is 3. In FIG. 3, "L" and "H" represent low frequency components and high frequency components, respectively. The order of "L" and "H" indicates that the former indicates the band obtained as a result of the splitting in a horizontal direction and the latter indicates the band obtained as a result of the splitting in a vertical direction. Also, a numeral before "L" and "H" indicates the layer of that region. The layer of lower frequency components is represented by a smaller numeral.

Also, as is clear from the example in FIG. 3, processing is performed step by step from the lower right region to the upper left region of a screen, and thereby low frequency components are driven. That is, in the example in FIG. 3, the lower right region of the screen serves as a region 3HH including the smallest number of low frequency components (including the largest number of high frequency components). The upper left region obtained by splitting the screen into four regions is further split into four regions, and, among these four regions, the upper left region is further split into four regions. The region in the upper leftmost corner serves as a region 0LL including the largest number of low frequency components.

The transform and splitting is repeatedly performed on low frequency components since the energy of the image is concentrated in the low frequency components. This can be understood from the fact that, as the decomposition level progresses from a state in which the decomposition level=1, an example of which is shown in A of FIG. 4, to a state in which the decomposition level=3, an example of which is shown in B of FIG. 4, sub-bands are formed, as shown in B of FIG. 4. For example, the splitting decomposition level of wavelet transform in FIG. 3 is 3, and, as a result, ten sub-bands are formed.

The wavelet transform unit 150 usually uses a filter bank constituted of a low frequency filter and a high frequency filter to perform the foregoing process. Note that a digital filter usually has the impulse response of multiple tap lengths, i.e., filter coefficients, and accordingly it is necessary to buffer in advance as many items of input image data or coefficient data as are needed to perform a filtering process. Also, as in the case where wavelet transform is performed in multiple stages, it is necessary to buffer as many wavelet transform coefficients generated at the previous stages as are needed to perform a filtering process.

As a specific example of this wavelet transform, a method using a 5×3 filter will be described. This method of using the 5×3 filter is adopted by the JPEG 2000 standard as well and is an excellent method since it can perform wavelet transform using a small number of filter taps.

The impulse response of the 5×3 filter (Z transform representation) is constituted of, as indicated by Equation (2) and Equation (3) below, a low frequency filter $H_0(z)$ and a high frequency filter $H_1(z)$. From Equation (2) and Equation (3), it is understood that the low frequency filter $H_0(z)$ has five taps, and the high frequency filter $H_1(z)$ has three taps.

$$H_0(z)=(-1+2z^{-1}+6z^{-2}+2z^{-3}-z^{-4})/8 \quad (2)$$

$$H_1(z)=(-1+2z^{-1}-z^{-2})/2 \quad (3)$$

According to these Equation (2) and Equation (3), coefficients of low frequency components and high frequency components can be directly calculated. Here, calculations involved in a filtering process can be reduced by using the lifting technique.

Figure 5:
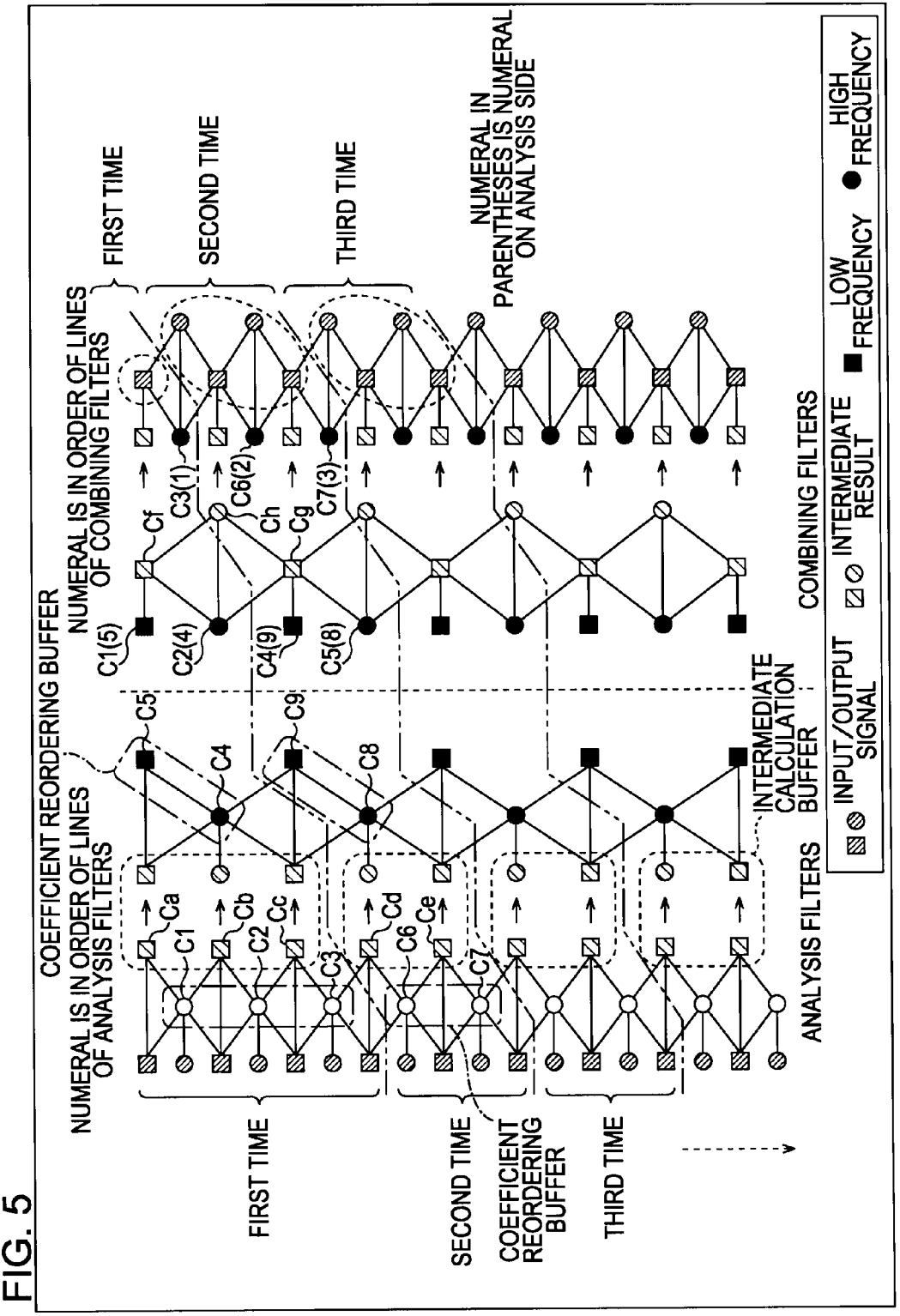
FIG. 5 is an outline diagram showing an example in which filtering based on lifting using a 5×3 filter is executed up to a decomposition level=2.

Next, this wavelet transform method will be more specifically described. FIG. 5 shows an example in which a filtering process based on the lifting using the 5×3 filter is executed up to the decomposition level=2. Note that, in FIG. 5, a portion indicated as analysis filters on the left side of the drawing includes the filters of the wavelet transform unit 150. Also, a portion indicated as combining filters on the right side of the drawing includes filters of an inverse wavelet transform unit in a decoding unit described later.

Note that, in the following description, it is assumed that, for example, in a display device or the like, one line is configured by scanning pixels from the left end to the right end of the screen, with the pixel at the upper left corner of the screen serving as the head, and one screen is configured by performing scanning from the upper end to the lower end of the screen on a line-by-line basis.

In FIG. 5, the leftmost column shows pixel data disposed in corresponding positions on a line of original image data being arrayed in the vertical direction. That is, a filtering process in the wavelet transform unit 150 is performed by vertically scanning pixels on the screen using a vertical filter. The first column through the third column from the left end show a filtering process at the decomposition level=1, and the fourth column through the sixth column show a filtering process at the decomposition level=2. The second column from the left end shows a high frequency component output based on the pixels of the original image data at the left end, and the third column from the left end shows a low frequency component output based on the original image data and the high frequency component output. Regarding the filtering process at the decomposition level=2, as shown in the fourth column through the sixth column from the left end, a process is performed on the output of the filtering process at the decomposition level=1.

In the filtering process at the decomposition level=1, as a filtering process at a first stage, coefficient data of high frequency components is calculated on the basis of the pixels of the original image data; and, as a filtering process at a second stage, coefficient data of low frequency components is calculated on the basis of the coefficient data of high frequency components, which has been calculated in the filtering process at the first stage, and the pixels of the original image data. An exemplary filtering process at the decomposition level=1 is shown in the first column through the third column on the left side (analysis filter side) in FIG. 5. The calculated coefficient data of high frequency components is stored in the coefficient reordering buffer unit 152 in FIG. 2. Also, the calculated coefficient data of low frequency components is stored in the intermediate calculation buffer unit 151 in FIG. 2.

In FIG. 5, the coefficient reordering buffer unit 152 is shown as portions surrounded by dotted-chain lines, and the intermediate calculation buffer unit 151 is shown as portions surrounded by dotted lines.

A filtering process at the decomposition level=2 is performed on the basis of the result of the filtering process at the decomposition level=1, which is held in the intermediate calculation buffer unit 151. In the filtering process at the decomposition level=2, the coefficient data calculated as coefficients of low frequency components in the filtering process at the decomposition level=1 is regarded as coefficient data including low frequency components and high frequency components, and a filtering process similar to that at the decomposition level=1 is performed. Coefficient data of high frequency components and coefficient data of low frequency components calculated in the filtering process at the decomposition level=2 is stored in the coefficient reordering buffer unit 152.

The wavelet transform unit 150 performs a filtering process such as that described above both in the horizontal direction and in the vertical direction of the screen. For example, firstly, the wavelet transform unit 150 performs a filtering process at the decomposition level=1 in the horizontal direction, and stores generated coefficient data of high frequency components and low frequency components in the intermediate calculation buffer unit 151. Next, the wavelet transform unit 150 performs a filtering process at the decomposition level=1 in the vertical direction on the coefficient data stored in the intermediate calculation buffer unit 151. With the processes at the decomposition level=1 in the horizontal and vertical directions, four regions, a region HH and a region HL based on corresponding items of coefficient data obtained by further decomposing the high frequency components into high frequency components and low frequency components, and a region LH and a region LL based on corresponding items of coefficient data obtained by further decomposing the low frequency components into high frequency components and low frequency components, are formed.

Subsequently, at the decomposition level=2, a filtering process is performed both in the horizontal direction and the vertical direction on the coefficient data of low frequency components generated at the decomposition level=1. That is, at the decomposition level=2, the region LL split and formed at the decomposition level=1 is further split into four regions, and a region HH, a region HL, a region LH, and a region LL are further formed in the region LL.

The wavelet transform unit 150 is configured to perform a filtering process based on wavelet transform multiple times in a stepwise manner by splitting the filtering process into processing of each of groups of several lines in the vertical direction of the screen. In the example in FIG. 5, a first process which is a process starting with the first line on the screen performs a filtering process on seven lines. A second process which is a process starting with the eighth line and thereafter performs a filtering process in increments of four lines. This number of lines is based on the number of lines needed to generate the lowest frequency components equivalent to one line after decomposition into high frequency components and low frequency components is performed.

Note that, hereinafter, a group of lines, which includes other sub-bands, needed to generate the lowest frequency components equivalent to one line (coefficient data equivalent to one line of sub-bands of lowest frequency components) will be referred to as a precinct (or line block). The line stated here indicates pixel data or coefficient data equivalent to one line formed in a picture or field corresponding to image data before wavelet transform, or in each sub-band. That is, the precinct (line block) indicates, in the original image data before the wavelet transform, a pixel data group equivalent to the number of lines needed to generate coefficient data equivalent to one line of sub-bands of lowest frequency components after the wavelet transform, or a coefficient data group of each sub-band obtained by performing wavelet transform of this pixel data group.

According to FIG. 5, a coefficient C5 obtained as a result of performing a filtering process at the decomposition level=2 is calculated on the basis of a coefficient C4 and a coefficient $C_a$ that is stored in the intermediate calculation buffer unit 151, and the coefficient C4 is calculated on the basis of the coefficient $C_a$, a coefficient $C_b$, and a coefficient $C_c$ which are stored in the intermediate calculation buffer unit 151. Further, the coefficient $C_c$ is calculated on the basis of a coefficient C2 and a coefficient C3 which are stored in the coefficient reordering buffer unit 152, and pixel data of the fifth line. Also, the coefficient C3 is calculated on the basis of pixel data of the fifth line through the seventh line. Accordingly, in order to obtain the coefficient C5 of low frequency components at the decomposition level=2, pixel data of the first line through the seventh line is needed.

In contrast, in the second filtering process and thereafter, the coefficient data already calculated in the filtering process(es) so far and stored in the coefficient reordering buffer unit 152 can be used, and hence the number of lines needed can be kept small.

That is, according to FIG. 5, among coefficients of low frequency components obtained as a result of a filtering process at the decomposition level=2, a coefficient C9 which is the next coefficient of the coefficient C5 is calculated on the basis of the coefficient C4, a coefficient C8, and the coefficient $C_c$ which is stored in the intermediate calculation buffer unit 151. The coefficient C4 has already been calculated with the above-described first filtering process and stored in the coefficient reordering buffer unit 152. Similarly, the coefficient $C_c$ has already been calculated with the above-described first filtering process and stored in the intermediate calculation buffer unit 151. Accordingly, in this second filtering process, only a filtering process for calculating the coefficient C8 is newly performed.

This new filtering process is performed by further using the eighth line through the eleventh line.

Since the second filtering process and thereafter can use the data calculated with the filtering process(es) so far and stored in the intermediate calculation buffer unit 151 and the coefficient reordering buffer unit 152, all that is needed is each process in increments of four lines.

Note that, when the number of lines on the screen does not match the number of lines for encoding, the lines of the original image data are copied with a predetermined method so that the number of lines becomes identical to the number of lines for encoding, and then a filtering process is performed.

Accordingly, a filtering process for obtaining as many as items of coefficient data equivalent to one line of the lowest frequency components is performed multiple times in a stepwise manner on the lines of the whole screen (on a precinct-by-precinct basis), thereby enabling a decoded image to be obtained with reduced delay when encoded data is transmitted.

In order to perform wavelet transform, a first buffer used to execute the wavelet transform itself and a second buffer for storing coefficients generated while executing the processing up to a predetermined decomposition level are needed. The first buffer corresponds to the intermediate calculation buffer unit 151 and is shown in FIG. 5 by being surrounded by dotted lines. Also, the second buffer corresponds to the coefficient reordering buffer unit 152 and is shown in FIG. 5 by being surrounded by dotted-chain lines. Since the coefficients stored in the second buffer are used at the time of decoding, the coefficients are subjected to an entropy coding process at a subsequent stage.

Next, a process performed by the coefficient reordering unit 153 in FIG. 2 will be described. As has been described above, items of coefficient data calculated at the wavelet transform unit 150 are stored in the coefficient reordering buffer unit 152, of which the order is reordered, read out by the coefficient reordering unit 153, and sent to the entropy coding unit 155 in units of coding units.

As has been already described, in wavelet transform, coefficients are generated from a high frequency component side to a low frequency component side. In the example in FIG. 5, at the first time, a coefficient C1, a coefficient C2, and a coefficient C3 of high frequency components are sequentially generated in a filtering process at the decomposition level 1 on the basis of pixel data of an original image. Subsequently, a filtering process at the decomposition level=2 is performed on coefficient data of low frequency components, which is obtained in the filtering process at the decomposition level=1, and accordingly a coefficient C4 and a coefficient C5 of low frequency components are sequentially generated. That is, at the first time, coefficient data is generated in order of the coefficient C1, the coefficient C2, the coefficient C3, the coefficient C4, and the coefficient C5. The generating order of coefficient data always becomes this order (order from high frequency to low frequency) because of the principle of wavelet transform.

In contrast, on the decoding side, in order to immediately perform decoding with reduced delay, it is necessary to perform generation and output of an image, starting with low frequency components. Therefore, it is desirable to reorder the coefficient data generated on the encoding side from the lowest frequency component side toward the high frequency component side and supply the reordered coefficient data to the decoding side.

Description will be made more specifically using the example in FIG. 5. The right side in FIG. 5 shows a combining filter side for performing inverse wavelet transform. A first combining process including the first line of output image data (inverse wavelet transform process) on the decoding side is performed using the coefficient C4 and coefficient C5 of the lowest frequency components, which are generated in the first filtering process on the encoding side, and the coefficient C1.

That is, in the first combining process, the coefficient data is supplied in order of the coefficient C5, the coefficient C4, and the coefficient C1 from the encoding side to the decoding side, and, on the decoding side, with a process at a combining level=2 which is a combining process corresponding to the decomposition level=2, a combining process is performed on the coefficient C5 and the coefficient C4 to generate a coefficient $C_f$, and the coefficient $C_f$ is stored in the buffer. Subsequently, with a process at the combining level=1 which is a combining process corresponding to the decomposition level=1, a combining process is performed on this coefficient $C_f$ and the coefficient C1 to output the first line.

Thus, in the first combining process, the coefficient data generated in order of the coefficient C1, the coefficient C2, the coefficient C3, the coefficient C4, and the coefficient C5 on the encoding side and stored in the coefficient reordering buffer unit 152 is reordered in order of the coefficient C5, the coefficient C4, the coefficient C1, . . . and supplied to the decoding side.

Note that, in the combining filter side shown on the right side in FIG. 5, for a coefficient supplied from the encoding side, a coefficient numeral on the encoding side is described in parentheses, and the line order of combining filters is described outside the parentheses. For example, a coefficient C1(5) indicates that this is the coefficient C5 on the analysis filter side on the left side in FIG. 5, and is the first line on the combining filter side.

A combining process on the decoding side of the coefficient data generated in a second filtering process and thereafter on the encoding side can be performed using the coefficient data combined at the time of the previous combining process or supplied from the encoding side. In the example in FIG. 5, a second combining process on the decoding side, which is performed using the coefficient C8 and the coefficient C9 of low frequency components, which are generated in the second filtering process on the encoding side, further needs the coefficient C2 and the coefficient C3 generated in the first filtering process on the encoding side, and the second line through the fifth line are decoded.

That is, in the second combining process, the coefficient data is supplied in order of the coefficient C9, the coefficient C8, the coefficient C2, and the coefficient C3 from the encoding side to the decoding side. On the decoding side, in a process at the combining level=2, a coefficient $C_g$ is generated using the coefficient C8 and the coefficient C9, and the coefficient C4 which is supplied from the encoding side at the time of the first combining process, and the coefficient $C_g$ is stored in the buffer. Using this coefficient $C_g$, the above-described coefficient C4, and the coefficient $C_f$ generated in the first combining process and stored in the buffer, a coefficient $C_h$ is generated and stored in the buffer.

Subsequently, in a process at the combining level=1, a combining process is performed using the coefficient $C_g$ and the coefficient $C_h$ generated in the process at the combining level=2 and stored in the buffer, and the coefficient C2 (shown as a coefficient C6(2) at combining filters) and the coefficient C3 (shown as a coefficient C7(3) at combining filters) supplied from the encoding side, and the second line through the fifth line are decoded.

Accordingly, in the second combining process, the coefficient data generated in order of the coefficient C2, the coefficient C3, (the coefficient C4, the coefficient C5), the coefficient C6, the coefficient C7, the coefficient C8, and the coefficient C9 on the encoding side is reordered in order of the coefficient C9, the coefficient C8, the coefficient C2, the coefficient C3, . . . , and supplied to the decoding side.

In a third combining process and thereafter as well, similarly, the coefficient data stored in the coefficient reordering buffer unit 152 is reordered in a predetermined order and supplied to the decoding side, and the lines are decoded four lines at a time.

Note that, in a combining process on the decoding side corresponding to a filtering process including the lower end line of the screen on the encoding side (hereinafter referred to as the last time), the entire coefficient data generated in the processes so far and stored in the buffer is output, and hence, the number of output lines increases. In the example in FIG. 5, eight lines are output at the last time.

Note that a reordering process of coefficient data using the coefficient reordering unit 153 is performed, for example, by setting read-out addresses at the time of reading out the coefficient data stored in the coefficient reordering buffer unit 152 in a predetermined order.

Figure 6:
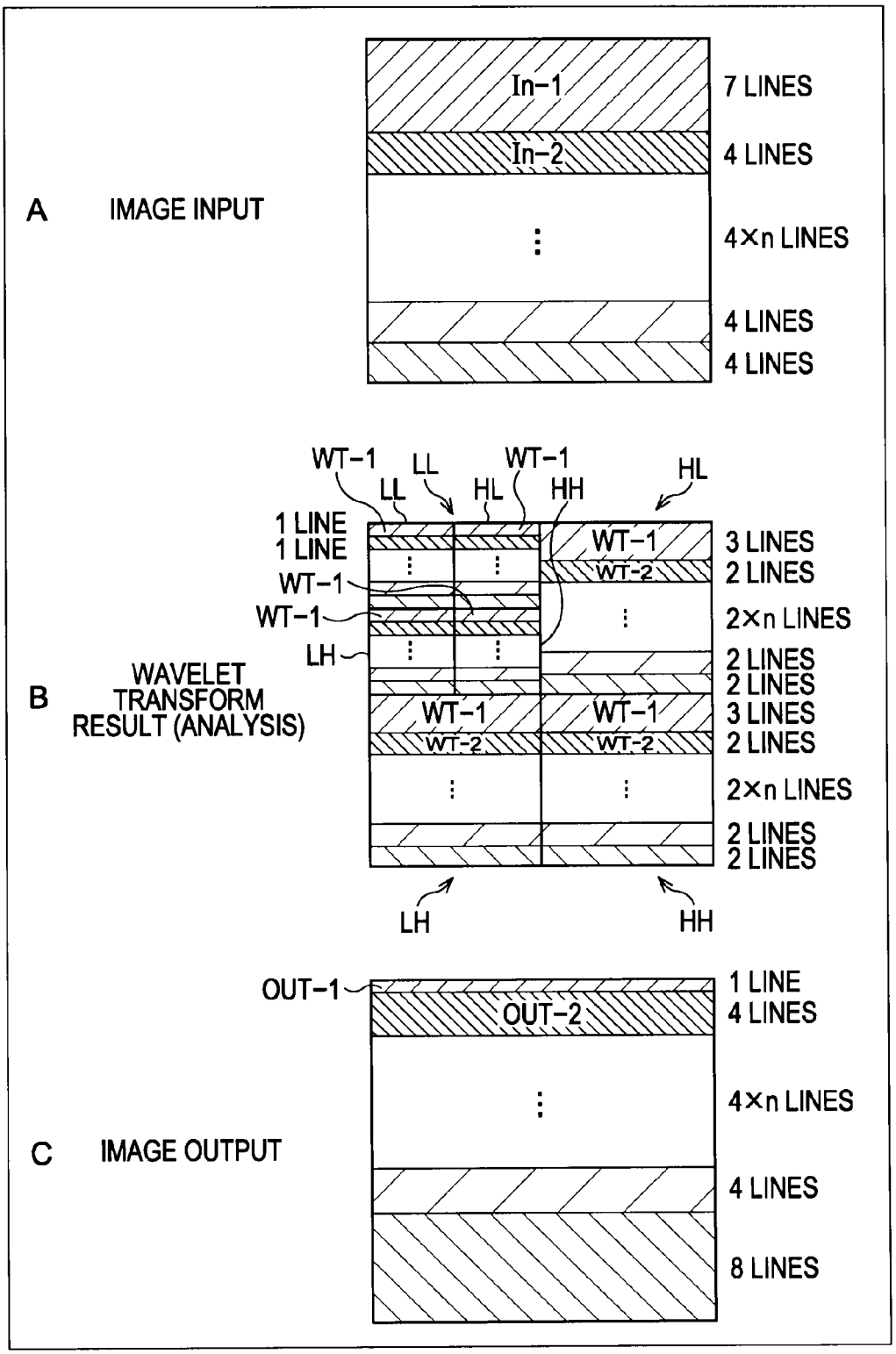
FIG. 6 includes outline diagrams showing the outline of the flow of wavelet transform and inverse wavelet transform according to this invention.

The above-described processes will be described more specifically using FIG. 6. FIG. 6 corresponds to an example in which a filtering process based on wavelet transform is applied up to the decomposition level=2 using a 5×3 filter. In the wavelet transform unit 150, as shown in an example in A of FIG. 6, a first filtering process is performed both in the horizontal and vertical directions on the first line through the seventh line of input image data (In-1 in A of FIG. 6).

In a process at the decomposition level=1 in the first filtering process, items of coefficient data equivalent to three lines, the coefficient C1, the coefficient C2, and the coefficient C3, are generated, and, as shown in an example in B of FIG. 6, are disposed in a region HH, a region HL, and a region LH which are formed at the decomposition level 1, respectively (WT-1 in B of FIG. 6).

Also, a region LL formed at the decomposition level=1 is further split into four regions with a filtering process at the decomposition level=2 in the horizontal and vertical directions. With regard to the coefficient C5 and the coefficient C4 generated at the decomposition level=2, in the region LL at the decomposition level=1, one line based on the coefficient C5 is disposed in the region LL, and one line based on the coefficient C4 is disposed in each of the region HH, the region HL, and the region LH.

In the second filtering process and thereafter using the wavelet transform unit 150, a filtering process is performed in increments of four lines (In-2 . . . in A of FIG. 6). Coefficient data of every two lines is generated at the decomposition level=1 (WT-2 in B of FIG. 6), and coefficient data of every one line is generated at the decomposition level=2.

At the second time in the example in FIG. 5, items of coefficient data equivalent to two lines, the coefficient C6 and the coefficient C7, are generated with a filtering process at the decomposition level=1, and, as shown in an example in B of FIG. 6, are disposed, starting with the next item of the coefficient data generated with the first filtering process, in the region HH, the region HL, and the region LH formed at the decomposition level 1. Similarly, in the region LL based on the decomposition level=1, the coefficient C9 which is equivalent to one line and generated with the filtering process at the decomposition level=2 is disposed in the region LL, and the coefficient C8 equivalent to one line is disposed in each of the region HH, the region HL, and the region LH.

As in B of FIG. 6, when wavelet-transformed data is decoded, as shown in an example in C of FIG. 6, the first line based on the first combining process on the decoding side is output (Out-1 in C of FIG. 6) for the first filtering process based on the first line through the seventh line on the encoding side.

Thereafter, four lines are output at a time on the decoding side (Out-2 . . . in C of FIG. 6) for the second through one before the last filtering processes on the encoding side. Subsequently, eight lines are output on the decoding side for the last filtering process on the encoding side.

Items of coefficient data generated from the high frequency component side to the low frequency component side at the wavelet transform unit 150 are sequentially stored in the coefficient reordering buffer unit 152. When as many items of coefficient data as are needed to enable the above-described reordering of coefficient data are accumulated in the coefficient reordering buffer unit 152, the coefficient reordering unit 153 reorders the items of coefficient data in order of items needed in a combining process and reads out the items of coefficient data from the coefficient reordering buffer unit 152. The read-out items of coefficient data are sequentially supplied to the entropy coding unit 155.

Figure 7:
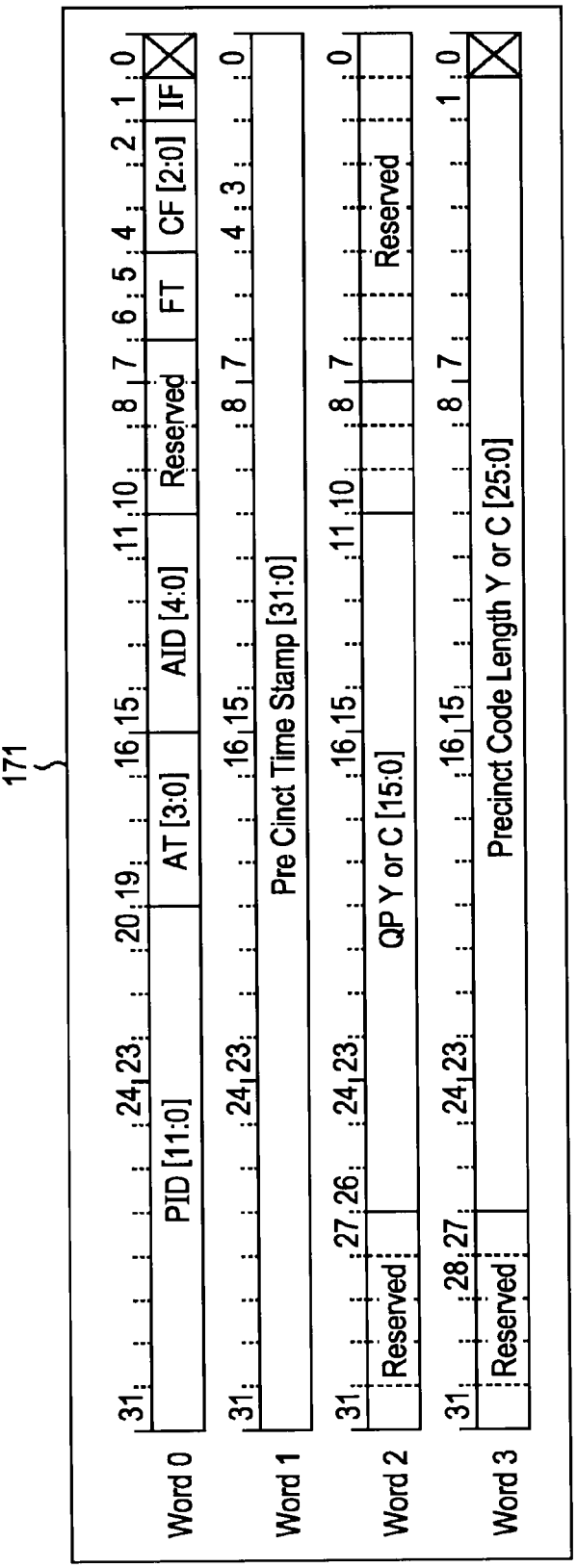
FIG. 7 is a diagram showing an exemplary structure of a precinct header.

Image data encoded on a precinct-by-precinct basis as has been described above (encoded data) is supplied to the packetizing processing unit 122. On that occasion, the entropy coding unit 155 supplies, on a precinct-by-precinct basis, information regarding the image data as header information (precinct header) to the packetizing processing unit 122. FIG. 7 shows an exemplary structure of the precinct header.

As shown in FIG. 7, a precinct header 171 consists of data equivalent to four words (32×4 bits) and includes information such as PID, AT, AID, FT, CF, IF, precinct time stamp, quantization coefficient, and precinct code length.

PID (Precinct ID) is 12-bit information indicating a precinct number counted from the head of a picture. AT (Align Unit Type) is 4-bit information indicating the attribute of an align unit constructed in the precinct. An align unit is encoded data in the precinct, which is split in increments of a predetermined data unit, such as in increments of a coding unit. That is, a precinct is constituted of one or a plurality of align units. AID (Align Unit ID) is 5-bit information indicating an align unit number counted from the head of the precinct. FT (Field Type) is 2-bit flag information indicating which of the field types, progressive or interlace, the picture is. CF (Component Flag) is 3-bit information indicating the fact that, among components including a luma component Y, a chroma component Cb, and a chroma component Cr, a plurality of components are grouped into one align unit or precinct.

IF (Incomplete Flag) is 1-bit flag information indicating that this is an align unit or precinct that failed to be encoded for some reason. The range of this failure is limited to a payload indicated by PID, AT, and AID.

The precinct time stamp (Precinct Time Stamp) is information indicating the least significant 32 bits of a time stamp of the precinct. The quantization coefficient (QP Y or C) is 16-bit information indicating the value of a quantization coefficient used at the time of quantizing the luma component Y or the chroma components C of the precinct. The precinct code length (Precinct Code Length Y or C) is 26-bit information indicating the data length of encoded data of the luma component Y or the chroma components C of the precinct.

Further, the entropy coding unit 155 supplies, on a picture-by-picture basis, information regarding the image data as header information (picture header) to the packetizing processing unit 122. FIG. 8 shows an exemplary structure of the picture header.

As shown in FIG. 8, a picture header 172 consists of data equivalent to 26 words (32×26 bits) and includes information such as PI, w, CEF, CBD, DL, WF, PDI, SF, FR, AR, DBSZ, full time stamp, V0 start position, SD, H start position, VF, V total size, TSD, H total size, PXCS, V size, VSD, H size, BRT, CTS, and WTm.

PI (Profile Indication) is 5-bit information that performs specification of a profile. w is 1-bit flag information indicating whether or not to include a weighting table, which is table information for setting a custom value of a weighting coefficient, in a packet. CEF (Color Extension Flag) is 1-bit flag information indicating whether or not to use an extension header of color information. CBD (Component Bit Depth) is 5-bit information indicating the bit depth of a component. A value obtained by subtracting "8" from a pre-specified value is stored. DL (DWT Level) is 3-bit information indicating a splitting number (decomposition level) of wavelet transform. WF (Wavelet Filter) is 2-bit information indicating the type of filter used in wavelet transform. PDI (Picture Discontinuity Indication) is 1-bit information indicating continuity of a time stamp. SF (Sampling Format) is 2-bit information indicating a chroma sampling method.

FR (Frame Rate) is 1-bit information indicating a frame rate. AR (Aspect Ratio) is 6-bit information indicating a pixel aspect ratio. DBSZ (Decoder Buffer Size) is 4-bit information indicating a precinct buffer size at a decoder. The full time stamp (FTS) is 46-bit information indicating a full-size time stamp.

The V0 start position (FFVS (First Field Vertical Start)) is 13-bit information indicating a valid pixel start position in the vertical direction in the head field. SD (Start Diff) is 2-bit information indicating a difference between FFVS and the second field. The H start position (HS (Horizontal Start)) is 13-bit information indicating a valid pixel start position in the horizontal direction. VF (Video Format) is 4-bit information indicating the video format of a compressed signal.

The V total size (FFVTS (First Field Vertical Total Size)) is 13-bit information indicating the total number of pixels including a blank in the head field. TSD (Total Size Diff) is 2-bit information indicating a difference between FFVTS and the second field. The H total size (HTS (Horizontal Total Size)) is 13-bit information indicating the total number of pixels including a blank in the horizontal direction. PXCS (Pixel Clock Scale) is 3-bit information indicating a clock scaling factor.

The V size (FFVVS (First Field Vertical Valid Size)) is 13-bit information indicating a valid pixel size in the vertical direction in the head field. VSD (Valid Size Diff) is 2-bit information indicating a difference between FFVVS and the second field. The H size (HVS (Horizontal Valid Size)) is 13-bit information indicating a valid pixel size in the horizontal direction. BRT (B Value Reset Timing) is 2-bit information indicating a timing for resetting a B value.

CTS (Custom Table Size) is 16-bit information indicating the size of a custom table. As many subsequent custom values as the number of specified values exist, and the size thereof is CTS×2 bytes. WTm (Weighting Table m) is 16×m-bit information indicating an m-th weighting table.

Figure 9:
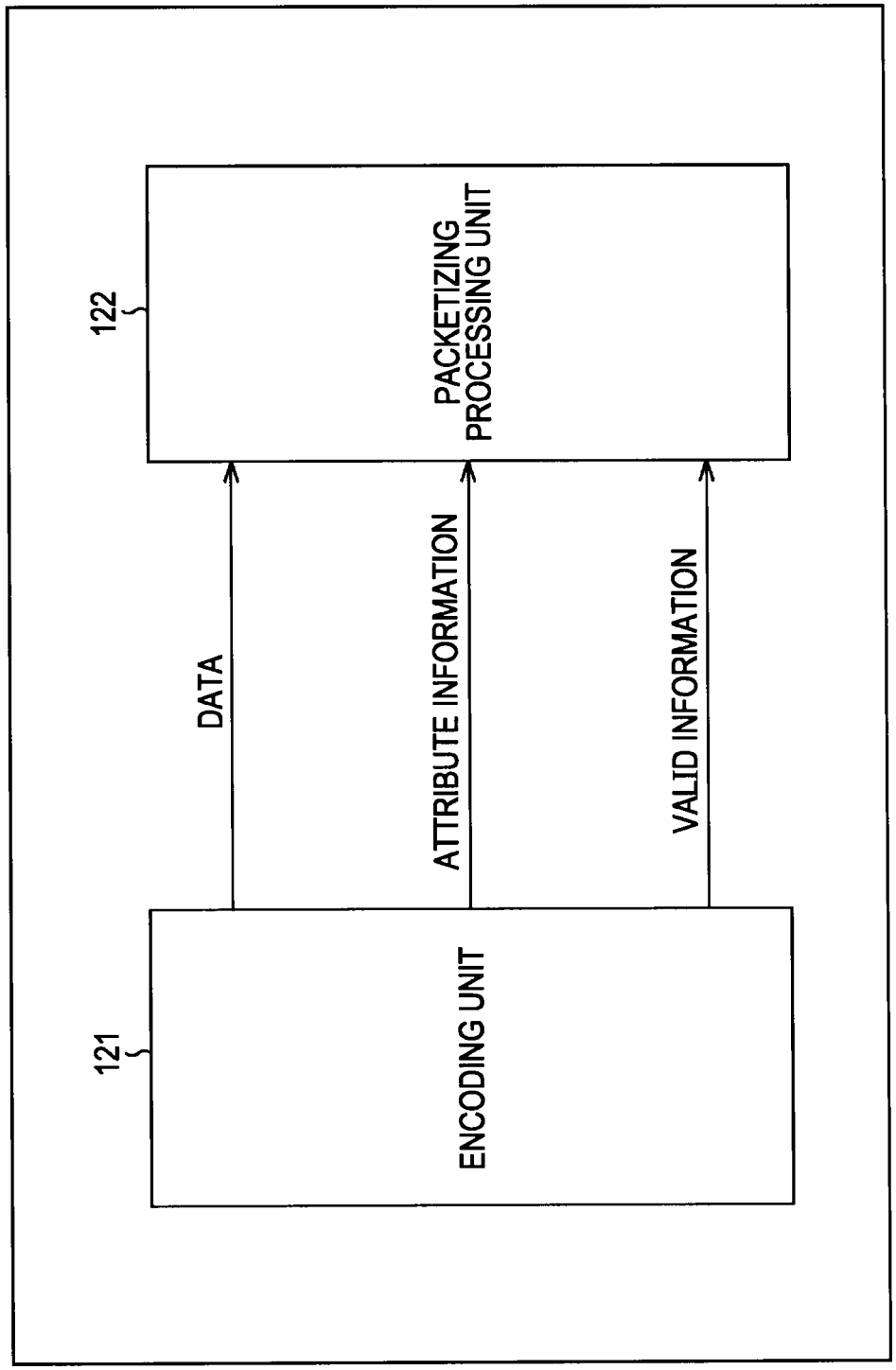
FIG. 9 is a diagram showing an example of information exchanged between the encoding unit and a packetizing processing unit.

Note that, actually, as shown in FIG. 9, attribute information, VALID information, and the like are supplied, besides data, from the encoding unit 121 to the packetizing processing unit 122. The attribute information is information indicating whether the supplied data is a header or image data or indicating whether the supplied data is data of a luma component or data of chroma components. The VALID information is information giving a notification of a data reading timing.

The packetizing processing unit 122 performs a packetizing process of encoded data supplied in increments of a predetermined data unit (precinct) on the basis of the size of that data and a packet size specified separately.

Figure 10:
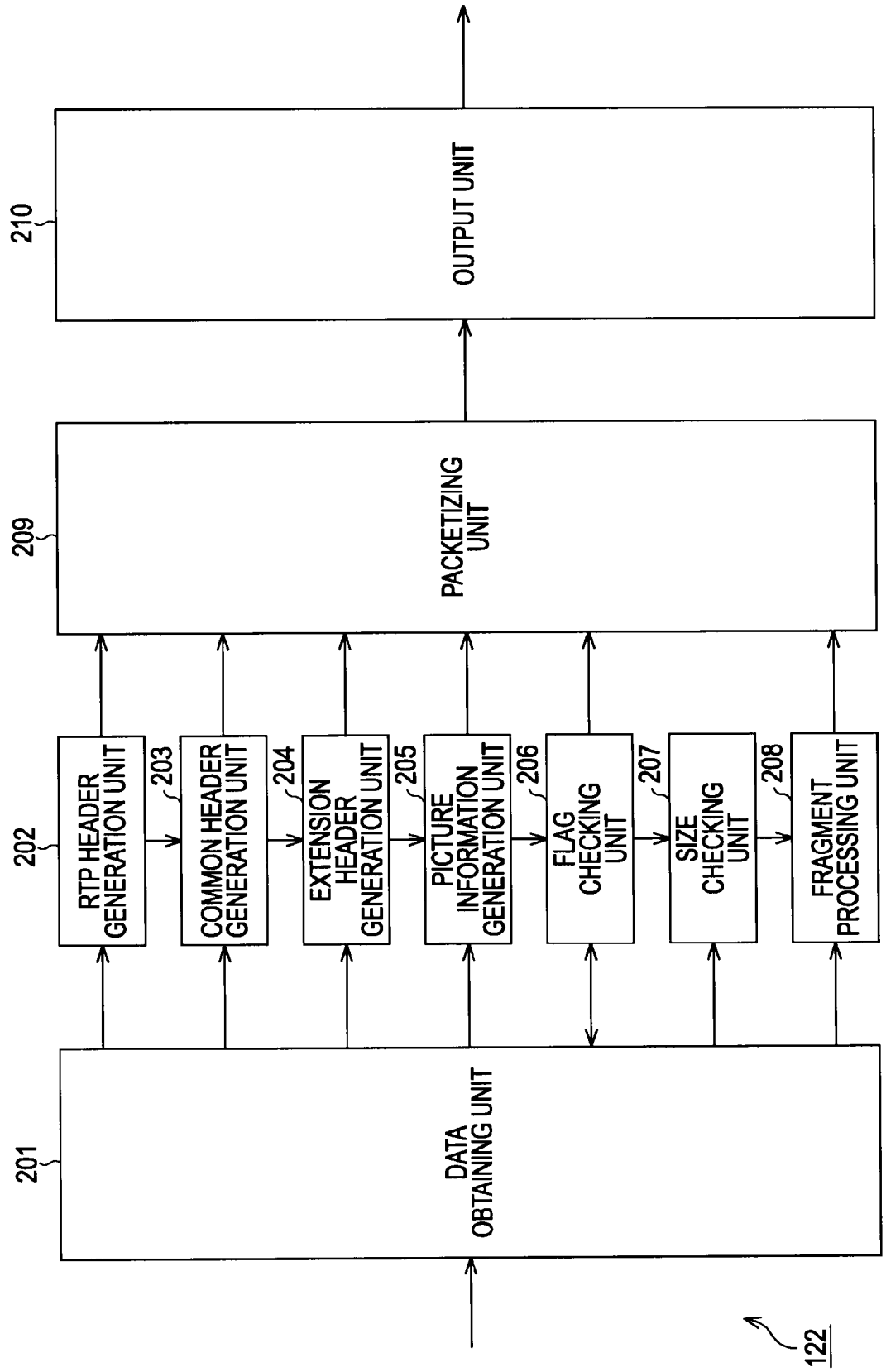
FIG. 10 is a block diagram showing a detailed exemplary structure of the packetizing processing unit in FIG. 1.

FIG. 10 is a block diagram showing an exemplary structure of the interior of the packetizing processing unit 122 in FIG. 1.

In FIG. 10, the packetizing processing unit 122 includes a data obtaining unit 201, an RTP (Real-time Transport Protocol) header generation unit 202, a common header generation unit 203, an extension header generation unit 204, a picture information generation unit 205, a flag checking unit 206, a size checking unit 207, a fragment processing unit 208, a packetizing unit 209, and an output unit 210.

The data obtaining unit 201 obtains encoded data, packets, and the like supplied from the encoding unit 121, on the basis of attribute information, VALID information, and the like supplied together with the data. For example, when the precinct header 171 is obtained, the data obtaining unit 201 supplies this to the RTP header generation unit 202, the common header generation unit 203, the extension header generation unit 204, the flag checking unit 206, and the size checking unit 207. Also, for example, when the picture header 172 is obtained, the data obtaining unit 201 supplies this to the picture information generation unit 205. Further, for example, when encoded data is obtained, the data obtaining unit 201 supplies this to the fragment processing unit 208.

When the data obtaining unit 201 obtains a precinct header, the RTP header generation unit 202 generates, on the basis of the obtained precinct header, an RTP header which is a header of an RTP packet. The details of the RTP header will be described later. The RTP header generation unit 202 supplies the generated RTP header to the packetizing unit 209 and gives a notification of processing termination to the common header generation unit 203.

Upon receipt of the notification from the RTP header generation unit 202, the common header generation unit 203 generates, on the basis of the precinct header 171 obtained by the data obtaining unit 201, a common header which is a common header added to each packet generated from the precinct. The common header includes basic information regarding the precinct. The details of the common header will be described later. The common header generation unit 203 supplies the generated common header to the packetizing unit 209 and gives a notification of processing termination to the extension header generation unit 204.

Upon receipt of the notification from the common header generation unit 203, the extension header generation unit 204 generates, on the basis of the precinct header 171 obtained by the data obtaining unit 201, information of an extension header that adds, according to need, information that relates to the precinct and that is not included in the common header. With the generation of this extension header, a sender can perform flexible and efficient header generation. Although the content of information in the extension header is arbitrary, the content includes, for example, information regarding a quantization coefficient and information regarding a size. The details of the extension header will be described later. The extension header generation unit 204 supplies the generated extension header to the packetizing unit 209 and gives a notification of processing termination to the picture information generation unit 205.

Upon receipt of the notification from the extension header generation unit 204, when the data obtaining unit 201 obtains the picture header 172, the picture information generation unit 205 generates, on the basis of the picture header 172, picture information including information regarding the picture. The details of the picture information will be described later. The picture information generation unit 205 supplies the generated picture information to the packetizing unit 209, causes the picture information to be inserted into the extension header, and gives a notification of processing termination to the flag checking unit 206. Note that, when the data obtaining unit 201 obtains no picture header 172, the picture information generation unit 205 does not generate picture information and gives a notification of processing termination to the flag checking unit 206.

Upon receipt of the notification from the picture information generation unit 205, the flag checking unit 206 refers to IF included in the precinct header 171 obtained by the data obtaining unit 201 and, according to the value of the flag, determines whether or not to include encoded data in a packet. For example, when "IF=1", the flag checking unit 206 determines that the encoding of data in the precinct failed and causes the data obtaining unit 201 to discard (not obtain) the undecodable encoded data. Further, the flag checking unit 206 controls the packetizing unit 209 to packetize only the header information (not including the payload). Alternatively, for example, when "IF=0", the flag checking unit 206 determines that the encoding of the precinct was successful, causes the packetizing unit 209 to packetize the data including the payload, and gives a notification of processing termination to the size checking unit 207.

Upon receipt of the notification from the flag checking unit 206, the size checking unit 207 checks, on the basis of the precinct code length included in the precinct header obtained by the data obtaining unit 201, whether or not the data size of the precinct is greater than a packet size which is separately set in advance (the maximum value of a data size of the payload included in one packet). For example, when the data size of the precinct is greater than the packet size, the size checking unit 207 controls the fragment processing unit 208 to split the encoded data obtained by the data obtaining unit 201 in increments of a packet size. Conversely, for example, when the data size of the precinct is not greater than the packet size, the size checking unit 207 controls the fragment processing unit 208 not to split the encoded data obtained by the data obtaining unit 201.

When the data size of the precinct is greater than the packet size, under control of the size checking unit 207, the fragment processing unit 208 splits the encoded data obtained by the data obtaining unit 201 in increments of a packet size and supplies the split data to the packetizing unit 209. That is, in this case, every time the data obtaining unit 201 obtains encoded data equivalent to one packet size, taking into consideration the header portion, the fragment processing unit 208 supplies the encoded data equivalent to one packet size as one payload to the packetizing unit 209.

Conversely, when the data size of the precinct is not greater than the packet size, under control of the size checking unit 207, the fragment processing unit 208 supplies the encoded data obtained by the data obtaining unit 201 as it is to the packetizing unit 209. That is, in this case, the fragment processing unit 208 supplies the encoded data obtained by the data obtaining unit 201, which is equivalent to one precinct, as one payload to the packetizing unit 209.

Using the header information supplied from each unit, the packetizing unit 209 packetizes a payload(s) supplied from the fragment processing unit 208. For example, when the encoded data of one precinct is split by the fragment processing unit 208 into a plurality of payloads, the packetizing unit 209 adds respective items of necessary header information to the individual payloads and packetizes them individually. Alternatively, for example, when the fragment processing unit 208 does not split the encoded data, the packetizing unit 209 adds necessary header information to one payload supplied from the fragment processing unit 208 and packetizes the payload with the header information. Further, for example, when the flag checking unit 206 gives an instruction not to include the payload in a packet, the packetizing unit 209 performs, in response to the instruction, packetization of only the header information.

Also, the packetizing unit 209 suitably sets the values of items of flag information such as SFF and M included in the common header of generated individual packets. SFF (Start Fragment Flag) is flag information indicating whether or not the packet is a packet (head packet) including a head portion of the precinct. M (Marker) is flag information indicating whether or not the packet is a packet (tail packet) including an end portion of the precinct. These items of flag information are referred to at the time of a depacketizing process performed by the depacketizing processing unit 132.

For example, when the fragment processing unit 208 splits the encoded data, the packetizing unit 209 sets, in a payload group generated by splitting the encoded data of one precinct, SSF of the packet of the head payload to 1 and sets M of the packet of the last payload to 1.

Alternatively, for example, when the fragment processing unit 208 does not split the encoded data, the packetizing unit 209 sets each of SSF and M of the one generated packet to 1.

Accordingly, by setting the flag information such as SFF and M in this manner, the depacketizing processing unit 132 can easily figure out whether the packet is the head packet or the tail packet of the precinct or a packet other than these packets simply by referring to the flag information. Therefore, the depacketizing processing unit can reduce a waiting time, as will be described later, and can reduce a delay time due to a depacketizing process.

The packetizing unit 209 supplies the generated packet(s) to the output unit 210.

The output unit 210 supplies an RTP packet supplied from the packetizing unit 209 to the sending unit 123 (FIG. 1) and causes the sending unit 123 to send it to the receiving apparatus 103 (FIG. 1).

Figure 11:
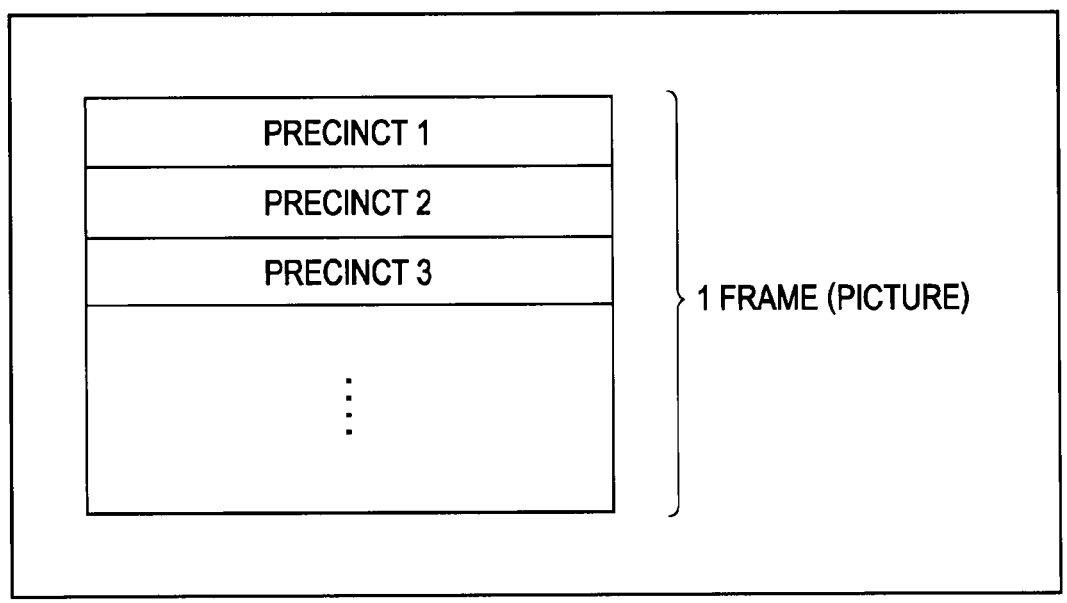
FIG. 11 is a schematic diagram for describing an example of a precinct.

As has been described above, the encoding unit 121 splits, as shown in FIG. 11, one picture (frame or field) into a plurality of precincts and performs encoding of the individual precincts.

Figure 12:
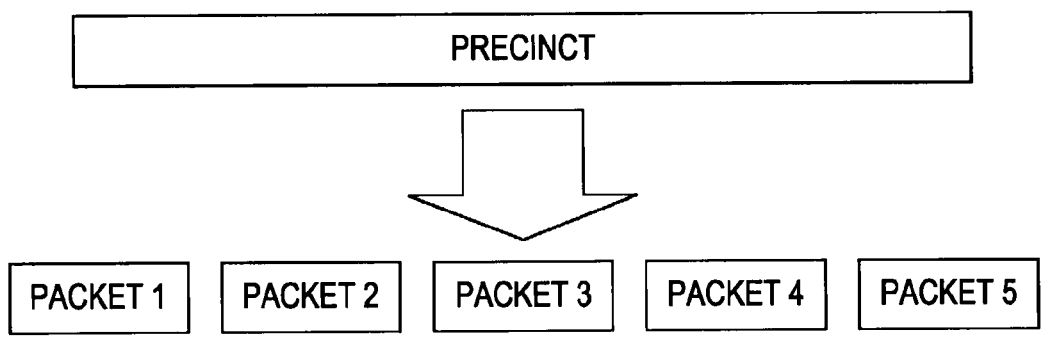
FIG. 12 is a schematic diagram for describing exemplary generation of packets.

The packetizing processing unit 122 packetizes, as shown in FIG. 12, encoded data of one precinct by splitting the encoded data in increments of a predetermined packet size. One packet is generated when the data size of the precinct is not greater than the packet size. In the example in FIG. 12, five packets are generated from encoded data of one precinct.

An exemplary transmission format of image data is illustrated below.

Figure 13:
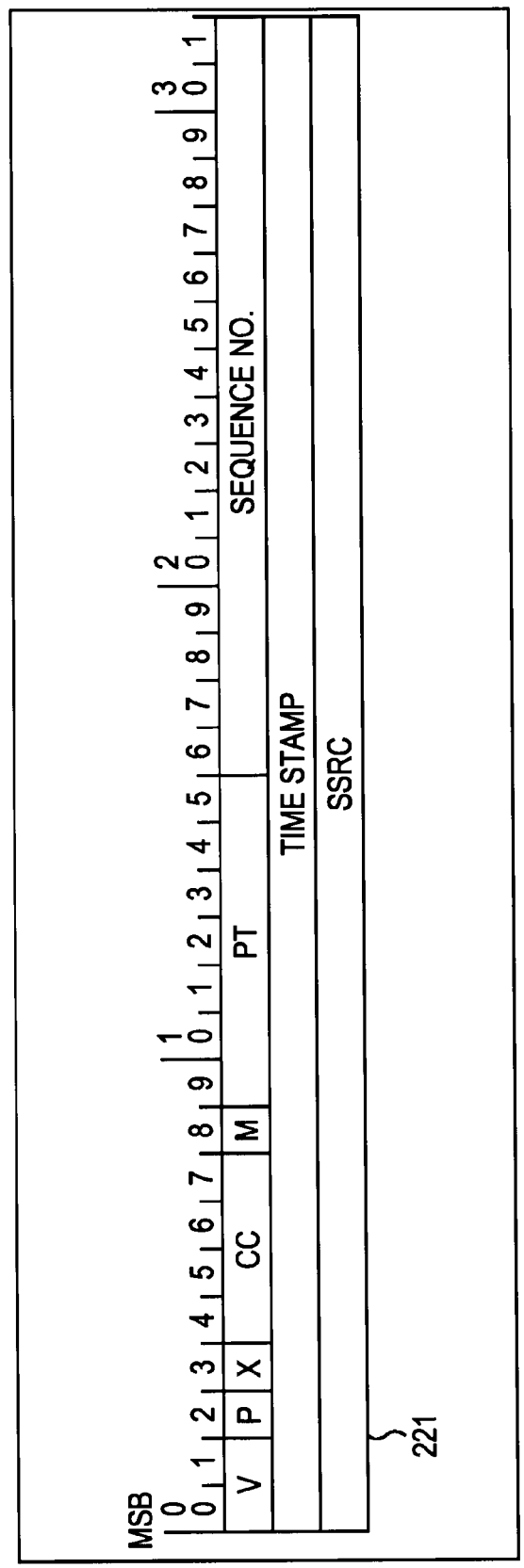
FIG. 13 is a schematic diagram for describing an exemplary structure of an RTP header.

FIG. 13 shows the structure of an RTP header, which is generated by the RTP header generation unit 202 and is header information of an RTP packet. In an RTP header 221, individual fields of version number (V), padding (P), the presence of an extension header (X), the number of sources (Counter) (CC), marker information (marker bit) (M), payload type (PT), sequence number, time stamp, and synchronization source identifier (SSRC) are provided.

The version number (V) is 2-bit information indicating the version number of RTP. The padding (P) is 1-bit flag information and, when the value thereof is "1", it is indicated that one or more padding octets (embedded data) are added at the end of the payload. The presence of an extension header (X) is 1-bit flag information and, when the value thereof is "1", it is indicated that, besides a fixed-length header, an extension header is added (there is a header extension). The number of sources (CC) is 4-bit information indicating the number of CSRC identifiers and indicates the number of identifiers of individual data sources when data from a plurality of data sources, as in a multi-point phone conference by way of example, is assembled into one RTP packet.

The marker information (M) is 1-bit flag information and indicates, for example, an arbitrary event in the payload. A method of using this marker information (M) is set in, for example, the payload type (PT). The payload type (PT) is 7-bit information that specifies the format of the payload carried by the packet.

The sequence number is 16-bit number information indicating the order of the RTP data packet. The initial value is set at random. In subsequent packets thereafter, the value increases by "1". This sequence number indicates the order of the packet through the entire encoded data (image data) to be transmitted.

The time stamp is 32-bit information indicating a sampling time of the first byte of the RTP packet. A sampling clock is determined by a data profile of the payload. For example, let the sampling frequency of an audio signal be 8 kHz. Since the value of the time stamp increases by "1" every 125 μsec, and let the RTP data packet be 20-msec-data, the value of the time stamp increases by 160 on a packet-by-packet basis. Note that the initial value is set at random.

The synchronization source identifier (SSRC) is a 32-bit identifier indicating the source of this packet. This information is generated at random. When a transport address changes, this SSRC identifier is updated as well.

Figure 14:
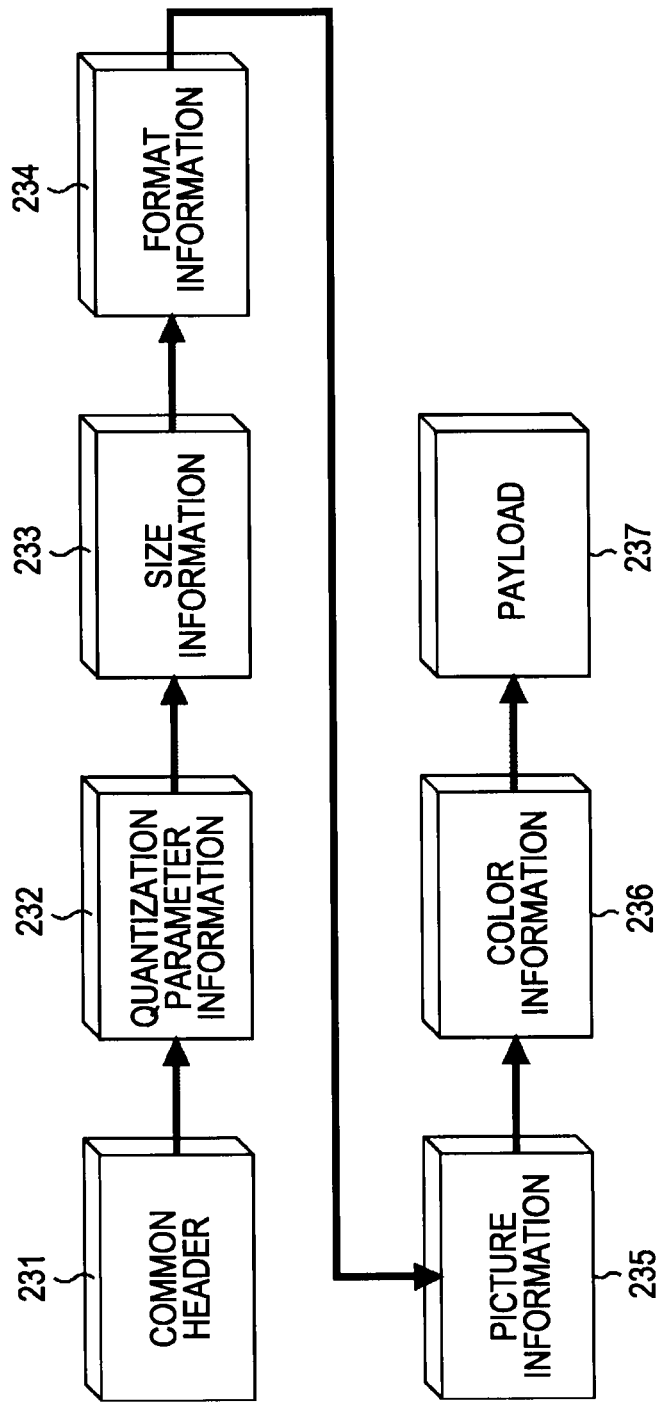
FIG. 14 is a schematic diagram for describing an exemplary structure of an RTP payload header.

The common header generation unit 203, the extension header generation unit 204, and the picture information generation unit 205 generate various items of information included in a payload header subsequent to the RTP header. FIG. 14 shows an exemplary structure of the payload header. As shown in FIG. 14, the payload header is constituted of a common header 231, quantization parameter information 232, size information 233, format information 234, picture information 235, and color information 236 and is added before a payload 237.

The common header 231 is header information which is generated by the common header generation unit 203 and includes basic information regarding a precinct. This common header 231 is an essential header and is added to all packets.

The quantization parameter information 232 is an extension header generated by the extension header generation unit 204 and includes information regarding a quantization coefficient. The size information 233 is an extension header generated by the extension header generation unit 204 and includes information regarding a data size. The format information 234 is an extension header generated by the extension header generation unit 204 and includes information regarding the format of data. The picture information 235 is an extension header generated by the picture information generation unit 205 and includes information regarding the original image (that is, image data encoded, packetized, and transmitted). The color information 236 is an extension header generated by the extension header generation unit 204 and includes information regarding the color of image data.

The quantization parameter information 232, the format information 234, the picture information 235, and the color information 236 are added as an extension header to the head packet of the precinct (including an unfragmented packet). The size information 233 is added as an extension header to an arbitrary packet.

That is, when size information is to be added to all packets, the head packet of the precinct includes all of the common header 231 through the payload 237. In contrast, packets other than the head packet of the precinct include only the common header 231, the size information 233, and the payload 237.

The details of each item of information will be described.

Figure 15:
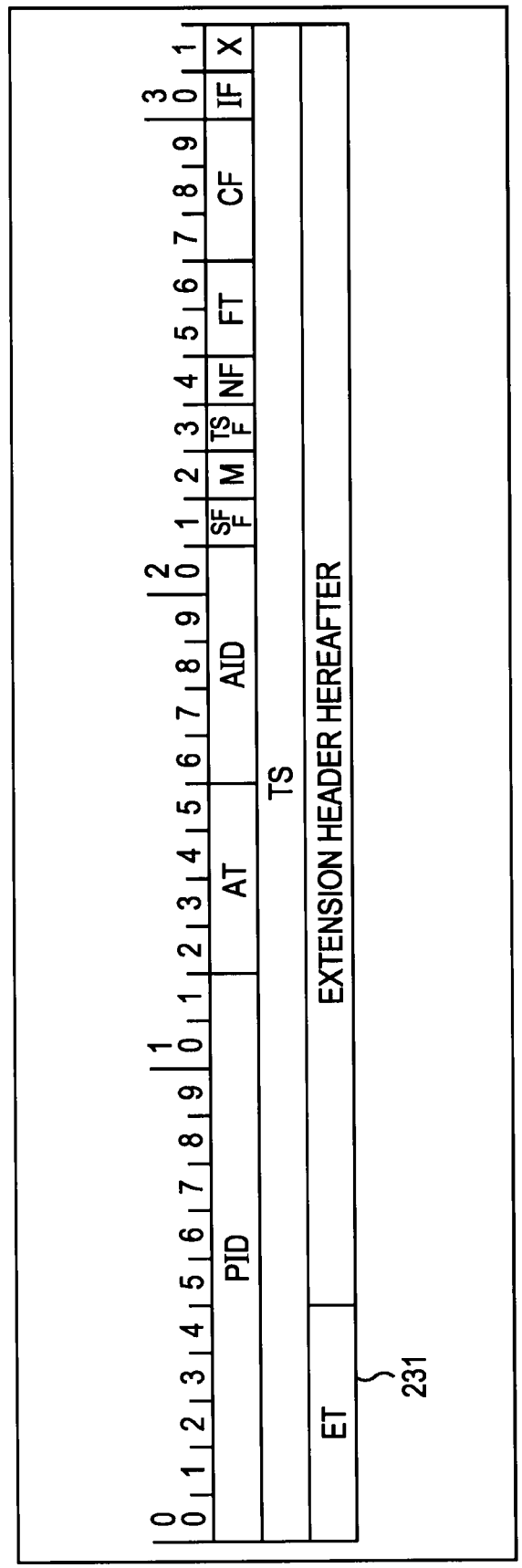
FIG. 15 is a diagram showing an exemplary structure of a common header.

FIG. 15 is a diagram showing an exemplary structure of the common header 231. As shown in FIG. 15, the common header 231 includes information such as PID, AT, AID, SFF, M, TSF, NF, FT, CF, IF, X, and TS. That is, the first word (the first row from the top) and the second word (the second row from the top) of the common header 231 are generated by using the first word (Word0) and the second word (Word1) of the precinct header 171 supplied from the encoding unit 121 as they are, and SFF, M, TSF, and NF are added into four bits which have been an empty field (Reserved) of the first word.

SFF (Start Fragment Flag) is 1-bit information indicating whether or not this packet is at the head of a payload indicated by PID, AT, and AID. That is, when this packet is the packet at the head of the precinct (head packet), the value of SFF is set to "1"; otherwise, it is set to "0".

M (Marker) is 1-bit flag information indicating whether or not this packet includes an end portion of a payload indicated by PID, AT, and AID. That is, when this packet is a packet including an end portion of the precinct or align unit (tail packet), the value of M is set to "1"; otherwise, it is set to "0".

TSF (Time Stamp Flag) is 1-bit flag information indicating whether or not a time stamp is to be included in the common header. That is, when the value of TSF is "1", the second word (Word1) of the precinct header 171 is added to the second word of the common header 231.

NF (Next Flag) is 1-bit flag information indicating the existence of a subsequent payload. That is, the value of NF is set to "1" when payloads of a plurality of precincts or align units are added to this packet and when this header is not for the last precinct or align unit in this packet.

TS (Time Stamp) is the least significant 32-bit information of a time stamp of the precinct to which the payload of this packet belongs and corresponds to the second word (Word1) of the precinct header 171.

Note that the third word shown in FIG. 15 (the third row from the top) indicates an extension header added in succession to the common header 231.

Figure 16:
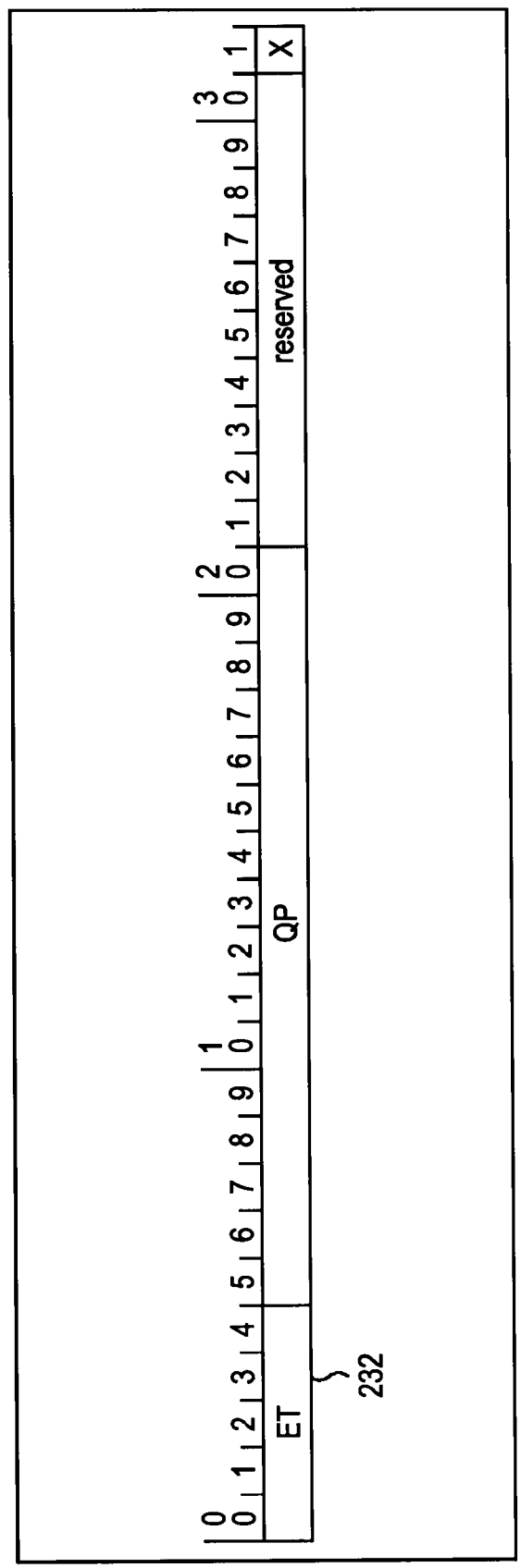
FIG. 16 is a diagram showing an exemplary structure of quantization parameter information.

FIG. 16 is a diagram showing an exemplary structure of the quantization parameter information 232 included in the extension header. As shown in FIG. 16, the quantization parameter information 232 is information including information such as ET, QP, and X. The extension header generation unit 204 uses the third word (Word2) of the precinct header 171 supplied from the encoding unit 121 to generate this quantization parameter information 232.

ET (Extension Type) is 5-bit information indicating the content of the extension header. A specified value when this quantization parameter information 232 is used is arbitrary, such as "00011". QP (Quantize Parameter) is 16-bit information indicating the value of a quantization coefficient. X (Extension) is a flag indicating whether or not to use the extension header.

Figure 17:
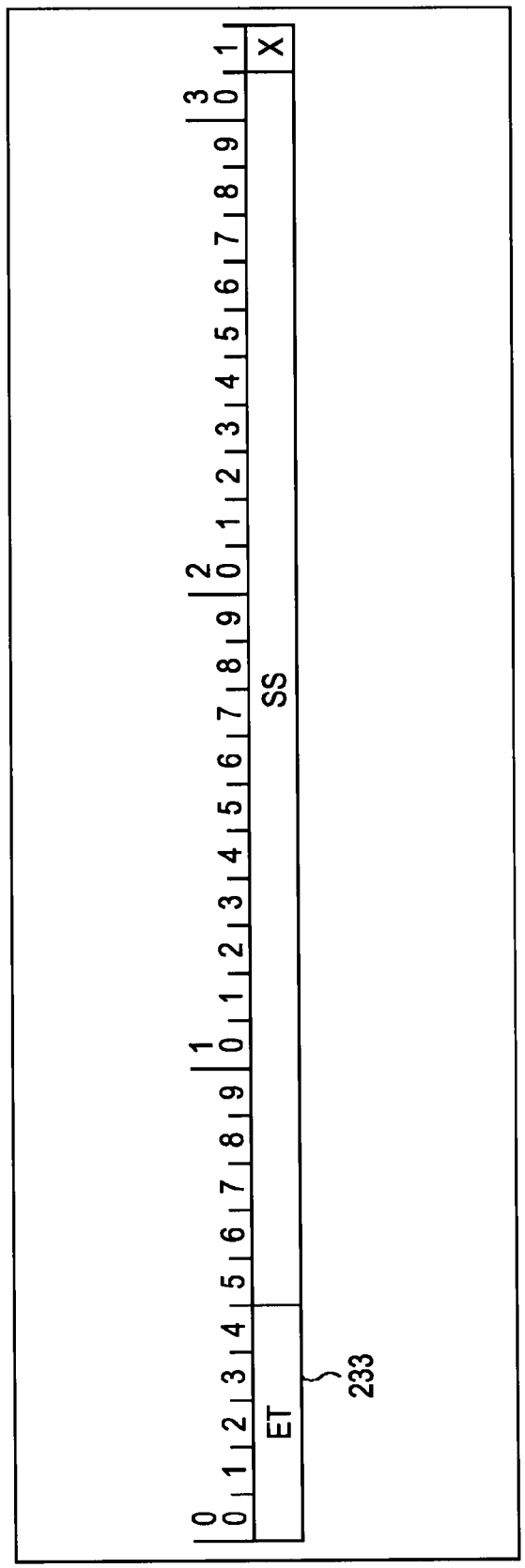
FIG. 17 is a diagram showing an exemplary structure of size information.

FIG. 17 is a diagram showing an exemplary structure of the size information 233 included in the extension header. As shown in FIG. 17, the size information 233 is information including ET, SS, X, and the like. The extension header generation unit 204 uses the fourth word (Word3) of the precinct header 171 supplied from the encoding unit 121 to generate this size information 233.

ET (Extension Type) is 5-bit information indicating the content of the extension header. A specified value when this size information 233 is used is arbitrary, such as "00100". SS (Segment Size) is 26-bit information indicating the payload size of a segment in terms of word length. X (Extension) is a flag indicating whether or not to use the extension header.

As shown in FIG. 7 and FIG. 15 through FIG. 17, the encoding unit 121 supplies the precinct header 171 which has the same format as the common header 231 and the extension header (the quantization parameter information 232 and the size information 233) to the packetizing processing unit 122. Accordingly, the common header generation unit 203 and the extension header generation unit 204 in the packetizing processing unit 122 can easily and quickly generate the common header and the extension header.

FIG. 18 is a diagram showing exemplary structures of the format information 234 included in the extension header. The format information 234 basically includes information such as ET, FTI, and X, as shown in A in FIG. 18. The extension header generation unit 204 uses, for example, information supplied from the encoding unit 121 to generate this format information 234.

ET (Extension Type) is 5-bit information indicating the content of the extension header. A specified value when this format information 234 is used is arbitrary, such as "00101". FTI (Format Type Identifier) is information indicating about which format type the information is written. The value of FTI is arbitrary. For example, when Bayer information is written, the value "00001" is set. X (Extension) is a flag indicating whether or not to use the extension header.

In B in FIG. 18, an exemplary structure of the format information 234 in the case where Bayer information is written is shown. In this case, the format information 234 includes, besides ET, FTI, and X, information such as MT, SMT, BLF, VLOF, SSF, EVF, DC, BL, RBL, RVLO, DSS, NSS, and EV.

MT (Mosaic Type) is 4-bit information indicating the mosaic type of the payload. SMT (Start Mosaic Type) is 4-bit information indicating the first pixel information in the upper left corner of a frame. BLF (Black Level Flag) is 1-bit flag information indicating the existence of black level information. VLOF (Vertical Line Offset Flag) is 1-bit flag information indicating the existence of vertical line correction information. SSF (Shutter Speed Flag) is 1-bit flag information indicating the existence of shutter speed information. EVF (EV Flag) is 1-bit flag information indicating the existence of EV information. DC (Defect Correction) is 1-bit flag information indicating whether or not to perform defect correction.

BL (Black Level) is 32-bit flag information indicating a black level value. RBL (Revised Black Level) is 32-bit information indicating a black level correction offset value. BL and RBL exist only when the value of BLF is "1".

RVLO (Revised Vertical Line Offset) is 32-bit information indicating a vertical line correction offset value. RVLO exists only when the value of VLOF is "1".

DSS is 32-bit information indicating a shutter speed numerator (APEX unit). NSS is 32-bit information indicating a shutter speed denominator (APEX unit). DSS and NSS exist only when the value of SSF is "1".

EV is 32-bit information indicating an EV value. EV exits only when the value of EVF is "1".

Figure 19:
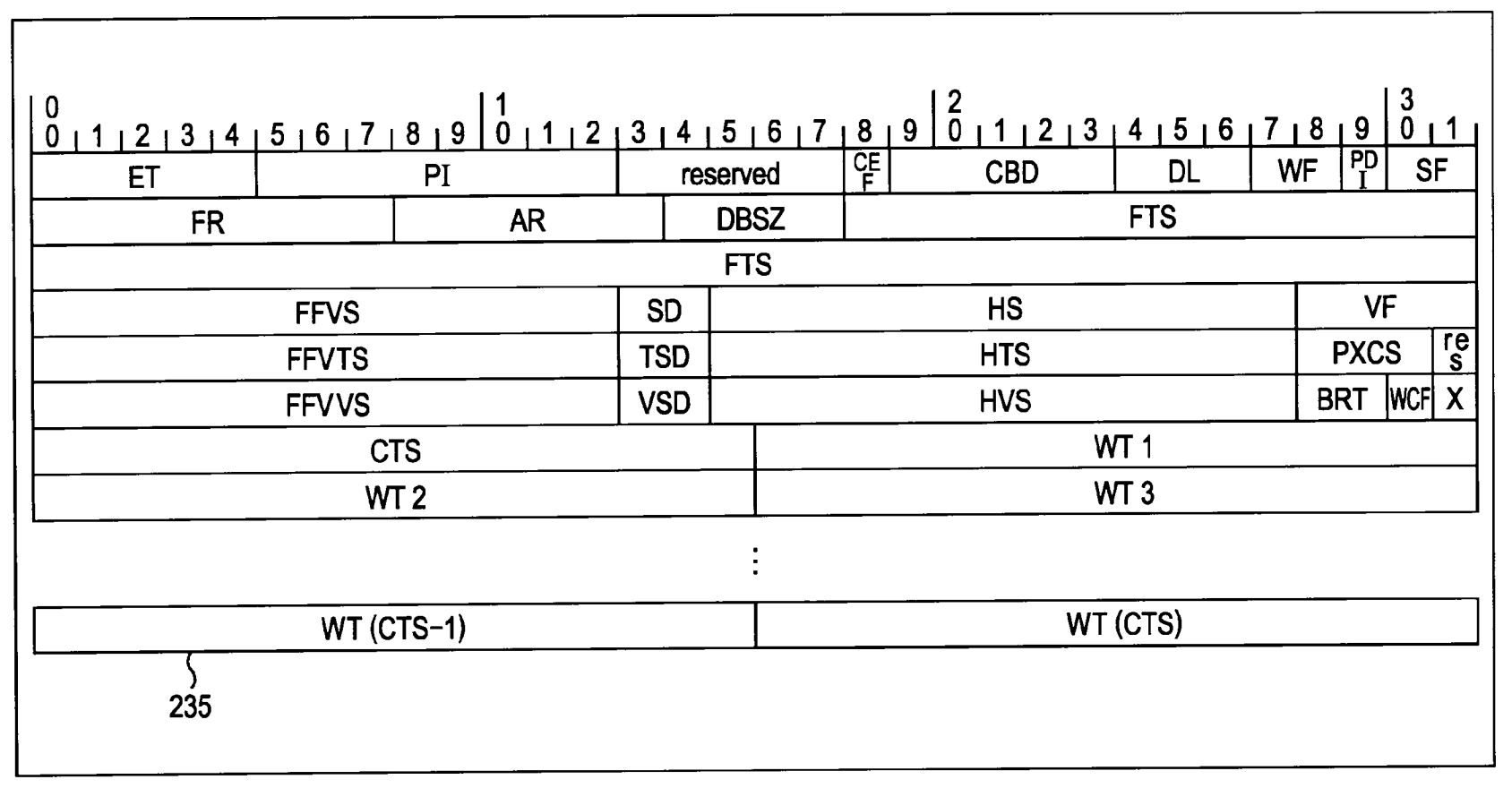

FIG. 19 is a diagram showing an exemplary structure of the picture information 235 included in the extension header. As shown in FIG. 19, the picture information 235 includes information such as ET, PI, CEF, CBD, DL, WF, PDI, SF, FR, AR, DBSZ, FTS, FFVS, SD, HS, VF, FFVTS, TSD, HTS, PXCS, FFVVS, VSD, HVS, BRT, WCF, X, CTS, and WTm. The picture information generation unit 205 uses the picture header 172 supplied from the encoding unit 121 to generate this picture information 235.

That is, the picture information 235 is obtained by adding ET into an empty field (Reserved) of the first word (Word0) and adding WCF and X into an empty field (Reserved) of the sixth word (Word5) of the picture header 172 supplied from the encoding unit 121.

ET (Extension Type) is 5-bit information indicating the content of the extension header. A specified value when this picture information 235 is used is arbitrary, such as "00010". WCF (Weighting Custom Flag) is 1-bit flag information indicating whether to use a custom value of a weighting coefficient. CTS exits only when the value of WCF is "1". X (Extension) is a flag indicating whether or not to use the extension header subsequent to this header.

As shown in FIG. 8 and FIG. 19, the encoding unit 121 supplies the picture header 172 which has the same format as the picture information 235 to the packetizing processing unit 122. Accordingly, the picture information generation unit 205 in the packetizing processing unit 122 can easily and quickly generate the picture information 235.

Figure 20:
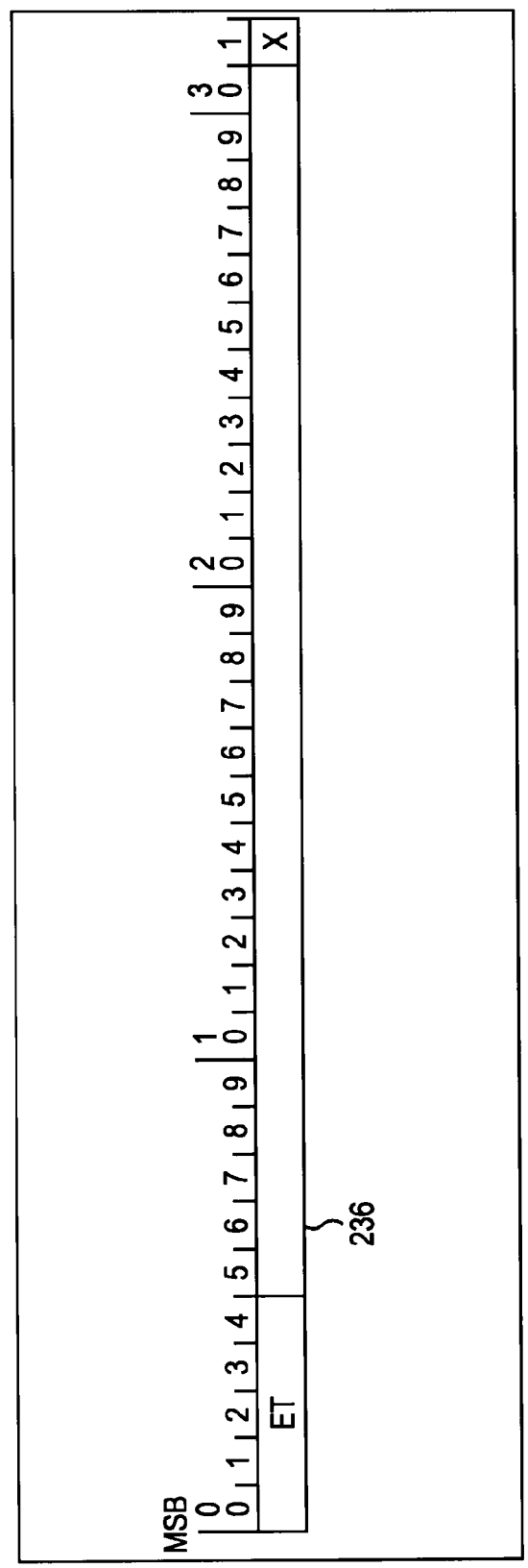
FIG. 20 is a diagram showing an exemplary structure of color information.

FIG. 20 is a diagram showing an exemplary structure of the color information 236 included in the extension header. As shown in FIG. 20, the color information 236 includes information such as ET and X. The extension header generation unit 204 uses information or the like supplied from the encoding unit 121 to generate this color information 236.

ET (Extension Type) is 5-bit information indicating the content of the extension header. X (Extension) is a flag indicating whether or not to use the extension header.

The packetizing processing unit 122 packetizes encoded data on a precinct-by-precinct basis as above and supplies packets to the sending unit 123. The sending unit 123 sequentially sends these packets to the receiving apparatus via the line 110.

The packets sent from the sending unit 123 in the foregoing format are supplied via the line 110 to the receiving unit 131 in the receiving apparatus 103. Upon receipt of these packets, the receiving unit 131 supplies them to the depacketizing processing unit 132.

Figure 21:
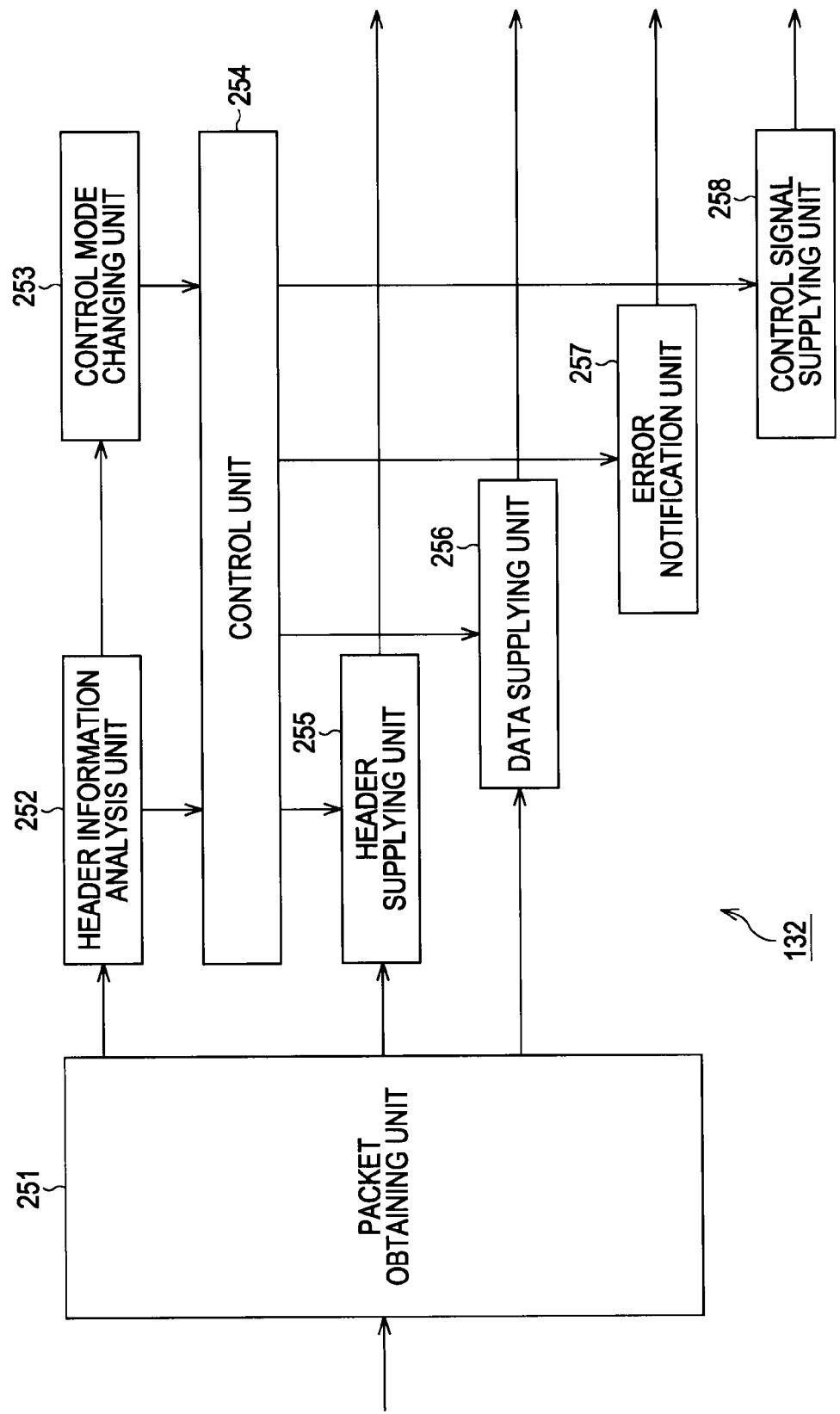
FIG. 21 is a block diagram showing a detailed exemplary structure of a depacketizing processing unit in FIG. 1.

FIG. 21 is a block diagram showing an exemplary structure of the interior of the depacketizing processing unit 132. As shown in FIG. 21, the depacketizing processing unit 132 includes, for example, a packet obtaining unit 251, a header information analysis unit 252, a control mode changing unit 253, a control unit 254, a header supplying unit 255, a data supplying unit 256, an error notification unit 257, and a control signal supplying unit 258.

The packet obtaining unit 251 obtains packets supplied from the receiving unit 131. At that time, when the packet obtaining unit 251 obtains information up to the RTP payload header, the packet obtaining unit 251 continues the obtaining and sequentially supplies the already obtained items of information to the header information analysis unit 252. That is, the packet obtaining unit 251 supplies the header information to the header information analysis unit 252 before the obtaining of a payload(s) is completed. Also, the packet obtaining unit 251 supplies the header information to the header supplying unit 255 as well and supplies the payload(s) to the data supplying unit 256 as well.

The header information analysis unit 252 analyzes the header information of the RTP packet obtained by the packet obtaining unit 251, that is, information of the RTP header and the payload header, and supplies the analysis result to the control mode changing unit 253 and the control unit 254.

On the basis of the header information analysis result supplied from the header information analysis unit 252, the control mode changing unit 253 controls the operation mode of the control unit 254 and changes the mode according to need.

In the control mode changed under control of the control mode changing unit 253, the control unit 254 controls, on the basis of the analysis result supplied from the header information analysis unit 252, the operation of the header supplying unit 255, the data supplying unit 256, the error notification unit 257, and the control signal supplying unit 258.

Under control of the control unit 254, the header supplying unit 255 extracts various items of information included in the payload header supplied from the packet obtaining unit 251, restores the precinct header 171 and the picture header 172, and supplies the precinct header 171 and the picture header 172 to the decoding unit 133. Under control of the control unit 254, the data supplying unit 256 supplies the payload data supplied from the packet obtaining unit 251 to the decoding unit 133. Under control of the control unit 254, the error notification unit 257 gives a notification of an error, such as the occurrence of packet loss, to the decoding unit 133. Under control of the control unit 254, the control signal supplying unit 258 supplies various items of control information other than the header and the data to the decoding unit 133.

Figure 22:
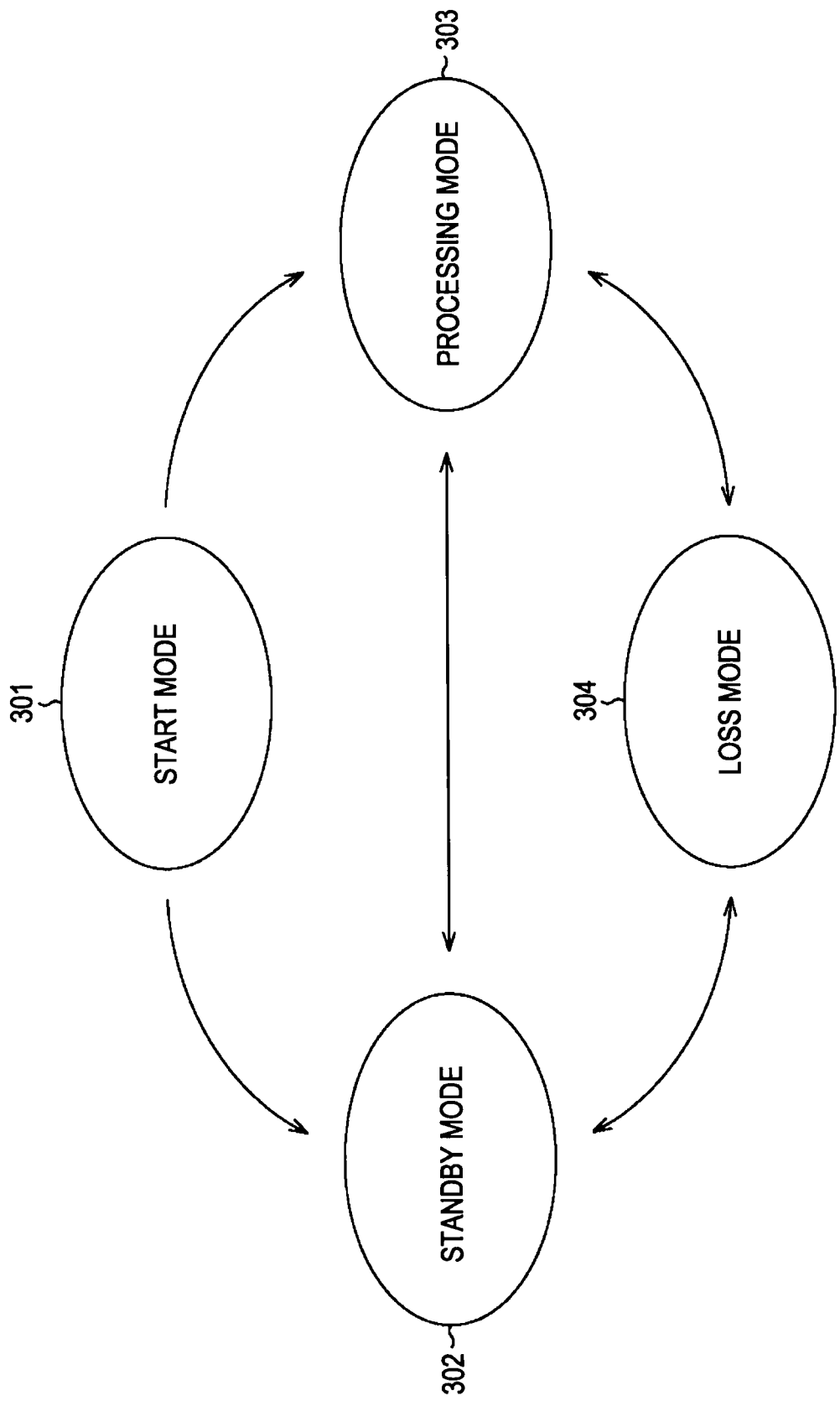
FIG. 22 is a diagram showing an example of the manner of a control mode transition.

As control modes of the control unit 254, as shown in FIG. 22, there are four modes, a start mode 301, a standby mode 302, a processing mode 303, and a loss mode 304. On the basis of the result of analyzing the header information by the header information analysis unit 252, the control mode changing unit 253 figures out an RTP packet reception status and changes the control mode of the control unit 254 to an optimal mode according to the status.

The start mode 301 is a mode for processing the first packet of the entire encoded data. At the time of starting a depacketizing process, the control unit 254 is set to this start mode 301. The standby mode 302 is a mode for processing the head packet of a precinct. After the tail packet of the precinct is processed, the control unit 254 is set to this standby mode 302. The processing mode 303 is a mode for processing each packet other than the head of the precinct at a normal time in which no packet loss is occurring. When no packet loss is occurring, the control unit 254 is set to this processing mode 303 for each packet other than the head of the precinct. The loss mode 304 is a mode for processing the remaining packets of the precinct when an error, such as a packet loss, occurs. When a packet loss occurs, the control unit 254 is set to this loss mode 304.

The details of the operation of the depacketizing processing unit 132 in each mode will be described later.

Figure 23:
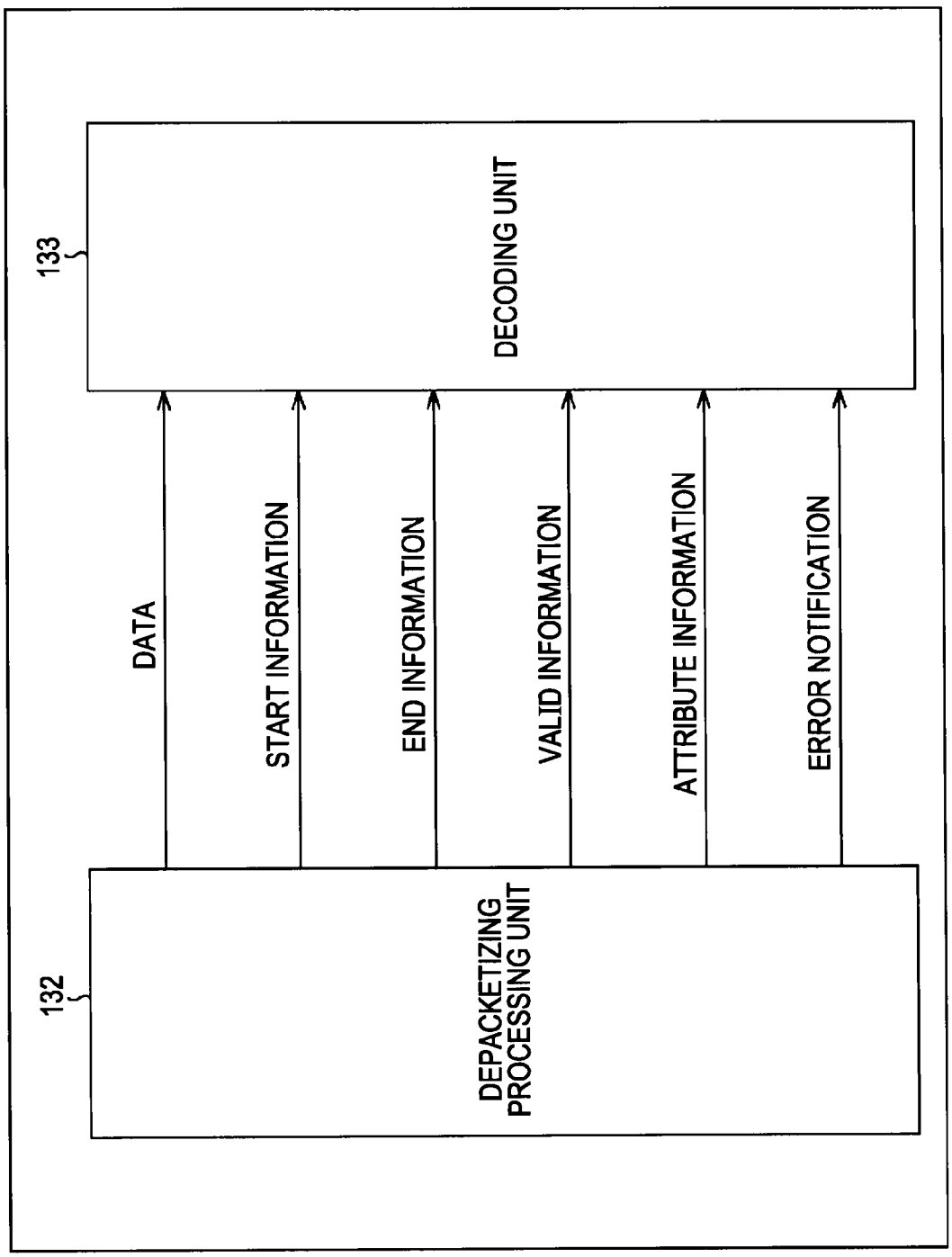
FIG. 23 is a diagram showing an example of information exchanged between the depacketizing processing unit and a decoding unit.

Note that actually, as shown in FIG. 23, start information, end information, VALID information, attribute information, an error notification, and the like are supplied, besides data, from the depacketizing processing unit 132 to the decoding unit 133.

Start information is information indicating a payload of the head packet of a precinct or an align unit. When the depacketizing processing unit 132 supplies a payload of the head packet of a precinct or an align unit to the decoding unit 133, the value "1" is set to this start information. End information is information indicating a payload of the tail packet of a precinct or an align unit. When the depacketizing processing unit 132 supplies a payload of the tail packet of a precinct or an align unit to the decoding unit 133, the value "1" is set to this end information.

Attribute information is information indicating whether the supplied data is a header or image data or indicating whether the supplied data is data of a luma component or data of chroma components. VALID information is information giving a notification of a data reading timing. An error notification is information notifying the decoding unit 133 of the occurrence of an error, such as a packet loss.

Figure 24:
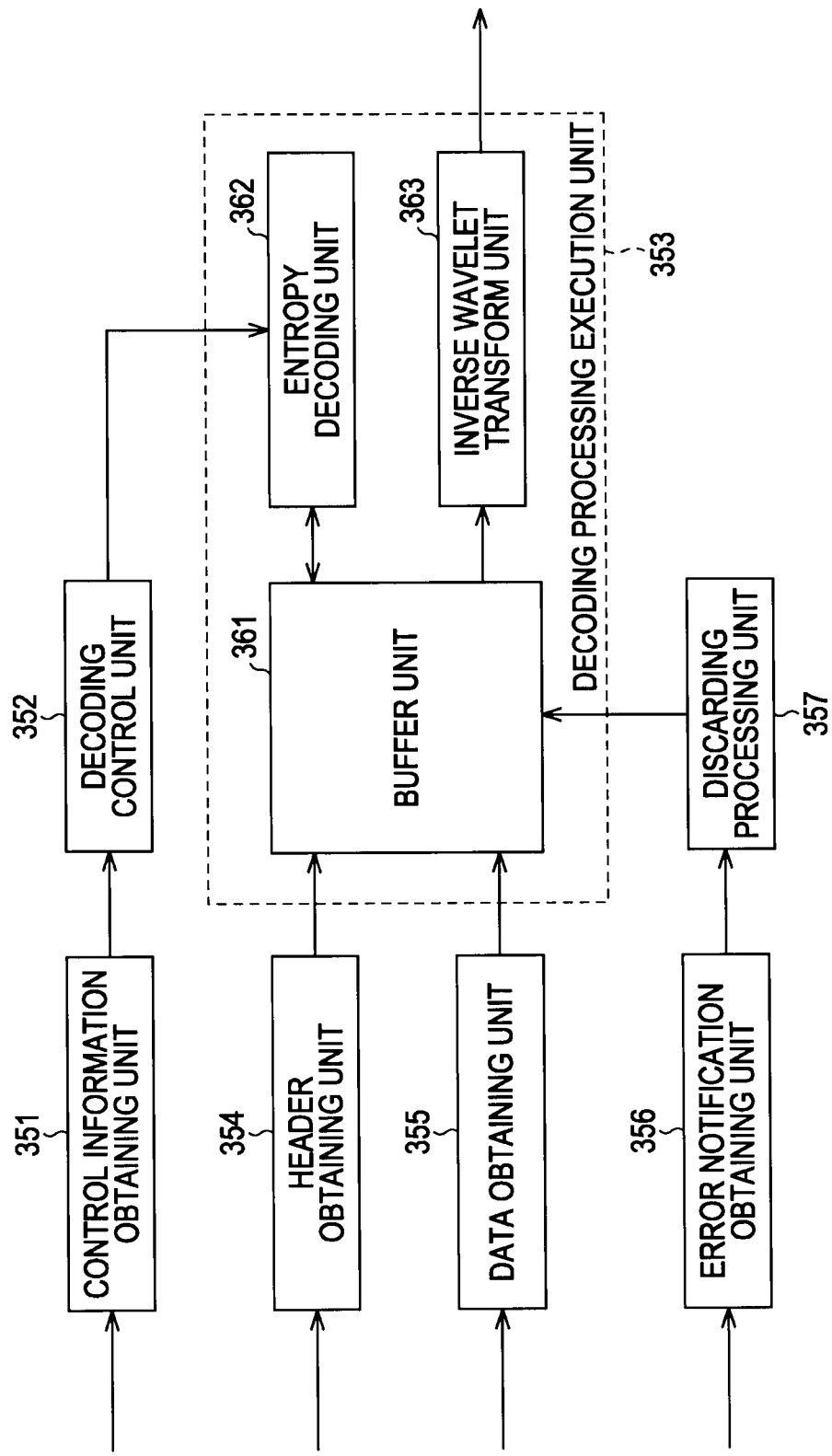
FIG. 24 is a block diagram showing a detailed exemplary structure of the decoding unit in FIG. 1.

FIG. 24 is a block diagram showing an exemplary structure of the interior of the decoding unit 133 in FIG. 1. As shown in FIG. 24, the decoding unit 133 includes a control information obtaining unit 351, a decoding control unit 352, a decoding processing execution unit 353, a header obtaining unit 354, a data obtaining unit 355, an error notification obtaining unit 356, and a discarding processing unit 357.

The control information obtaining unit 351 obtains, from the depacketizing processing unit 132, control information such as start information, end information, VALID information, and attribute information and supplies the control information to the decoding control unit 352. On the basis of the control information, the decoding control unit 352 causes the decoding processing execution unit 353 to start a decoding process at a predetermined timing.

On the basis of header information supplied from the depacketizing processing unit 132 and obtained by the header obtaining unit 354, the decoding processing execution unit 353 performs a decoding process of encoded data obtained by the data obtaining unit 355. The decoding processing execution unit 353 includes, as shown in FIG. 24, a buffer unit 361, an entropy decoding unit 362, and an inverse wavelet transform unit 363. The buffer unit 361 temporarily holds encoded data supplied from the data obtaining unit 355 and supplies the encoded data to the entropy decoding unit 362 according to need. Also, the buffer unit 361 temporarily holds coefficient data, which is the result of decoding the encoded data and supplied from the entropy decoding unit 362, and supplies the coefficient data to the inverse wavelet transform unit 363 according to need.

Under control of the decoding control unit 352, the entropy decoding unit 362 reads out the encoded data held in the buffer unit 361 and decodes the encoded data using a method corresponding to the entropy coding unit 155 in the encoding unit 121 to generate coefficient data. Note that, when quantization is performed in the entropy coding unit 155, after the entropy decoding unit 362 performs an entropy decoding process, the entropy decoding unit 362 additionally performs a dequantization process of the obtained coefficient data. The entropy decoding unit 362 supplies the obtained coefficient data to the buffer unit 361 and causes the buffer unit 361 to accumulate the obtained coefficient data.

The inverse wavelet transform unit 363 reads out the coefficient data accumulated in the buffer unit 361 at a predetermined timing, performs an inverse wavelet transform process using a method corresponding to the wavelet transform unit 150 in the encoding unit 121, and outputs obtained baseband image data as output image data to the display apparatus 104.

The header obtaining unit 354 obtains header information such as a precinct header and a picture header supplied from the depacketizing processing unit 132, supplies it to the buffer unit 361, and causes the buffer unit 361 to hold it. The data obtaining unit 355 obtains payload data supplied from the depacketizing processing unit 132, supplies it to the buffer unit 361, and causes the buffer unit 361 to hold it.

The error notification obtaining unit 356 obtains an error notification of giving a notification of the occurrence of packet loss in a reception process or the like, which is supplied from the depacketizing processing unit 132, and supplies it to the discarding processing unit 357. When the discarding processing unit 357 obtains the error notification, the discarding processing unit 357 discards the encoded data accumulated in the buffer unit 361 in the decoding processing execution unit 353. That is, when a packet loss occurs in a packet reception process (when the occurrence of packet loss is confirmed on the basis of a sequence number), since a normal entropy decoding process of the current precinct in which the packet loss has occurred is unexecutable, the discarding processing unit 357 discards the entire encoded data of the current precinct in which the packet loss has occurred, which is accumulated in the buffer unit 361.

Figure 25:
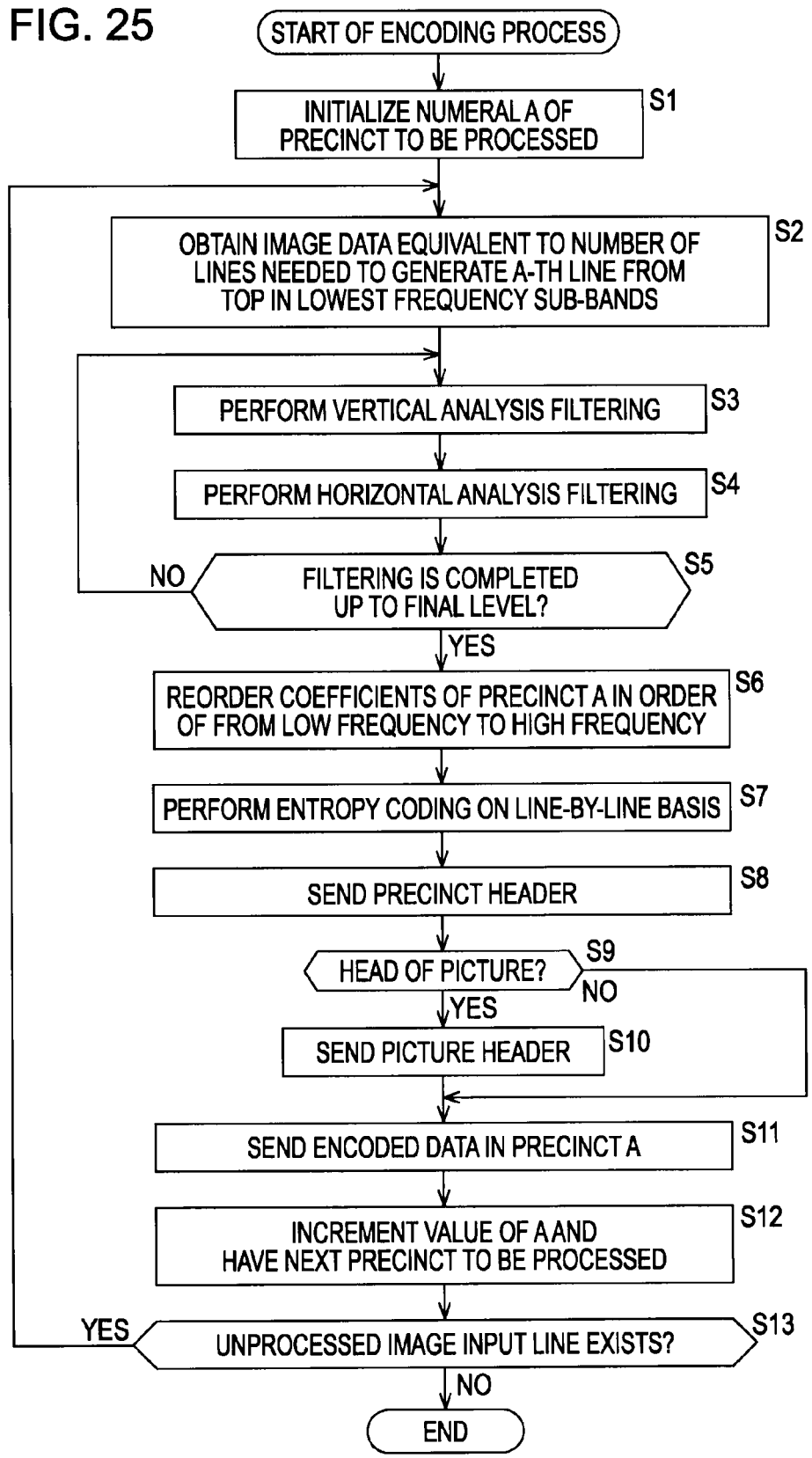
FIG. 25 is a flowchart for describing an exemplary flow of an encoding process.

Next, the flow of a process executed by each unit will be described. At first, an exemplary flow of an encoding process executed by the encoding unit 121 in the sending apparatus 102 will be described with reference to the flowchart in FIG. 25.

When an encoding process starts, the wavelet transform unit 150 initializes in step S1 the numeral A of a precinct to be processed. In a normal case, the numeral A is set to "1". When the setting ends, the wavelet transform unit 150 obtains in step S2 image data equivalent to a number of lines (that is, one precinct) needed to generate an A-th line from the top in the lowest frequency sub-bands. In step S3, for that image data, the wavelet transform unit 150 performs a vertical analysis filtering process of performing analysis filtering of the image data arranged in the screen vertical direction. In step S4, the wavelet transform unit 150 performs a horizontal analysis filtering process of performing analysis filtering of the image data arranged in the screen horizontal direction.

In step S5, the wavelet transform unit 150 determines whether or not the analysis filtering processes have been performed up to the final level. When it is determined that the decomposition level has not reached the final level, the process returns to step S3, and analysis filtering processes in step S3 and step S4 are repeated for the current decomposition level.

When it is determined in step S5 that the analysis filtering processes have been performed up to the final level, the wavelet transform unit 150 advances the process to step S6.

In step S6, the coefficient reordering unit 153 reorders coefficients of a precinct A (A-th precinct from the top of a picture (frame or field)) in order from low frequency to high frequency. In step S7, the entropy coding unit 155 performs entropy coding of the coefficients on a line-by-line basis.

When the entropy coding ends, the entropy coding unit 155 sends the precinct header 171 (FIG. 7) in step S8 and determines in step S9 whether or not the current precinct to be processed is the head precinct (that is, A=1) of the picture. When it is determined that the current precinct is at the head of the picture, the process proceeds to step S10, and the entropy coding unit 155 sends the picture header 172 (FIG. 8). When the processing in step S10 ends, the process proceeds to step S11. Alternatively, when it is determined in step S9 that the current precinct to be processed is not the head precinct of the picture, the processing in step S10 is omitted, and the process proceeds to step S11.

In step S11, the entropy coding unit 155 sends, subsequent to the header information, encoded data in the precinct A to the outside.

In step S12, the wavelet transform unit 150 increments the value of the numeral A by "1" to have the next precinct to be processed. In step S13, the wavelet transform unit 150 determines whether or not an unprocessed image input line exists in the picture to be processed. When the existence is determined, the process returns to step S2, and the process thereafter is repeated for a new precinct to be processed.

The processing from step S2 through step S13 is repeatedly executed as above, and each precinct is encoded. Also, when it is determined in step S13 that no unprocessed image input line exists, the wavelet transform unit 150 ends the encoding process of the picture. A new encoding process starts for the next picture.

In the case of a conventional wavelet transform method, firstly a horizontal analysis filtering process is performed on the entire picture, and then a vertical analysis filtering process is performed on the entire picture. Then, a similar horizontal analysis filtering process and a similar vertical analysis filtering process are sequentially performed on the whole low frequency components obtained thereby. Analysis filtering processes are recursively repeated as above until the decomposition level reaches the final level. Therefore, it is necessary to hold the result of each analysis filtering process in the buffer. On that occasion, the buffer needs to hold the result of filtering the whole picture or the whole low frequency components at the decomposition level at that point of time. This means that a large memory capacity is necessary (the amount of data to be held is large).

Also, in this case, coefficient reordering and entropy coding at subsequent stages cannot be performed until the whole wavelet transform in the picture ends, and a delay time increases.

In contrast, in the case of the wavelet transform unit in the encoding unit 121, as has been described above, a vertical analysis filtering process and a horizontal analysis filtering process are continuously performed up to the final level on a precinct-by-precinct basis. Thus, compared with the conventional method, the amount of data needed to be held (buffered) at a time (simultaneously) is small, and the amount of memory of the buffer that should be prepared can be significantly reduced. Also, since analysis filtering processes are performed up to the final level, processing such as coefficient reordering and entropy coding at subsequent stages can also be performed (that is, coefficient reordering and entropy coding can be performed on a precinct-by-precinct basis). Therefore, the delay time can be significantly reduced, compared with the conventional method.

Also, since the entropy coding unit 155 supplies, together with encoded data, the precinct header 171 on a precinct-by-precinct basis and the picture header 172 on a picture-by-picture basis to the packetizing processing unit 122, the packetizing processing unit 122 can easily generate header information.

Also, since the format of the precinct header 171 and the picture header 172 is similar to the format of a payload header added to a packet by the packetizing processing unit 122, the packetizing processing unit 122 can more easily generate header information.

Further, when encoding fails because of some reason, the entropy coding unit 155 sets IF of the precinct header 171, thereby indicating that the precinct or align unit is a precinct or align unit failed to be encoded. By referring to this IF, the packetizing processing unit 122 can easily refrain from packetizing and sending the undecodable, unnecessary data to the receiving apparatus 103.

Figure 26:
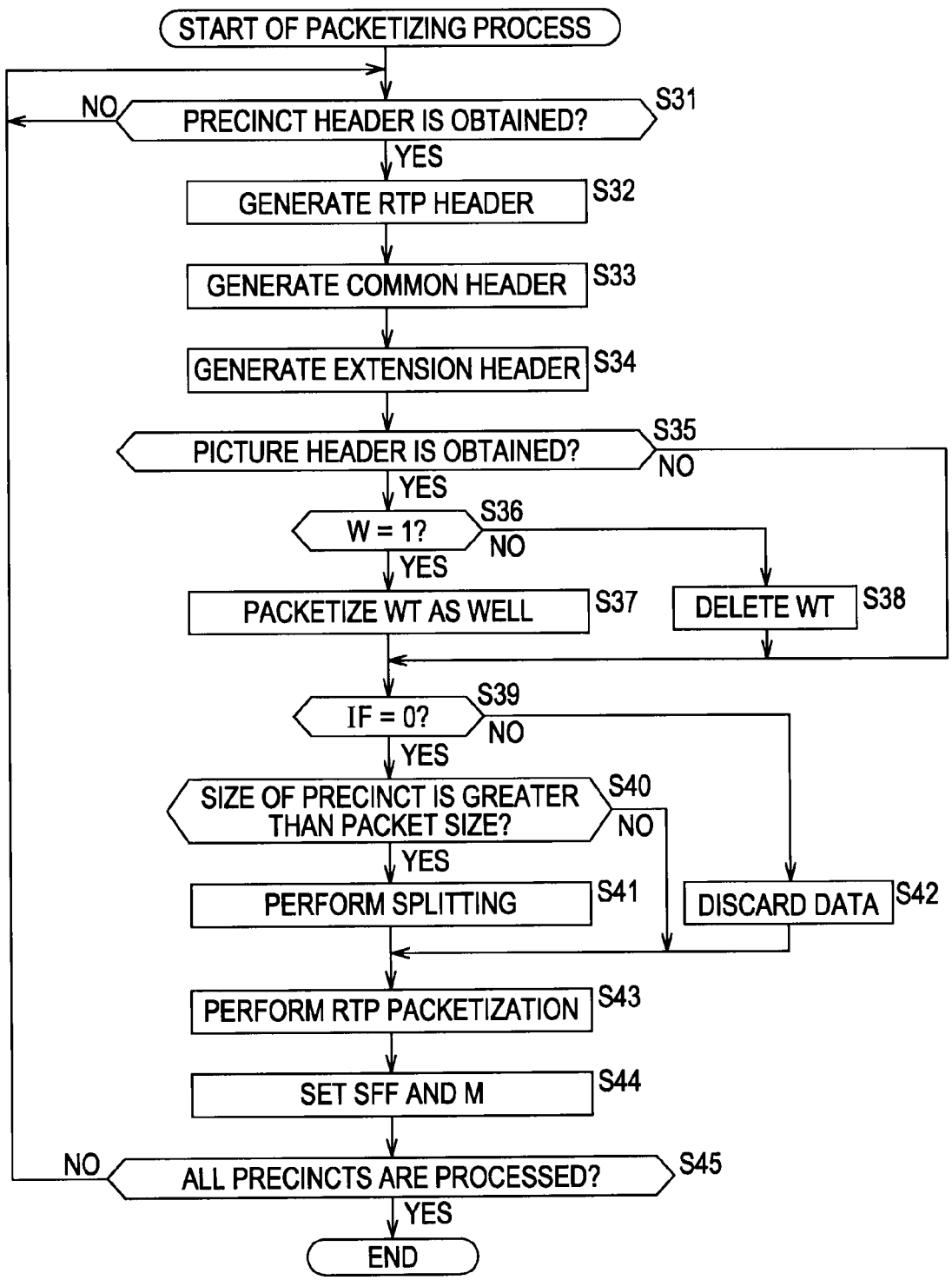
FIG. 26 is a flowchart for describing an exemplary flow of a packetizing process.

Next, an exemplary flow of a packetizing process performed by the packetizing processing unit 122 is described with reference to the flowchart in FIG. 26.

In step S31, the data obtaining unit 201 in the packetizing processing unit 122 determines whether or not the precinct header 171 is obtained and remains on standby until it is determined that the precinct header 171 is obtained. When it is determined that the precinct header 171 supplied from the encoding unit 121 is obtained, the process proceeds to step S32.

In step S32, the RTP header generation unit 202 generates the RTP header 221. In step S33, the common header generation unit 203 generates the common header 231 on the basis of the precinct header 171. At this time, the common header generation unit 203 adds SFF, M, TSF, and NF fields to the first word (Word0) of the precinct header 171.

In step S34, the extension header generation unit 204 generates, on the basis of the precinct header 171, an extension header such as the quantization parameter information 232, the size information 233, the format information 234, and the color information 236.

In step S35, the picture information generation unit 205 determines whether or not the picture header 172 is obtained. When it is determined that the picture header 172 is obtained, the process proceeds to step S36. In step S36, the picture information generation unit 205 refers to the picture header 172 and determines whether or not the value of w is "1". When it is determined that the value of w is "1", in step S37, the picture information generation unit 205 includes the weighting table (WTm) in picture information as well so as to be packetized. When the processing in step S37 ends, the process proceeds to step S39.

Alternatively, when it is determined in step S36 that the value of w is "0", the picture information generation unit 205 deletes the weighting table (WTm) from picture information in step S38. When the processing in step S38 ends, the process proceeds to step S39.

Further, when it is determined in step S35 that the picture header is not obtained, the process proceeds to step S39.

In step S39, the flag checking unit 206 determines whether or not the value of IF in the precinct header 171 is 0. When it is determined that the value of IF in the precinct header 171 is 0, the process proceeds to step S40.

In step S40, the size checking unit 207 determines whether or not the data size of a precinct is greater than the maximum size of a payload of a packet (packet size).

When it is determined that the size of a precinct is greater than the packet size, the process proceeds to step S41. In step S41, the fragment processing unit 208 splits encoded data in one precinct in increments of the packet size to generate payloads that are different from one another. When the processing in step S41 ends, the process proceeds to step S43.

Alternatively, when it is determined in step S40 that the data size of a precinct is not greater than the packet size, the fragment processing unit 208 does not split the encoded data. That is, in this case, the processing in step S41 is omitted, and the process proceeds to step S43.

Further, when it is not determined in step S39 that "IF=0", the process proceeds to step S42. In step S42, the data obtaining unit 201 under control of the flag checking unit 206 discards the supplied encoded data. When the processing in step S42 ends, the process proceeds to step S43.

In step S43, the packetizing unit 209 uses each payload and header information to generate RTP packets and, in step S44, sets flag information such as SFF and M for each packet.

When each item of flag information is set as above, the output unit 210 outputs the corresponding RTP packet to the sending unit 123.

In step S45, the data obtaining unit 201 determines whether or not all precincts are processed. When it is determined that an unprocessed precinct exists, the process returns to step S31, and the process thereafter is repeated. Alternatively, when it is determined in step S45 that all precincts are processed, the packetizing process ends.

As above, the packetizing processing unit 122 can easily generate a common header and an extension header on the basis of header information supplied from the encoding unit 121.

Also, as has been described above, in step S36 through step S38, the picture information generation unit 205 can easily and quickly control addition of the weighting table on the basis of the value of w in the precinct header 171. That is, the picture information generation unit 205 can appropriately add the weighting table only when needed simply by checking the value of w in the precinct header 171. Accordingly, an unnecessary increase in the amount of data transferred from the sending apparatus 102 to the receiving apparatus 103 and an unnecessary increase in load on each unit thereupon can be suppressed.

Further, as has been described above, when the value of IF in the precinct header 171 is "1" in step S39, the flag checking unit 206 controls the data obtaining unit 201 in step S42 so as not to obtain the encoded data and not to add a payload to the packet. That is, in this case, the RTP packet output from the packetizing processing unit 122 includes only the header information and does not include a payload. Accordingly, the packetizing processing unit 122 can easily and quickly reduce sending of undecodable, unnecessary data simply by referring to the precinct header 171 supplied from the encoding unit 121 and can suppress an unnecessary increase in load on the sending unit 123, the line 110, the receiving apparatus 103, and the like.

Also, as has been described above, when the size checking unit 207 can determine in step S40 whether or not the size of a precinct is greater than the packet size on the basis of the precinct header 171, the packetizing processing unit 122 can easily and quickly determine whether or not to fragment the encoded data in one precinct without accumulating it.

Further, in step S44, the packetizing unit 209 sets the SFF flag in the common header 231 for the head packet of the precinct and sets the M flag in the common header 231 for the tail packet of the precinct. Since these flags are set, the depacketizing processing unit 132 in the receiving apparatus 103 can easily identify the head of the precinct and the end of the precinct simply by referring to the header information. Accordingly, the depacketizing processing unit 132 can quickly and easily perform a depacketizing process, as will be described later.

Further, at this time, since the IF flag in the common header 231 has been set, the depacketizing processing unit 132 in the receiving apparatus 103 can easily identify that the packet includes no payload simply by referring to the header information. Accordingly, the depacketizing processing unit 132 can quickly and easily perform a depacketizing process, as will be described later.

Next, a process executed by the depacketizing processing unit 132 in the receiving apparatus 103 receiving a packet will be described. As has been described above, the depacketizing processing unit 132 performs a depacketizing process in four control modes. At the time of starting a depacketizing process, the depacketizing processing unit 132 is set to the start mode 301.

Figure 27:
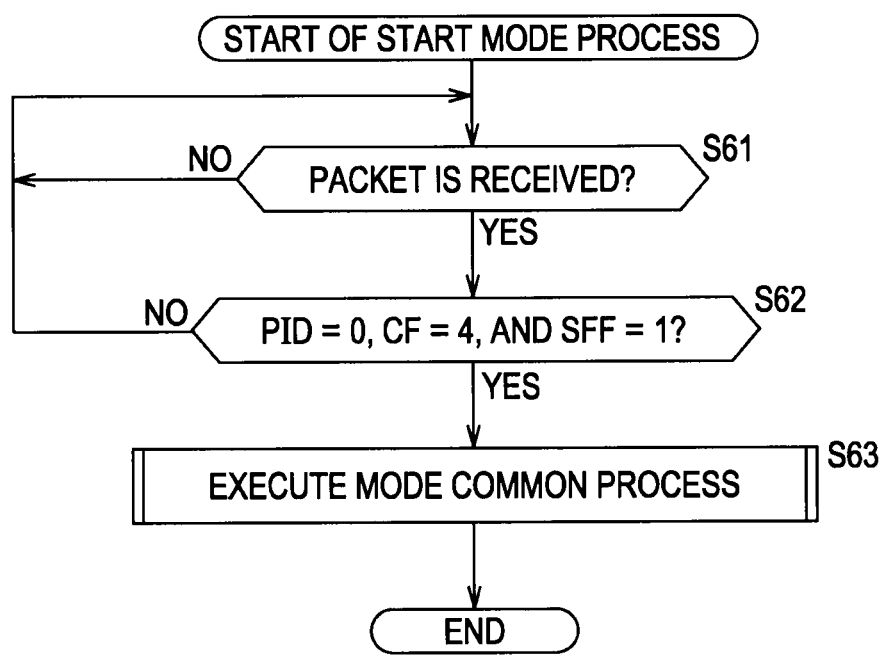
FIG. 27 is a flowchart for describing an exemplary flow of a start mode process.

At first, an exemplary flow of a start mode process executed by the depacketizing processing unit 132 in the start mode 301 will be described with reference to the flowchart in FIG. 27.

In step S61, the packet obtaining unit 251 determines whether or not a packet is obtained and remains on standby until it is determined that a packet is obtained via the receiving unit 131. When it is determined that a packet is obtained, the process proceeds to step S62. In step S62, the header information analysis unit 252 obtains header information of the packet and determines whether or not "PID=0", "CF=4", and "SFF=1". That is, the header information analysis unit 252 determines whether or not the packet is the first packet of a precinct which is at the head of a picture and includes a group of a plurality of components. When it is determined that it is not "PID=0", "CF=4", and "SFF=1", the process returns to step S61, and the process thereafter is repeated. That is, the processing in step S61 and the processing in step S62 are repeated until it is determined that "PID=0", "CF=4", and "SFF=1". When it is determined that "PID=0", "CF=4", and "SFF=1", the process proceeds to step S63.

In step S63, the control unit 254 executes a mode common process which is a depacketizing process of the head packet of the precinct, which is executed in each mode, as will be described later. The details of the mode common process will be described later. When the mode common process ends, the control mode is changed to another mode, and hence, the start mode process ends.

As above, in the start mode, the control unit 254 can easily detect the head packet of the precinct which is at the head of the picture simply by referring to the value of SFF in the common header 231. Also, by detecting the head packet of the precinct which is at the head of the picture, the control unit 254 can start a mode common process at that point of time and start extracting a payload from the precinct. That is, the control unit 254 can figure out a new precinct without checking the tail packet of the precinct. Thus, the payload extraction starting timing can be made earlier, and the delay time can be reduced.

Next, an exemplary flow of the mode common process executed in step S63 in FIG. 27 will be described with reference to the flowchart in FIG. 28. This mode common process is, as will be described later, a process executed in other modes as well. When the depacketizing processing unit 132 has not checked the tail packet of the previous precinct but has checked the head packet of a new precinct, the depacketizing processing unit 132 performs a depacketizing process of that precinct.

Therefore, the mode common process starts in a state where the packet obtaining unit 251 has already obtained the packet.

When the mode common process starts, in step S82, the header information analysis unit 252 refers to the common header 231 and determines whether or not "IF=0". When it is determined that "IF=1", the process proceeds to step S83.

When it is determined that "IF=1", the control unit 254 controls, in step S83, the header supplying unit 255 and the data supplying unit 256 and causes them to transfer only the header portion of the packet to the decoding unit 133. In the case of IF=1, basically the packet includes no payload. Even if the packet includes a payload, the payload is undecodable. Thus, the control unit 254 controls the data supplying unit 256 and prohibits transfer of the payload.

When the processing in step S83 ends, the control mode changing unit 253 changes, in step S84, the control mode to a standby mode for waiting for the head packet of the next precinct. A process in the standby mode will be described later. When the control mode is changed, the mode common process ends.

When it is determined in step S82 that "IF=0", the process proceeds to step S85. In this case, encoded data of the payload is normally encoded data. In step S85, the header supplying unit 255 under control of the control unit 254 transfers four words of the precinct header to the decoding unit 133.

In step S86, the header information analysis unit 252 refers to the common header 231 and determines whether or not "PID=0" and "CF=4". When it is determined that "PID=0" and "CF=4", the process proceeds to step S87. In step S87, the header information analysis unit 252 refers to the common header 231 and determines whether or not "w=1". When it is determined that "w=1", the process proceeds to step S88, and the header supplying unit 255 under control of the control unit 254 transfers 26 words of the picture header 172 to the decoding unit 133 so that the weighting table is included as well. When the processing in step S88 ends, the process proceeds to step S90.

Alternatively, when it is determined in step S87 that it is not "w=1", the process proceeds to step S89, and the header supplying unit 255 under control of the control unit 254 transfers only six words of the picture header 172 to the decoding unit 133 so that the weighting table is not included as well. When the processing in step S89 ends, the process proceeds to step S90.

Alternatively, when it is not determined in step S86 that "PID=0" and "CF=4", this precinct is not the precinct that is at the head of the picture. Thus, the header supplying unit 255 under control of the control unit 254 does not transfer the picture header 172 to the decoding unit 133. Therefore, in this case, the process proceeds to step S90.

In step S90, the data supplying unit 256 under control of the control unit 254 transfer the remaining payload of the packet, that is, the encoded data, to the decoding unit 133. In step S91, the header information analysis unit 252 refers to the common header 231 and determines whether or not "M=1". When "M=1" and when it is determined that the packet to be processed is the tail packet of the precinct, the process proceeds to step S92, and the control unit 254 under control of the control mode changing unit 253 changes the control mode to the standby mode. That is, since this processing of the tail packet has ended, the control mode is changed to the standby mode of waiting for the head packet of the next precinct. When the control mode is changed, the mode common process ends.

Alternatively, when it is determined in step S91 that it is not "M=1" and the packet to be processed is not the tail packet of the precinct, the process proceeds to step S93, and the control unit 254 under control of the control mode changing unit 253 changes the control mode to a processing mode. That is, since this transfer processing of the packet which is not the tail packet has normally ended, the control mode is changed to the processing mode of waiting for a subsequent packet of the same precinct. When the control mode is changed, the mode common process ends. When the mode common process is executed in step S63 in FIG. 27, with the mode common process termination, the process returns to step S63 in FIG. 27, and the start mode process is ended.

As above, the depacketizing processing unit 132 can easily identify, on the basis of the values of SFF and M, the head packet and the tail packet of a precinct. Also, since the depacketizing processing unit 132 can identify the tail packet based on M, the depacketizing processing unit 132 can easily and suitably change the mode on a precinct-by-precinct basis. Accordingly, the depacketizing processing unit 132 can appropriately perform a depacketizing process of each precinct. Further, since the depacketizing processing unit 132 can identify the head packet based on SFF, the depacketizing processing unit 132 can figure out the updating of a precinct without checking the tail packet. That is, for example, even when a packet loss occurs, that is, even when the sequence number of the obtained packet is not continuous with the sequence number of the last obtained packet, if that packet is the head packet of a new precinct, the depacketizing processing unit 132 can start extracting a payload from the packet of the new precinct without waiting for the next precinct. That is, the depacketizing processing unit 132 can reduce an unnecessary waiting time. Needless to say, since the depacketizing processing unit 132 can reduce the waiting time when executing the mode common process not only in the start mode but also in the processing mode and the loss mode, reduction of the delay time can be realized.

Also, as in step S83, the depacketizing processing unit 132 can easily refrain from supplying an undecodable, unnecessary payload to the decoding unit 133 simply by referring to the common header 231. Accordingly, the load of a decoding process on the decoding unit 133 can be alleviated. Note that, since the header information can be used in a decoding process, the control unit 254 transfers only the header information.

Figure 29:
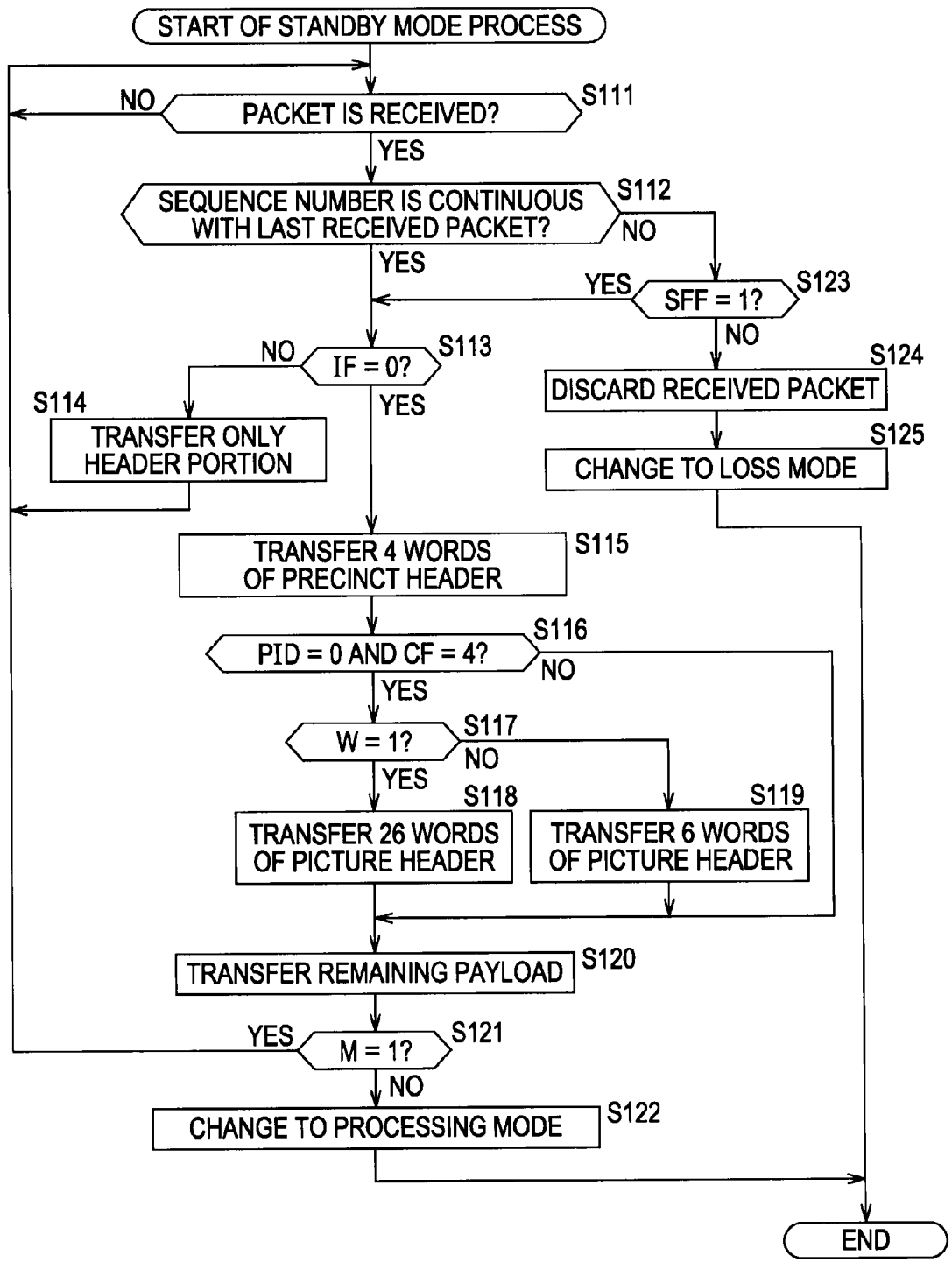
FIG. 29 is a flowchart for describing an exemplary flow of a standby mode process.

Next, an exemplary flow of a standby mode process will be described with reference to the flowchart in FIG. 29. This standby mode process is a process in a mode of waiting for the head packet of the next precinct. When the control mode is changed by the control mode changing unit 253 to the standby mode, the standby mode process starts.

When the standby mode process starts, the packet obtaining unit 251 determines in step S111 whether or not a packet is received and remains on standby until it is determined that a packet is received. When a packet is supplied from the receiving unit 131 and it is determined that the packet is received, the process proceeds to step S112.

In step S122, the header information analysis unit 252 refers to the RTP header 221 and determines whether or not the sequence number is continuous with the last received packet. When the sequence number is not continuous with the last received packet, it indicates that the reception of a packet has failed (a packet loss has occurred). When the sequence number is continuous with the last received packet and when it is determined that no packet loss is occurring, the process proceeds to step S113.

Each processing in step S113 through step S122 is executed similarly to each processing in step S82 and step S83, step S85 through step S91, and step S93 of the mode common process described with reference to FIG. 28.

That is, the processing in step S113 corresponds to step S82, and the processing in step S114 corresponds to step S83. Note that, in the case of the standby mode process, since the mode is already the standby mode, the processing corresponding to step S84 in FIG. 28 is omitted, and the process proceeds to step S111 (this is equivalent to changing the mode to the standby mode and starting a standby mode process in FIG. 28).

Figure 28:
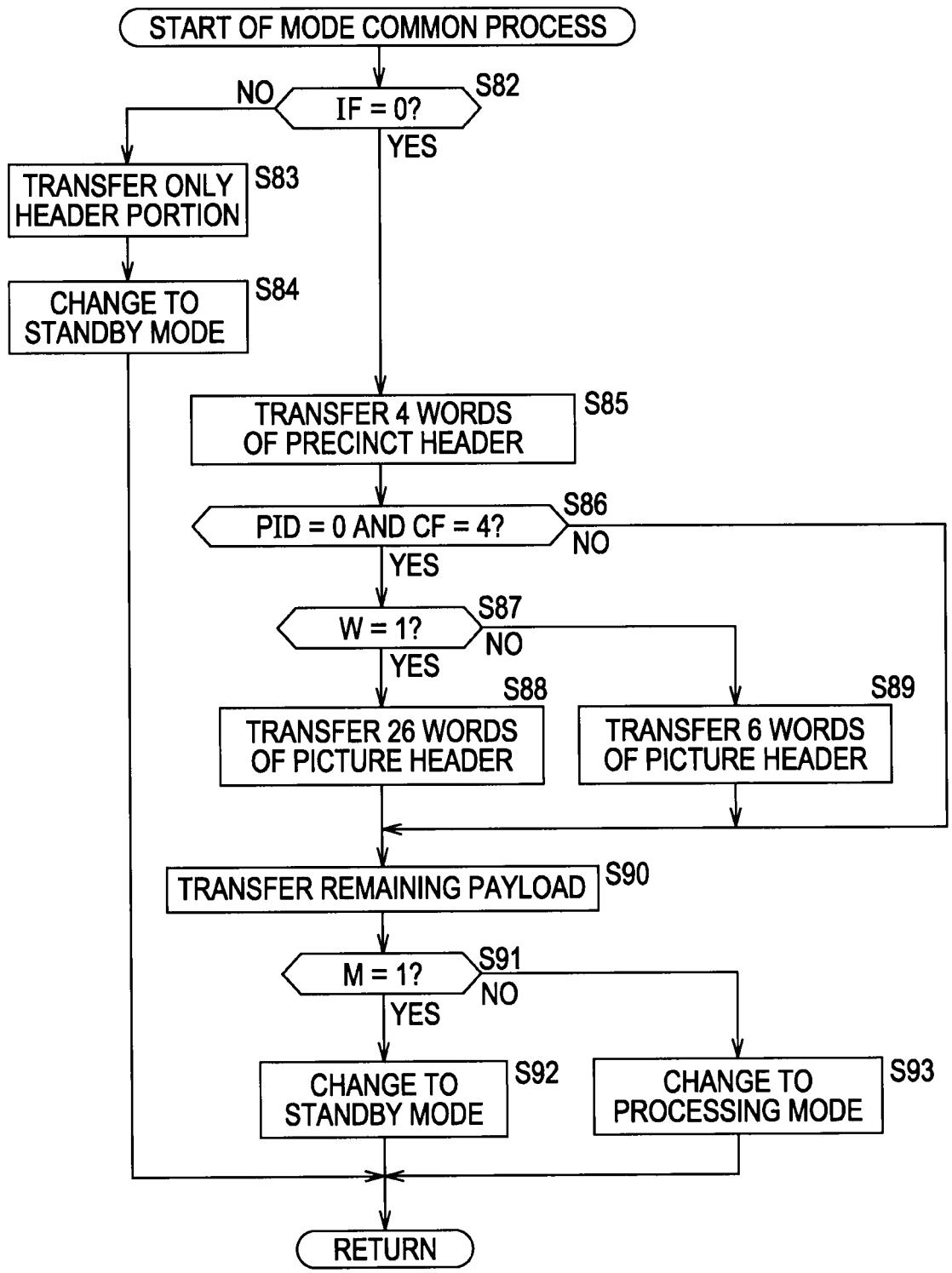
FIG. 28 is a flowchart for describing an exemplary flow of a mode common process.

Also, step S115 through step S121 correspond to step S85 through step S91 in FIG. 28, respectively. Note that, in the case of the standby mode process, since the mode is already the standby mode, when it is determined in step S121 that "M=1", the processing corresponding to step S92 in FIG. 28 is omitted, and the process proceeds to step S111 (this is equivalent to changing the mode to the standby mode and starting a standby mode process in FIG. 28).

Note that, when it is determined in step S121 that it is not "M=1", the process proceeds to step S122. This processing in step S122 corresponds to the processing in step S93 in FIG. 28. When the control mode changing unit 253 changes the control mode to the processing mode, the standby mode process ends.

Alternatively, when it is determined in step S112 that the sequence number is not continuous with the last received packet and that a packet loss has occurred, the process proceeds to step S123.

In step S123, the header information analysis unit 252 refers to the common header 231 and determines whether or not "SFF=1". When it is determined that "SFF=1", the process returns to step S113, and the process thereafter is repeated. Since a decoding process is performed on a precinct-by-precinct basis, if no packet loss is occurring in a precinct, that precinct is decodable. That is, when "SFF=1", it is indicated that a packet loss occurred not in a precinct to which the current packet to be processed belongs, but in a past precinct. In addition, in the case of the standby mode, accumulation of the encoded data in the past precinct using the decoding unit 133 is completed. Therefore, even when a packet loss occurs, if a newly obtained packet is the head packet of a new precinct, that packet loss is ignored, and the process returns to step S113.

When it is determined in step S123 that it is not "SFF=1", the process proceeds to step S124. In this case, the packet loss is occurring in the same precinct as the packet to be processed. Therefore, this precinct is undecodable, and hence, transfer of the payload is cancelled. That is, in step S124, the data supplying unit 256 under control of the control unit 254 discards the received packet without transferring it to the decoding unit 133.

As has been described above, since the mode is the standby mode, accumulation of encoded data in a past precinct using the decoding unit 133 is completed, and encoded data of a new precinct has not been accumulated yet. Therefore, in this case, since the decoding unit 133 need not discard the data, the depacketizing processing unit 132 need not give a notification of an error to the decoding unit 133.

In step S125, the control unit 254 under control of the control mode changing unit 253 changes, in a precinct in which an error occurred, the control mode to a loss mode which is a mode of waiting for a packet of the next precinct to be obtained. When the control mode is changed to the loss mode, the standby mode process ends.

As above, the depacketizing processing unit 132 can easily identify, on the basis of the values of SFF and M, the head packet and the tail packet of a precinct in the standby mode. Also, since the depacketizing processing unit 132 can identify the tail packet based on M, the depacketizing processing unit 132 can easily and suitably change the mode on a precinct-by-precinct basis. Accordingly, the depacketizing processing unit 132 can appropriately perform a depacketizing process of each precinct. Further, since the depacketizing processing unit 132 can identify the head packet based on SFF, the depacketizing processing unit 132 can figure out the updating of a precinct without checking the tail packet. That is, for example, even when a packet loss occurs, that is, even when the sequence number of the obtained packet is not continuous with the sequence number of the last obtained packet, if that packet is the head packet of a new precinct, the depacketizing processing unit 132 can start extracting a payload from the packet of the new precinct without waiting for the next precinct. That is, the depacketizing processing unit 132 can reduce an unnecessary waiting time.

Figure 30:
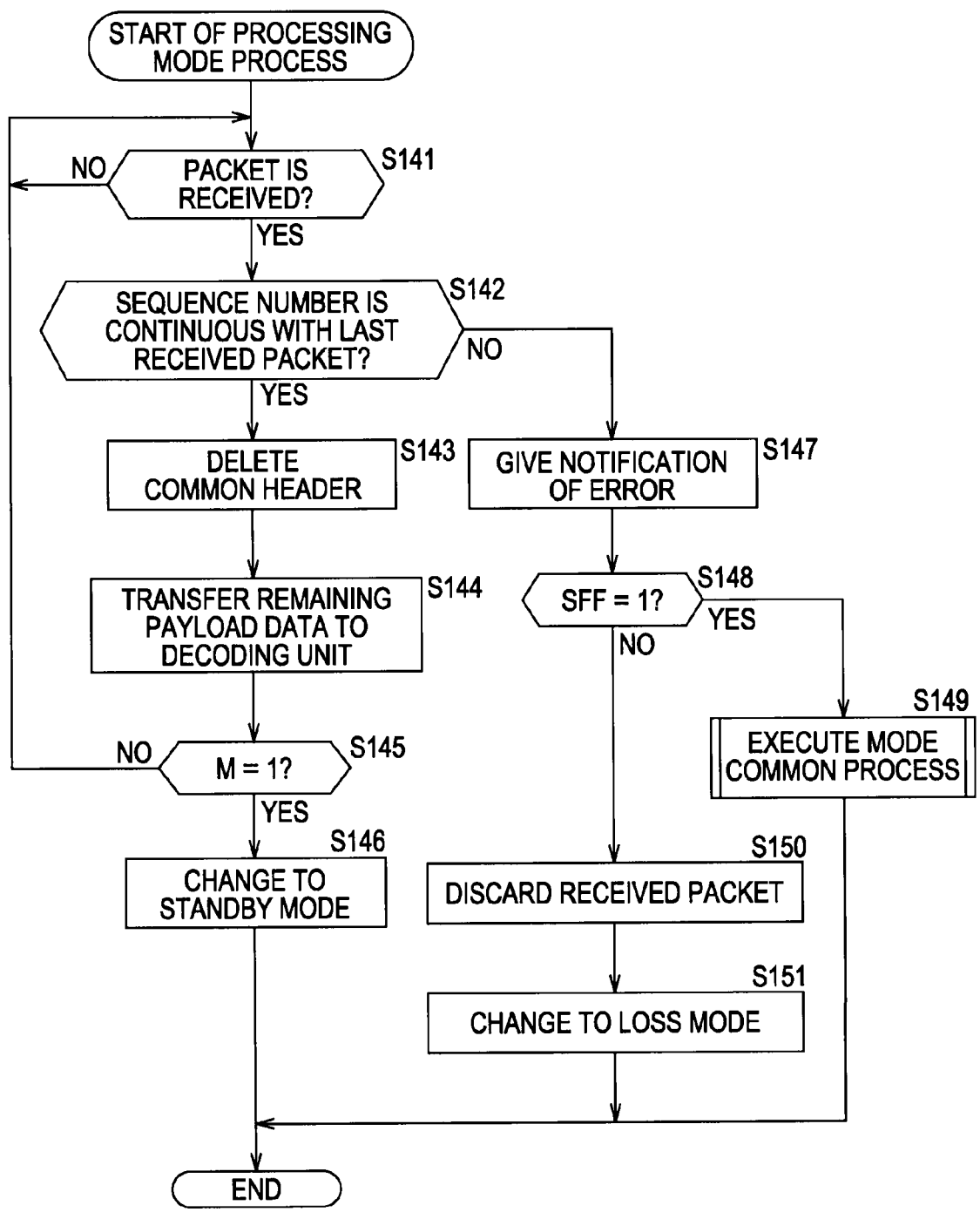
FIG. 30 is a flowchart for describing an exemplary flow of a processing mode process.

Next, an exemplary flow of a processing mode process will be described with reference to the flowchart in FIG. 30. This processing mode process is a process in the mode of waiting for a subsequent packet in the same precinct. When the control mode is changed to the processing mode by the control mode changing unit 253, the processing mode process starts.

When the processing mode process starts, the packet obtaining unit 251 determines in step S141 whether or not a packet is received and remains on standby until it is determined that a packet is received. When a packet is supplied from the receiving unit 131 and it is determined that the packet is received, the process proceeds to step S142.

In step S142, the header information analysis unit 252 refers to the RTP header 221 and determines whether or not the sequence number is continuous with the last received packet. When the sequence number is continuous with the last received packet and when it is determined that no packet loss is occurring, the process proceeds to step S143.

In step S143, the header supplying unit 255 under control of the control unit 254 deletes the common header 231 from the packet. In step S144, the data supplying unit 256 under control of the control unit 254 transfers the remaining payload data to the decoding unit 133. In step S145, the header information analysis unit 252 refers to the common header 231 and determines whether or not "M=1". When it is determined that it is not "M=1" and the packet is not the tail packet of a precinct, a subsequent packet exists in the same precinct. Thus, the process returns to step S141, and the process thereafter is repeated.

That is, while the process from step S141 through step S145 is repeated, the payload is extracted from each packet of the precinct and transferred to the decoding unit 133.

When it is determined in step S145 that "M=1" and that the packet to be processed is the tail packet of the precinct, the process proceeds to step S146, and the control unit 254 under control of the control mode changing unit 253 changes the control mode to the standby mode. When the control mode is changed to the standby mode, the processing mode process ends.

Alternatively, when it is determined in step S142 that the sequence number is not continuous with the last received packet and that a packet loss has occurred, the process proceeds to step S147.

In this case, since data in that precinct is being accumulated in the decoding unit 133, in step S147, the error notification unit 257 under control of the control unit 254 gives a notification of a transfer error to the decoding unit 133.

When the error notification ends, in step S148, the header information analysis unit 252 refers to the common header 231 and determines whether or not "SFF=1". When it is determined that "SFF=1", the process proceeds to step S149. In step S149, the control unit 254 executes the mode common process described with reference to the flowchart in FIG. 28. In this case, when the mode common process ends, the process returns to step S149 in FIG. 30, and the processing mode process ends.

Alternatively, when it is determined in step S148 that it is not "SFF=1", the process proceeds to step S150, and the data supplying unit 256 under control of the control unit 254 discards the received packet. In step S151, the control unit 254 under control of the control mode changing unit 253 changes the control mode to the loss mode. When the control mode is changed to the loss mode, the processing mode process ends.

As above, the depacketizing processing unit 132 can easily identify, on the basis of the values of SFF and M, the head packet and the tail packet of a precinct in the processing mode. Also, since the depacketizing processing unit 132 can identify the tail packet based on M, the depacketizing processing unit 132 can easily and suitably change the mode on a precinct-by-precinct basis. Accordingly, the depacketizing processing unit 132 can appropriately perform a depacketizing process of each precinct. Further, since the depacketizing processing unit 132 can identify the head packet based on SFF, the depacketizing processing unit 132 can figure out the updating of a precinct without checking the tail packet.

For example, when no packet loss is occurring, the depacketizing processing unit 132 extracts payloads from individual packets that are sequentially supplied, checks the tail packet on the basis of the value of M, and, when it is determined that the processing of that precinct ends, changes the mode to the standby mode.

When a packet loss occurs, the depacketizing processing unit 132 notifies the decoding unit 133 of the error. When the packet is not the head packet, that packet is discarded. The mode is changed to the loss mode so that the process waits for a packet of the next precinct to be checked. Note that, when "SFF=1", that is, when the packet obtained at the time of checking a packet loss is the head packet of a new precinct, the depacketizing processing unit 132 executes a mode common process so that, without changing the mode to the standby mode or the loss mode, that is, without waiting for a packet in the new precinct, the depacketizing processing unit 132 can start extracting a payload from that precinct. Thus, the payload extraction starting timing can be made earlier, and the delay time can be reduced.

Figure 31:
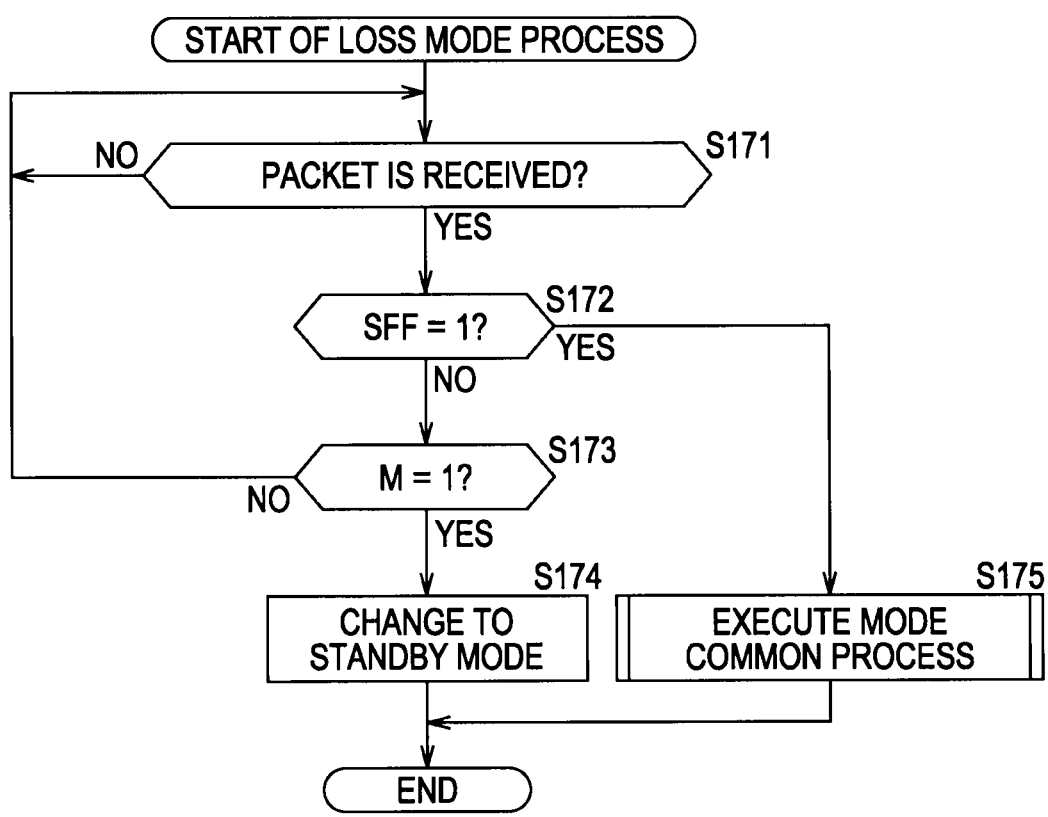
FIG. 31 is a flowchart for describing an exemplary flow of a loss mode process.

Next, an exemplary flow of a loss mode process will be described with reference to the flowchart in FIG. 31. This loss mode process is a process in the mode of waiting for, when a packet loss occurs in the same precinct, reception of a packet in the next precinct. When the control mode is changed to the loss mode by the control mode changing unit 253, the loss mode process starts.

When the loss mode process starts, the packet obtaining unit 251 determines in step S171 whether or not a packet is received and remains on standby until it is determined that a packet is received. When a packet is supplied from the receiving unit 131 and it is determined that the packet is received, the process proceeds to step S172.

In step S172, the header information analysis unit 252 refers to the common header 231 and determines whether or not "SFF=1". When it is determined that it is not "SFF=1" and that the packet is not the head packet of a precinct, the process proceeds to step S173, and the header information analysis unit 252 determines now whether or not "M=1". When it is determined that it is not "M=1", that is, when it is determined that the packet is not the tail packet of the precinct, the process returns to step S171, and the process thereafter is repeated.

When it is determined in step S173 that "M=1", the process proceeds to step S174, and the control unit 254 under control of the control mode changing unit 253 changes the control mode to the standby mode. When the control mode is changed to the standby mode, the loss mode process ends.

Alternatively, when it is determined in step S172 that "SFF=1", the control unit 254 executes the mode common process described with reference to the flowchart in FIG. 28. In this case, when the mode common process ends, the process returns to step S175 in FIG. 31, and the loss mode process ends.

That is, the depacketizing processing unit 132 can easily identify, on the basis of the values of SFF and M, the head packet and the tail packet of a precinct in the loss mode as well. Also, since the depacketizing processing unit 132 can identify the tail packet based on M, the depacketizing processing unit 132 can easily and suitably change the mode on a precinct-by-precinct basis. Accordingly, the depacketizing processing unit 132 can appropriately perform a depacketizing process of each precinct. Further, since the depacketizing processing unit 132 can identify the head packet based on SFF, the depacketizing processing unit 132 can figure out the updating of a precinct without checking the tail packet.

In the case of the loss mode, the depacketizing processing unit 132 is basically on standby while obtaining packets. When the tail packet is detected on the basis of the value of M, the mode is changed to the standby mode, and the depacketizing processing unit 132 is prepared for obtaining the head packet of the next precinct. Also, when the head packet is detected on the basis of the value of SFF, the depacketizing processing unit 132 executes the mode common process, thereby starting extracting a payload from that precinct.

Accordingly, the depacketizing processing unit 132 can make the payload extraction starting timing earlier and reduce the delay time.

By performing a depacketizing process while switching the control mode according to the situation as above, with a depacketizing buffer being provided, the depacketizing processing unit 132 can appropriately perform sequential processing on the basis of header information of supplied packets without accumulating the packets on a precinct-by-precinct basis. The depacketizing processing unit 132 can easily and quickly perform a depacketizing process. Also, when a packet loss occurs, the depacketizing processing unit 132 gives an error notification according to need. Thus, the decoding unit 133 can refrain from executing an unnecessary decoding process and alleviate the load of a decoding process.

Further, on the basis of the value of IF, the depacketizing processing unit 132 can easily refrain from supplying an undecodable, unnecessary payload to the decoding unit 133. Accordingly, the load of a decoding process on the decoding unit 133 can be alleviated.

The decoding unit 133 performs, in response to the processing performed by the depacketizing processing unit 132 as above, a decoding process of encoded data supplied from the depacketizing processing unit 132. Therefore, the decoding unit 133 executes a decoding control process of controlling execution of a decoding process. An exemplary flow of a decoding control process will be described with reference to the flowchart in FIG. 32. This decoding control process is executed from when supplying of encoded data starts to when supplying of encoded data ends.

In step S191, the data obtaining unit 355 obtains encoded data supplied from the depacketizing processing unit 132. In step S192, the buffer unit 361 accumulates the encoded data. In step S193, the control information obtaining unit 351 obtains control information. In step S194, the decoding control unit 352 determines, on the basis of the control information obtained by the control information obtaining unit 351, whether or not the data obtained by the data obtaining unit 355 is the payload of the head packet of the precinct. When it is determined that the data is the payload of the head packet of the precinct, the process proceeds to step S195. In step S195, the decoding control unit 352 determines, on the basis of the control information obtained by the control information obtaining unit 351, whether or not items of data obtained by the control information obtaining unit 351 and accumulated in the buffer unit 361 are continuous. When it is determined that no packet loss is occurring and items of data obtained by the data obtaining unit 355 and accumulated in the buffer unit 361 are continuous, the process returns to step S191, and the process from step S191 onward is repeated on the next item of encoded data.

Alternatively, when it is determined in step S195 that a packet loss is occurring and items of data are not continuous, the process proceeds to step S196. In step S196, the decoding control unit 352 controls the entropy decoding unit 362 to start a complementation process. The entropy decoding unit 362 performs a decoding process on a precinct-by-precinct basis. When data of a precinct is lacking, the entropy decoding unit 362 performs a complementation process using data of another precinct or the like.

Therefore, when the decoding control unit 352 obtains the head packet which is not continuous with the last obtained packet, the decoding control unit 352 controls the entropy decoding unit 362 to execute a complementation process of the last precinct. When the complementation process ends, the process proceeds to step S197.

In step S197, the decoding control unit 352 determines whether or not to end the decoding control process. When it is determined not to end the decoding control process, the process returns to step S191, and the process thereafter is repeated. Alternatively, when it is determined in step S197 to end the decoding control process, the decoding control process is ended.

Alternatively, when it is determined in step S194 that the data obtained by the data obtaining unit 355 is not the payload of the head packet of the precinct, the process proceeds to step S198, and the decoding control unit 352 determines whether or not the data obtained by the data obtaining unit 355 is the payload of the tail packet of the precinct. When it is determined that the data is the payload of the tail packet of the precinct, the process proceeds to step S199, and the decoding control unit 352 controls the entropy decoding unit 362 to start a decoding process of the encoded data accumulated in the buffer unit 361. When the processing in step S199 ends, the process returns to step S197.

Alternatively, when it is determined in step S198 that the data obtained by the data obtaining unit 355 is not the payload of the tail packet of the precinct, the process returns to step S197.

Figure 32:
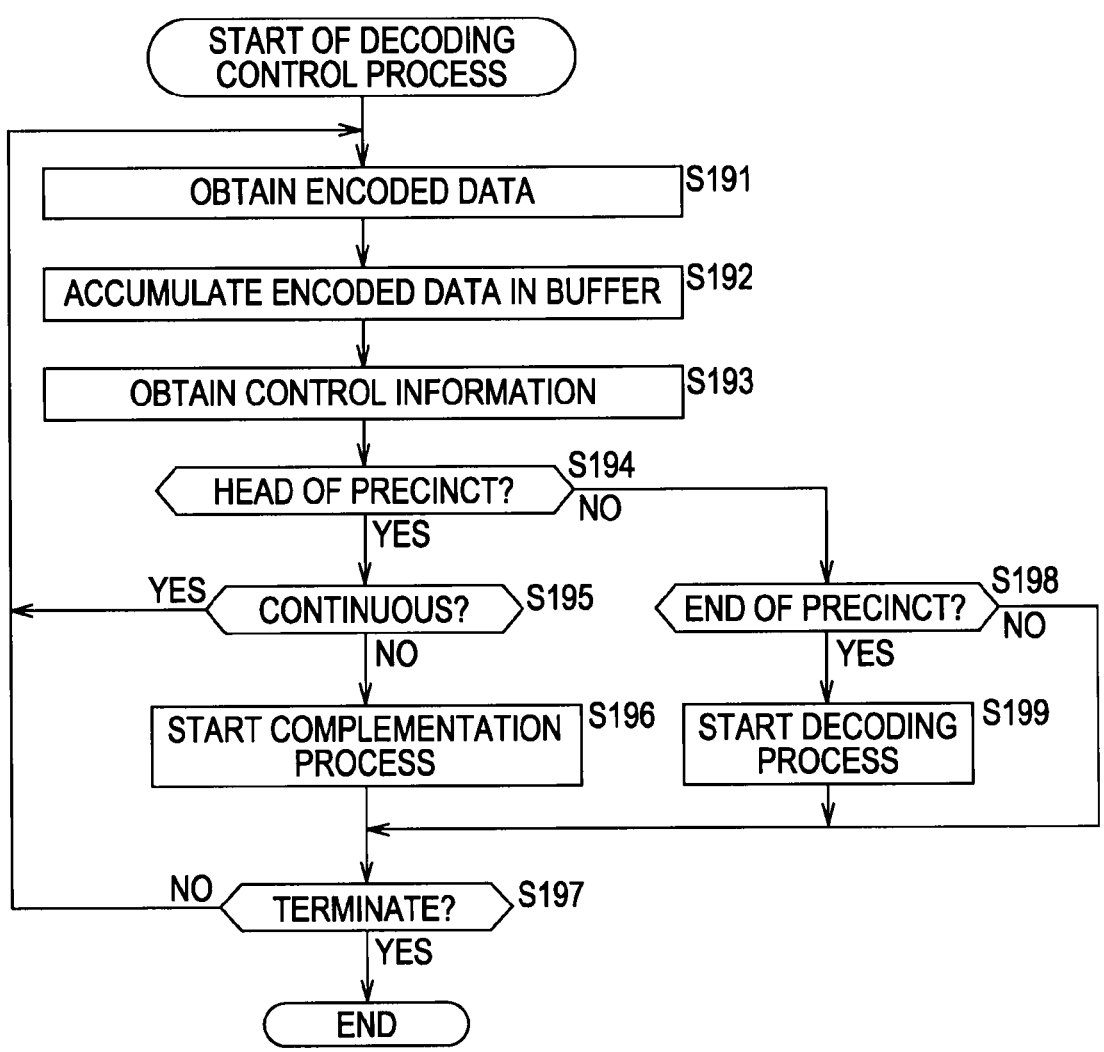
FIG. 32 is a flowchart for describing an exemplary flow of a decoding control process.
Figure 33:
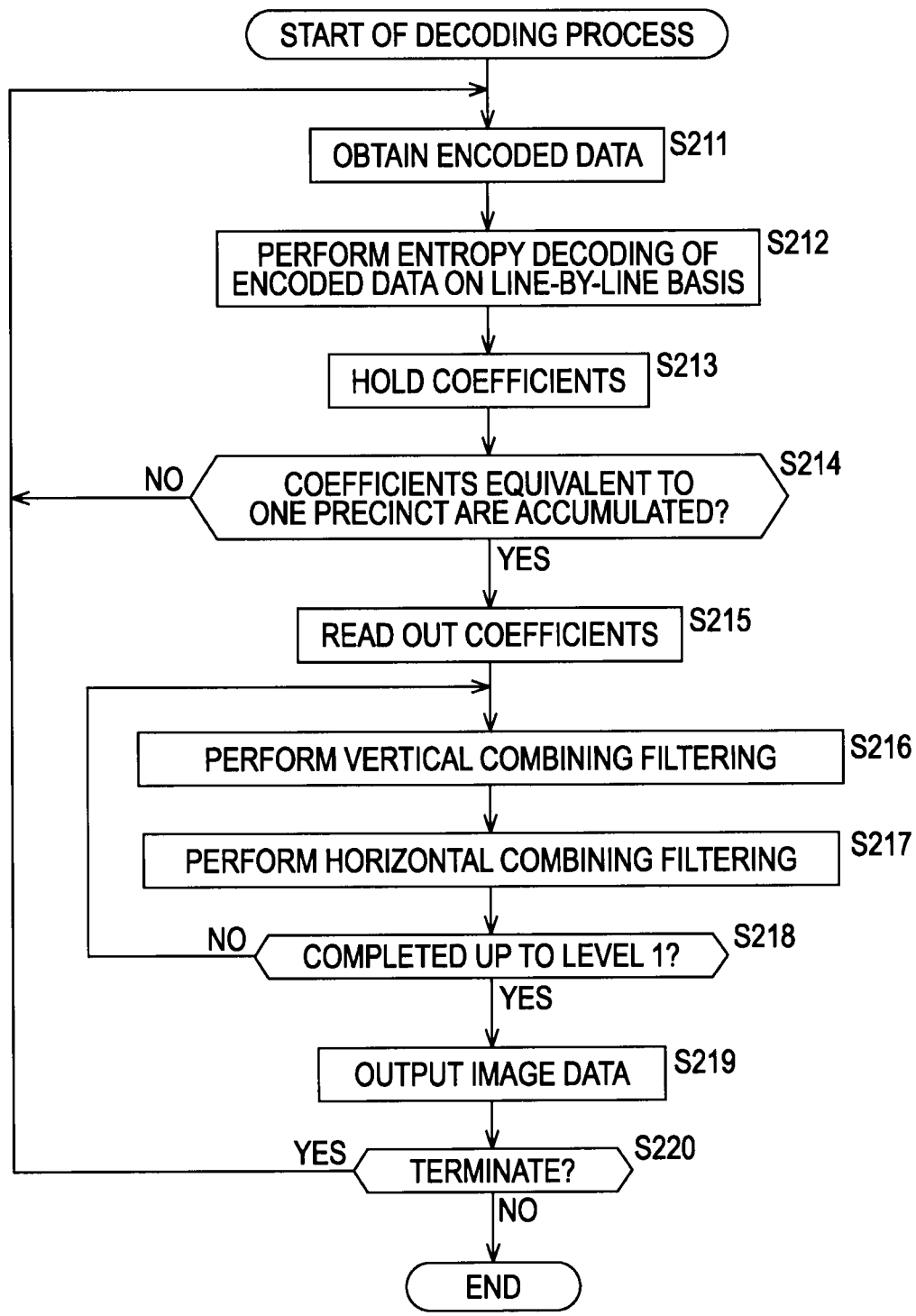
FIG. 33 is a flowchart for describing an exemplary flow of a decoding process.

Next, an exemplary flow of the decoding process started in step S199 in FIG. 32 will be described with reference to the flowchart in FIG. 33. This decoding process is controlled by the decoding control process in FIG. 32 and executed on a precinct-by-precinct basis.

When the decoding process starts, the entropy decoding unit 362 obtains in step S211 the encoded data accumulated in the buffer unit 361 and performs in step S212 entropy decoding of the encoded data on a line-by-line basis. In step S213, the buffer unit 361 holds the decoded, obtained coefficient data. In step S214, the inverse wavelet transform unit 363 determines whether or not coefficient data equivalent to one precinct is accumulated in the buffer unit 361. When it is determined that coefficient data equivalent to one precinct is not accumulated in the buffer unit 361, the process returns to step S211, and the process thereafter is executed. The inverse wavelet transform unit 363 remains on standby until coefficient data equivalent to one precinct is accumulated in the buffer unit 361.

When it is determined in step S214 that coefficient data equivalent to one precinct is accumulated in the buffer unit 361, the inverse wavelet transform unit 363 advances the process to step S215 and reads out the coefficient data equivalent to one precinct, which is held in the buffer unit 361.

Then, for the read out coefficient data, the inverse wavelet transform unit 363 performs in step S216 a vertical combining filtering process of performing a combining filtering process of the coefficient data arranged in the screen vertical direction and performs in step S217 a horizontal combining filtering process of performing a combining filtering process of the coefficient data arranged in the screen horizontal direction. In step S218, it is determined whether the combining filtering processes are completed up to level 1 (level in the case where the value of the decomposition level is "1"), that is, whether inverse transform is performed up to the state prior to wavelet transform. When it is determined that the level does not reach level 1, the process returns to step S216, and the filtering processes in step S216 and step S217 are repeated.

When it is determined in step S218 that the inverse transform process is completed up to level 1, the inverse wavelet transform unit 363 advances the process to step S219 and outputs image data obtained by performing the inverse transform process to the outside.

In step S220, the entropy decoding unit 362 determines whether or not to end the decoding process. When it is determined not to end the decoding process, the process returns to step S211, and the process thereafter is repeated. Alternatively, when it is determined in step S220 to end the decoding process since the precinct ends or the like, the entropy decoding unit 362 ends the decoding process.

In the case of a conventional inverse wavelet transform method, firstly a horizontal combining filtering process is performed in the screen horizontal direction on the whole coefficients at the decomposition level to be processed, and then a vertical combining filtering process is performed in the screen vertical direction on the whole coefficients at the decomposition level to be processed. That is, every time each combining filtering process is performed, it is necessary to hold the result of the combining filtering process in the buffer. On that occasion, the buffer needs to hold the combining filtering result at the decomposition level at that point of time and all the coefficients at the next decomposition level. This means that a large memory capacity is necessary (the amount of data to be held is large).

Also, in this case, image data output is not performed until the whole inverse wavelet transform in the picture (field in the case of an interlace system) ends, and hence, a delay time from input to output increases.

In contrast, in the case of the inverse wavelet transform unit 363 in the decoding unit 133, as has been described above, a vertical combining filtering process and a horizontal combining filtering process are continuously performed up to level 1 on a precinct-by-precinct basis. Thus, compared with the conventional method, the amount of data needed to be buffered at a time (simultaneously) is small, and the amount of memory of the buffer that should be prepared can be significantly reduced. Also, since combining filtering processes (inverse wavelet transform processes) are performed up to level 1, items of image data can be sequentially output (on a precinct-by-precinct basis) before the entire image data in the picture is obtained, and the delay time can be significantly reduced, compared with the conventional method.

Next, an exemplary flow of an error notification handling process which is a process in response to an error notification from the depacketizing processing unit 132 and performed in the decoding unit 133 in parallel to the decoding control process in FIG. 32 will be described with reference to the flowchart in FIG. 34.

Figure 34:
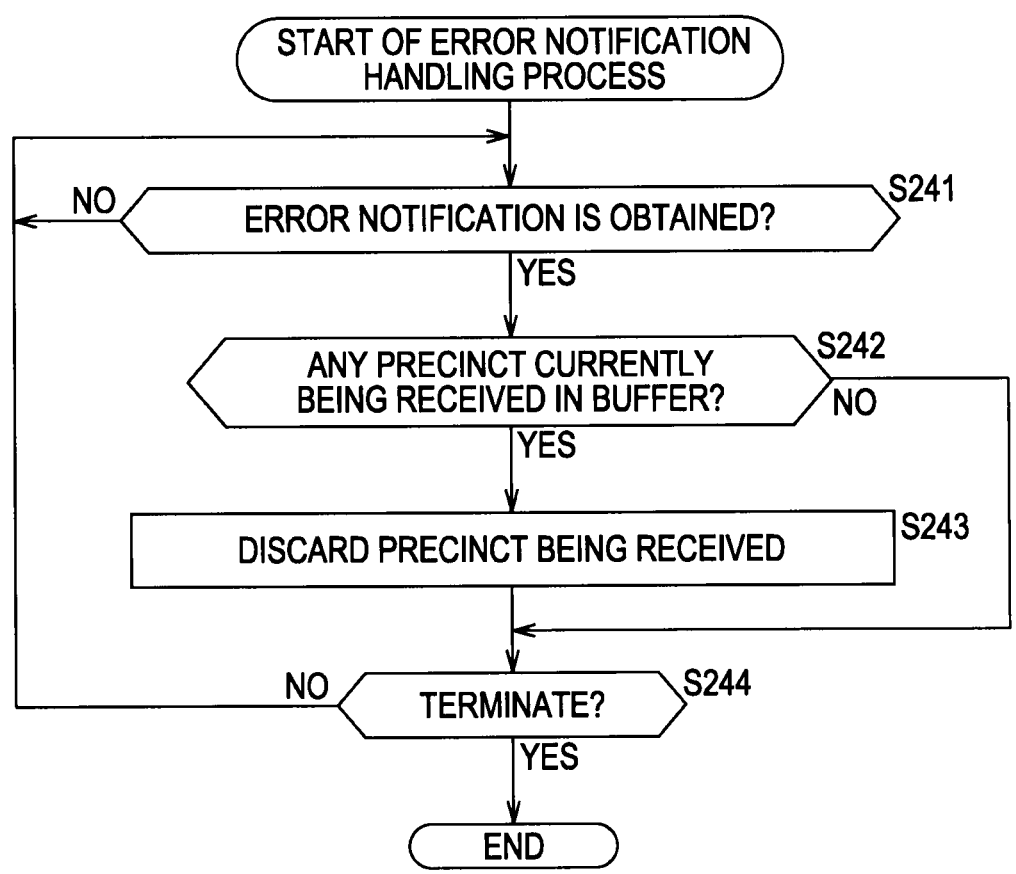
FIG. 34 is a flowchart for describing an exemplary flow of an error notification handling process.

In FIG. 34, when an error notification handling process starts, the error notification obtaining unit 356 determines in step S241 whether or not an error notification is obtained from the depacketizing processing unit 132. The process is on standby until it is determined that an error notification is obtained. When it is determined in step S241 that an error notification is obtained, the process proceeds to step S242. In step S242, the discarding processing unit 357 determines whether or not a precinct currently being received (encoded data belonging to the latest precinct in which a packet loss occurred) exists in the buffer unit 361.

When it is determined that a precinct currently being received exists in the buffer unit 361, the process proceeds to step S243. In step S243, the discarding processing unit 357 discards a slice being received, which is accumulated in the buffer unit 361. When the processing in step S243 ends, the process proceeds to step S244. Alternatively, when it is determined in step S242 that a slice currently being received does not exist in the buffer unit 361, the processing in step S243 is omitted, and the process proceeds to step S244.

In step S244, the discarding processing unit 357 determines whether or not to end the error notification handling process. When the depacketizing process continues and it is determined not to end the error notification handling process as well, the process returns to step S241, and the process thereafter is repeated. Alternatively, when it is determined in step S244 to end the error notification handling process, the error notification handling process is ended.

As above, since the decoding unit 133 discards encoded data of a slice in which a packet loss occurred in response to an error notification from the depacketizing processing unit 132, the decoding unit 133 can be set not to perform an unnecessary decoding process. Since an appropriate decoding process can be performed as above, the decoding unit 133 can easily and quickly perform a decoding process. The load of a decoding process can be alleviated, and the circuit dimensions and cost can be reduced.

Figure 35:
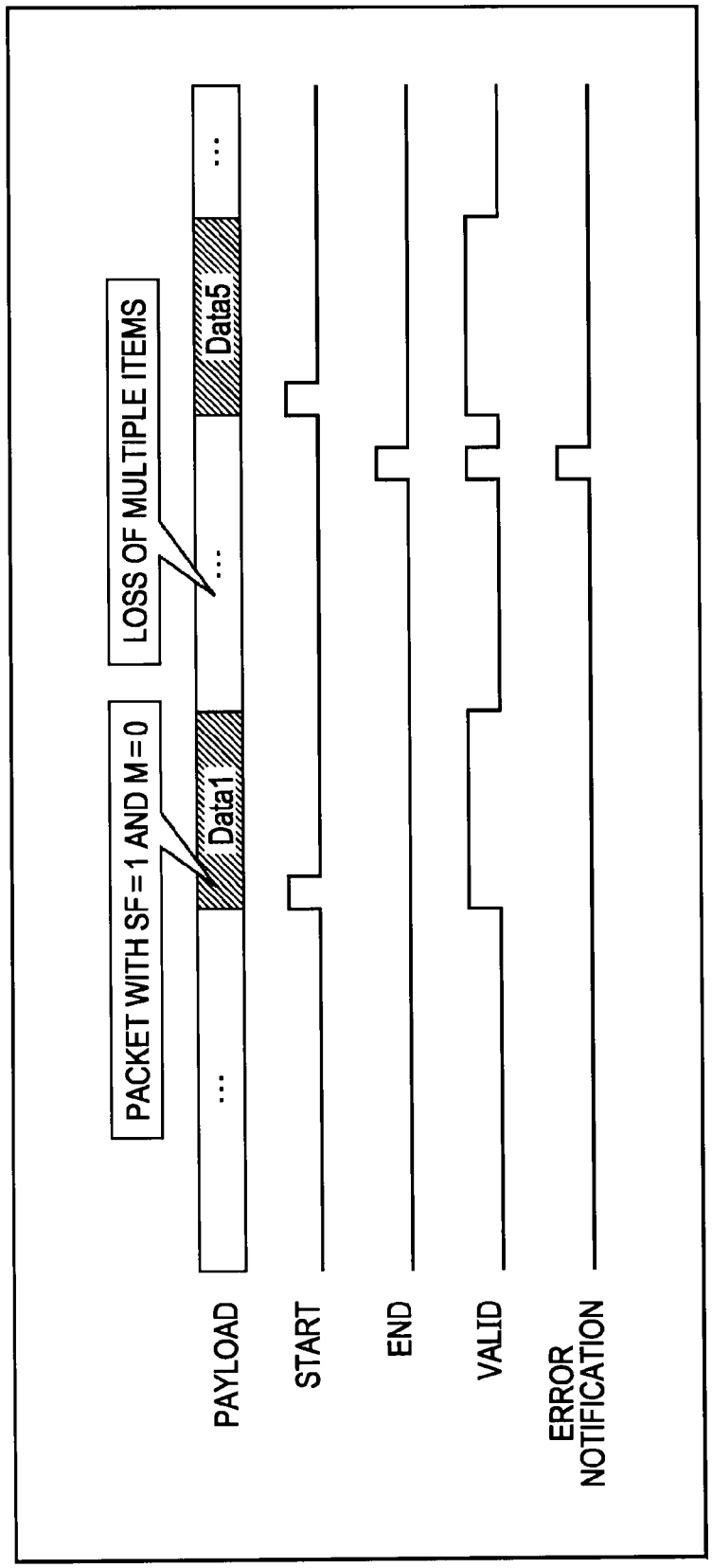
FIG. 35 is a schematic diagram describing an example of the manner of error notification handling.

An exemplary manner of error notification performed by the depacketizing processing unit 132 is shown in FIG. 35.

In FIG. 35, it is assumed that the depacketizing processing unit 132 and the decoding unit 133 are connected to each other via six signal lines. The depacketizing processing unit 132 supplies, to the decoding unit 133, encoded data (Data1) extracted by deleting an RTP header and the like from a received packet 1. At this time, when the encoded data (Data1) is at the head of a new slice, the control signal supplying unit 258 in the depacketizing processing unit 132, which is under control of the control unit 254, gives a notification of start information (START).

When the next arrived packet is a packet 5, it is determined that there was a packet loss. At this time, since Data1, which is part of a precinct, has already been transmitted to the decoding unit 133, the error notification unit 257 in the depacketizing processing unit 132, which is under control of the control unit 254, performs error notification. Also, since the packet 5 is "SFF=1", the control signal supplying unit 258 in the depacketizing processing unit 132, which is under control of the control unit 254, gives a notification of start information (START).

Note that it has been described as above that, when the data size of a precinct is greater than the packet size, the packetizing processing unit 122 generates a plurality of packets by splitting the data and, otherwise, the packetizing processing unit 122 generates one packet as above. Alternatively, when the data size of a precinct is less than the packet size, items of data in a plurality of precincts may be grouped as one packet.

Figure 36:
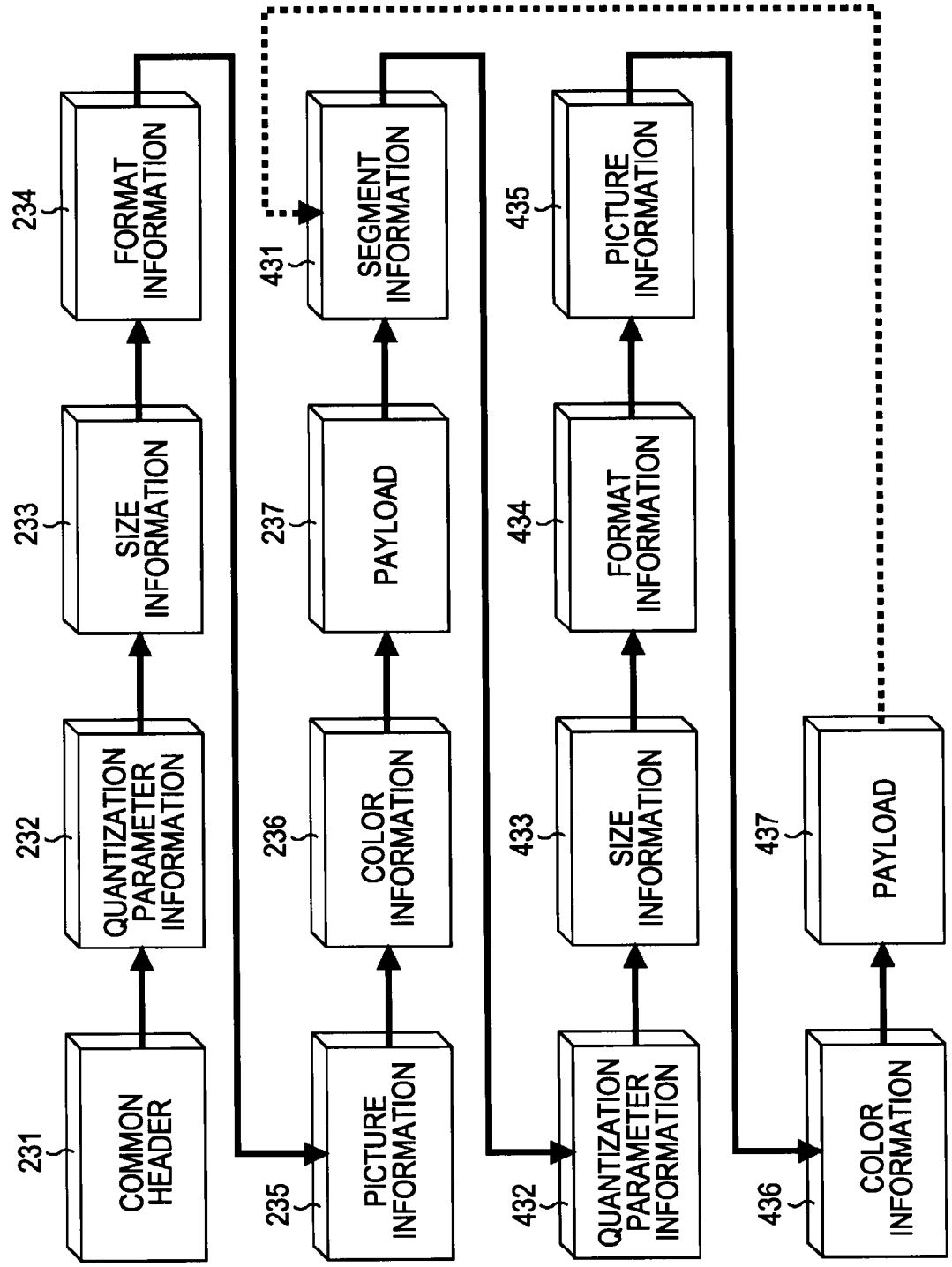
FIG. 36 is a diagram showing another exemplary structure of the RTP payload header.

In that case, the structure of a payload header is such that, as shown in FIG. 36 for example, header information and payloads are sequentially arranged. In the case of the example in FIG. 36, after the common header 231 through the payload 237 which are items of data in the first precinct, segment information 431, quantization parameter information 432, size information 433, format information 434, picture information 435, color information 436, and a payload 437 which are items of data in the second precinct are configured. Thereafter, items of data in the third precinct and so forth are arranged.

The segment information 431 is a common header of the second precinct and, as shown in FIG. 37, basically includes information similar to the common header 231. That is, the segment information 431 is generated on the basis of the precinct header 171. Note that, when data in another precinct exists after this precinct, the value of NF in the common header 231 (similarly in the segment information 431) is set to "1".

An exemplary flow of a packetizing process in this case will be described with reference to the flowchart in FIG. 38.

Figure 38:
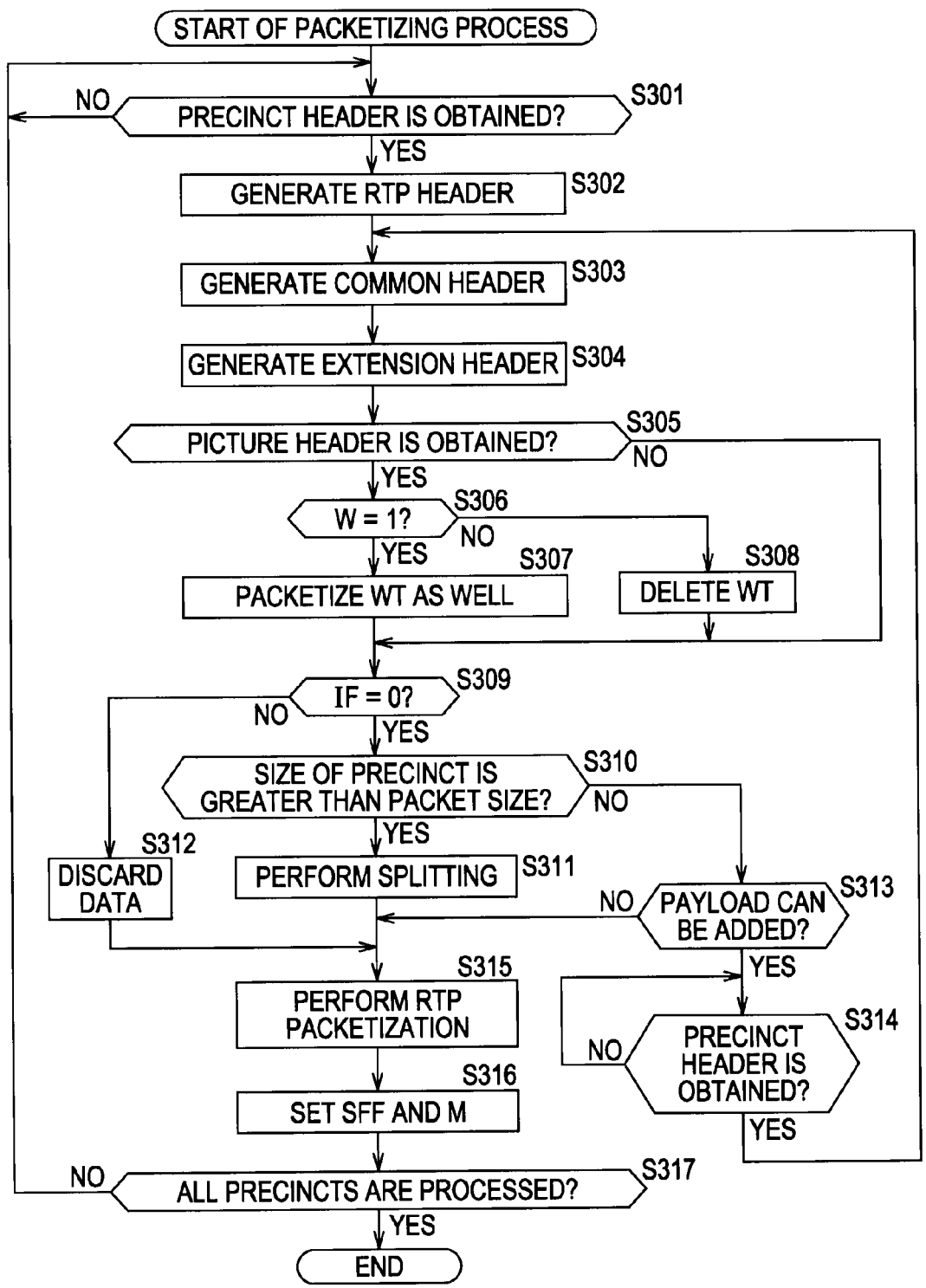
FIG. 38 is a flowchart for describing another exemplary flow of the packetizing process.

As shown in FIG. 38, the packetizing process in this case is also basically executed similarly to the case described with reference to FIG. 26. Each processing in step S301 through step S312 is executed similarly to each processing in step S31 through step S42 in FIG. 26, and each processing in step S315 through step S317 is executed similarly to each processing in step S43 through step S45 in FIG. 26.

Note that, when it is determined in step S310 that the size of a precinct is not greater than the packet size, the size checking unit 207 in the packetizing processing unit 122 determines whether or not a new payload can be added to the same packet. When it is determined that the packet size has some room and accordingly a payload can be added, the process proceeds to step S314, and the data obtaining unit 201 determines whether or not a precinct header is obtained and remains on standby until it is determined that a precinct header is obtained. When it is determined that a precinct header is obtained, the process returns to step S303, and the process thereafter is repeated on a precinct to be added to the packet. That is, a loop process from step S303 through step S310, step S313, and step S314 is repeated, thereby sequentially adding precincts to the same packet until the total data size of the encoded data becomes greater than the packet size.

Note that, when it is determined in step S315 that a payload cannot be added to the packet, the process returns to step S313, and the process thereafter is executed. That is, in this case, one packet is generated with encoded data in one precinct.

By performing a packetizing process as above, data of a plurality of precincts can be included in one packet.

Figure 39:
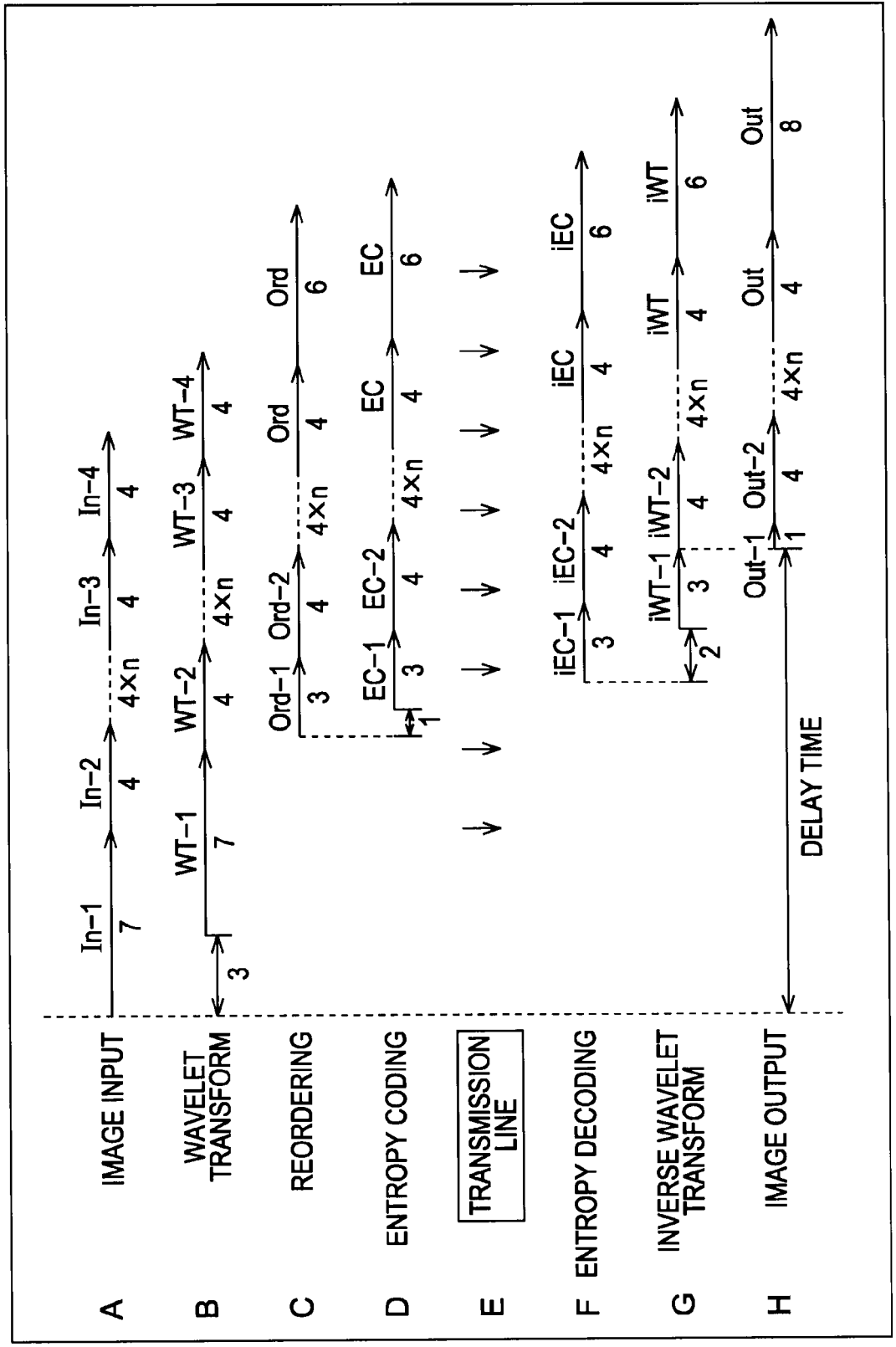
FIG. 39 is an outline diagram showing the outline of an example of the manner of parallel operation performed by individual elements of a sending apparatus and a receiving apparatus.

Various processes executed by the individual units of the transmission system 100 shown in FIG. 1 as above are executed as appropriate in parallel, such as shown in FIG. 39.

FIG. 39 is a diagram showing the outline of an example of the parallel operation of individual elements of processes executed by the individual units of the transmission system 100 shown in FIG. 1. This FIG. 39 corresponds to FIG. 6 described above. A first wavelet transform WT-1 (B in FIG. 39) is applied to an input In-1 (A in FIG. 39) of image data at the wavelet transform unit 150 (FIG. 2). As has been described with reference to FIG. 5, this first wavelet transform WT-1 is started at a point of time at which the first three lines are input, and a coefficient C1 is generated. That is, a delay equivalent to three lines occurs from the input of the image data In-1 until the start of the wavelet transform WT-1.

The generated coefficient data is stored in the coefficient reordering buffer unit 152 (FIG. 2). Subsequently, the wavelet transform is applied to the input image data, and, when the first process is completed, the process directly proceeds to a second wavelet transform WT-2.

In parallel to an input of image data In-2 for the second wavelet transform WT-2 and a process of the second wavelet transform WT-2, reordering Ord-1 of three, the coefficient C1, the coefficient C4, and the coefficient C5, is executed by the coefficient reordering unit 153 (FIG. 2) (C in FIG. 39).

Note that the delay from the completion of the wavelet transform WT-1 until the start of the reordering Ord-1 is a delay based on an apparatus or system configuration, such as a delay involved in transmission of a control signal for instructing the coefficient reordering unit 153 to perform a reordering process, a delay required to start a process performed by the coefficient reordering unit 153 in response to the control signal, and a delay required for program processing, and is not an essential delay involved in an encoding process.

Items of coefficient data are read out from the coefficient reordering buffer unit 152 in the order in which they are finished being reordered and are supplied to the entropy coding unit 155 (FIG. 2), and entropy coding EC-1 thereof is performed (D in FIG. 39). This entropy coding EC-1 can be started without waiting for completion of the reordering of all the three, the coefficient C1, the coefficient C4, and the coefficient C5. For example, at a point of time at which reordering of one line based on the coefficient C5 which is output first is completed, entropy coding of the coefficient C5 can be started. In this case, a delay from the start of the process of the reordering Ord-1 to the start of the process of the entropy coding EC-1 is equivalent to one line.

Predetermined signal processing is applied to the encoded data of which the entropy coding EC-1 by the entropy coding unit 155 has been completed, and then transmitted via the line 110 to the receiving apparatus 103 (E in FIG. 39). At this time, the encoded data is packetized and transmitted.

In succession to input of image data equivalent to seven lines with the first process, items of image data up to the lower end line of the screen are sequentially input to the encoding unit 121 in the sending apparatus 102. In accordance with an input In-n (n is 2 or greater) of image data, the encoding unit 121 performs wavelet transform WT-n, reordering Ord-n, and entropy coding EC-n every four lines, as described above. Reordering Ord and entropy coding EC in the encoding unit 121 in response to the last process are performed on six lines. These processes are performed in parallel in the encoding unit 121, as illustrated in A in FIG. 39 through D in FIG. 39.

A packet of encoded data encoded by the encoding unit 121 with the entropy coding EC-1 is transmitted to the receiving apparatus 103, depacketizing-processed and the like, and subsequently supplied to the decoding unit 133. The entropy decoding unit 362 in the decoding unit 133 sequentially performs decoding iEC-1 of entropy coding of the encoded data encoded with the entropy coding EC-1, which is supplied thereto, and restores the coefficient data (F in FIG. 39). Items of restored coefficient data are sequentially stored in the buffer unit 361. When as many items of coefficient data as needed to perform inverse wavelet transform are stored in the buffer unit 361, the inverse wavelet transform unit 363 reads out the coefficient data from the buffer unit 361 and performs inverse wavelet transform iWT-1 using the read out coefficient data (G in FIG. 39).

As has been described with reference to FIG. 5, the inverse wavelet transform iWT-1 performed by the inverse wavelet transform unit 363 can be started at a point of time at which the coefficient C4 and the coefficient C5 are stored in the buffer unit 361. Therefore, a delay from the start of the decoding iEC-1 performed by the entropy decoding unit 362 to the start of the inverse wavelet transform iWT-1 performed by the inverse wavelet transform unit 363 is equivalent to two lines.

When the inverse wavelet transform iWT-1 equivalent to three lines of the first wavelet transform is completed in the inverse wavelet transform unit 363, an output Out-1 of image data generated with the inverse wavelet transform iWT-1 is performed (H in FIG. 39). In the output Out-1, as has been described using FIG. 5 and FIG. 6, image data of the first line is output.

In succession to input of encoded coefficient data equivalent to three lines with the first process performed by the encoding unit 121, items of coefficient data encoded with entropy coding EC-n (n is 2 or greater) are sequentially input to the decoding unit 133. The decoding unit 133 performs entropy decoding iEC-n and inverse wavelet transform iWT-n of the input coefficient data every four lines and sequentially performs an output Out-n of image data restored with the inverse wavelet transform iWT-n, as has been described above. Entropy decoding iEC and inverse wavelet transform iWT in response to the last time performed by the encoding unit 121 are performed on six lines, and an output Out outputs eight lines. These processes are performed in parallel in the decoding unit 133, as illustrated in F in FIG. 39 through H in FIG. 39.

By performing the individual processes in the encoding unit 121 and the decoding unit 133 in parallel in order from the upper portion to the lower portion of the screen as has been described above, an image compression process and an image decoding process can be performed with a shorter delay.

Referring to FIG. 39, a delay time from an image input to an image output in the case where wavelet transform up to the decomposition level=2 is performed using a 5×3 filter is calculated. A delay time from when image data of the first line is input to the encoding unit 121 to when the image data of the first line is output from the decoding unit 133 is the sum total of the following individual elements. Note that a delay that is different depending on the system configuration, such as a delay in transmission line or a delay involved in the actual processing timing of each unit of the apparatus, is excluded here.

(1) Delay D_WT from the first line input to the completion of the wavelet transform WT-1 equivalent to seven lines (2) Time D_Ord involved in coefficient reordering Ord-1 equivalent to three lines (3) Time D_EC involved in entropy coding EC-1 equivalent to three lines (4) Time D_iEC involved in entropy decoding equivalent to three lines (5) Time D_iWT involved in inverse wavelet transform iWT-1 equivalent to three lines Referring to FIG. 39, a calculation of delay due to the individual elements described above is attempted. The delay D_WT in (1) is a time equivalent to ten lines. The time D_Ord in (2), the time D_EC in (3), the time D_iEC in (4), and the time D_iWT in (5) are each equivalent to three lines. Also, the entropy coding EC-1 can be started in the encoding unit 121 one line after the reordering Ord-1 is started. Similarly, the inverse wavelet transform iWT-1 can be started in the decoding unit 133 two lines after the entropy decoding iEC-1 is started. Also, the entropy decoding iEC-1 can start a process at a point of time at which encoding equivalent to one line is completed in the entropy coding EC-1.

Therefore, in the example in FIG. 39, a delay time from the input of the image data of the first line to the encoding unit 121 to the output of the image data of the first line from the decoding unit 133 is equivalent to 10+1+1+2+3=17 lines.

Using a more specific example, a delay time will be considered. In the case where input image data is an interlace video signal based on HDTV (High Definition Television), for example, one frame is configured of a resolution of 1920 pixels×1080 lines, and one field is of 1920 pixels×540 lines. Therefore, when a frame frequency is assumed to be 30 Hz, 540 lines serving as one field are input to the encoding unit 121 during a time of 16.67 msec (=1 sec/60 fields).

Therefore, a delay time involved in an input of image data equivalent to seven lines is 0.216 msec (=16.67 msec×7/540 lines), which is a very short time with respect to an updating time of one field, for example. Also, with regard to the sum total of the above-described delay D_WT in (1), time D_Ord in (2), time D_EC in (3), time D_iEC in (4), and time D_iWT in (5) as well, the number of lines to be processed is small, and accordingly a delay time is extremely reduced. If the elements for performing the individual processes are realized by hardware, the processing time can be further reduced.

Here, SFF and M flag information will be described.

As has been described above, in the transmission system 100, since the tolerance for an increase in delay time is low, it has been demanded to transmit data as efficiently as possible and to perform necessary processing in an efficient manner.

Hitherto, systems that perform encoding and decoding in increments of a predetermined data unit exist. When packetizing and transmitting encoded data, as in the transmission system 100 in FIG. 1, some split the encoded data in the data unit into items of data, and packetize and transmit the individual items of data. Note that, in the case of a conventional system, since the tolerance for a delay time is large, packets equivalent to the data unit are accumulated in a depacketizing process, and a depacketizing process is performed in increments of the data unit. Accordingly, only the entire encoded data equivalent to the data unit can be supplied to the decoding unit and decoded.

However, with this method, the need for buffering arises both in the depacketizing processing unit and in the encoding unit, which is not desirable in the transmission system 100 demanded to reduce the delay time.

Therefore, as has been described above, using the fact that processing of items of transmitted encoded data can be performed in the individual units in the order in which they are supplied, the depacketizing processing unit 132 sequentially extracts payload data from received packets and supplies it to the decoding unit 133 without accumulating it. The decoding unit 133 starts a decoding process every time the sequentially supplied encoded data equivalent to a precinct is accumulated. Accordingly, the number of times the encoded data is buffered can be reduced, and the transmission system 100 can further reduce the delay time.

SFF and M are flag information indicating the head of a precinct and the end of a precinct. On the basis of the flag information, the depacketizing processing unit 132 can detect the head and the end of a precinct and notify the decoding unit 133 thereof. On the basis of the notification from the depacketizing processing unit 132, the decoding unit 133 can figure out a precinct break and start a decoding process on a precinct-by-precinct basis.

In order to do this only, only M which indicates the end of a precinct is sufficient. Let us say that there is a mixture of a packet obtained by splitting a precinct into a plurality of items and a packet that is not split. If there is flag information indicating that the splitting was performed, identification of these packets is possible.

Actually, however, the event that the receiving unit 131 fails to receive (loses) a packet is conceivable as well. When a packet loss occurs as above, since the depacketizing processing unit 132 performs no buffering of a packet, the processing must be changed from that in the normal time. For example, when a packet loss occurs, in the case of the transmission system 100, because a time needed for the sending apparatus 102 to send that packet again cannot be ensured, encoded data of that precinct is not supplied in its entirety. That is, due to the occurrence of the packet loss, the decoding unit 133 becomes incapable of executing a decoding process of that precinct.

Therefore, for example, when a loss of a packet(s) occurs in the middle of a precinct, it is also conceivable that encoded data up to that point in the precinct is accumulated in the decoding unit 133. In such a case, the depacketizing processing unit 132 notifies the decoding unit 133 of the occurrence of the packet loss and causes the decoding unit 133 to discard the encoded data in the same precinct as the encoded data of the lost packet(s). Accordingly, the decoding unit 133 can avoid execution of an unnecessary decoding process (decoding process that will fail) of that precinct, and the load can be alleviated.

Also, once a packet loss occurs, encoded data thereafter in the precinct becomes unnecessary. Therefore, even when the depacketizing processing unit 132 receives a packet, the depacketizing processing unit 132 does not supply the encoded data to the decoding unit 133 until the next precinct and so forth are obtained. When a packet of a new precinct is obtained, the depacketizing processing unit starts supplying the encoded data.

Accordingly, the depacketizing processing unit 132 changes the control mode according to the situation and performs appropriate processing as needed. Therefore, the depacketizing processing unit 132 refers to SFF and M and detects the head and the end of a precinct. On this occasion, when there is only M which indicates the end, the depacketizing processing unit 132 cannot determine that there is a precinct change until when the end of a precinct is detected. For example, when the tail packet of a precinct is lost, the depacketizing processing unit 132 must further wait for the next new precinct. Not only the delay time is increased, but also a decoding process cannot be performed in the decoding unit 133. This brings about the possibility of degradation of the image quality of a restored image.

In contrast, by referring to the value of SFF and detecting the head packet, the depacketizing processing unit 132 can not only reduce an unnecessary waiting time, such as restarting supplying data to the decoding unit 133, but also perform exceptional processing only of the head packet, such as supplying not only encoded data but also header information to the decoding unit 133, omitting error notification of notifying the decoding unit 133 of the occurrence of packet loss, and continuing supply of encoded data to the decoding unit 133 even when a packet loss occurs.

Accordingly, the depacketizing processing unit 132 can appropriately perform processing based on the SFF and M flag information and can further reduce the delay time.

Also, on the basis of this SFF and M, the depacketizing processing unit 132 notifies the decoding unit 133 of the fact that the supplied encoded data is at the head or the end of a precinct. Accordingly, the decoding unit 133 can easily figure out the head and the end of a precinct. Thus, for example, when the end of a precinct has been supplied, the decoding unit 133 can start a decoding process; when the head of a new precinct that is not continuous has been supplied, the decoding unit 133 can perform a complementation process of a previous lost precinct. That is, the decoding unit 133 can easily and quickly perform such control on the basis of a notification from the depacketizing processing unit 132.

As above, SFF and M are not simply flag information for giving notifications of start timing of a depacketizing process and a decoding process, but are flag information for causing the depacketizing processing unit 132 and the decoding unit 133 to select and execute appropriate processes at appropriate timings so as to further reduce the delay time until when encoded data is decoded and output.

Now, in FIG. 2, it has been described that the reordering of coefficients is performed immediately after the wavelet transform (before the entropy coding), but it is only necessary that encoded data be supplied to the inverse wavelet transform unit 363 in the decoding unit 133 in order from low frequency to high frequency (that is, it is only necessary that encoded data be supplied in order from encoded data obtained by encoding coefficient data belonging to a low frequency sub-band to encoded data obtained by encoding coefficient data belonging to a high frequency sub-band), and the timing of reordering may be other than that immediately after the wavelet transform.

Figure 40:
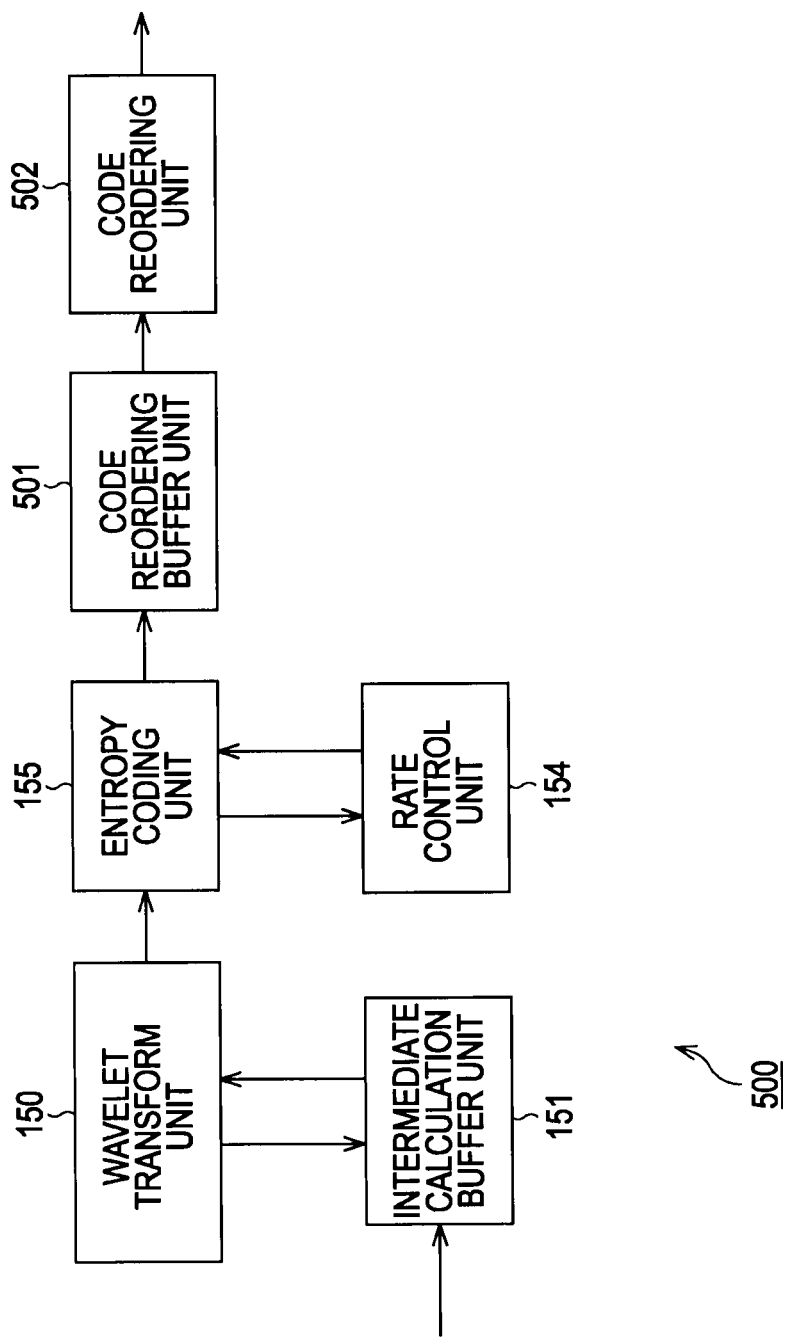
FIG. 40 is a block diagram showing another exemplary structure of the encoding unit in FIG. 1.

For example, the order of encoded data obtained by entropy coding may be reordered. FIG. 40 is a block diagram showing an exemplary structure of the encoding unit in that case.

In the case of FIG. 40, an encoding unit 500 includes, as with the case of the encoding unit 121 in FIG. 2, the wavelet transform unit 150, the intermediate calculation buffer unit 151, the entropy coding unit 155, and the rate control unit 154, and includes, instead of the coefficient reordering buffer unit 152 and the coefficient reordering unit 153 in FIG. 2, a code reordering buffer unit 501 and a code reordering unit 502.

The code reordering buffer unit 501 is a buffer for reordering the output order of encoded data encoded at the entropy coding unit 155, and the code reordering unit 502 reads out encoded data accumulated in the code reordering buffer unit 501 in a predetermined order, thereby reordering the output order of the encoded data.

That is, in the case of FIG. 40, wavelet coefficients output from the wavelet transform unit 150 are supplied to the entropy coding unit 155 and encoded. Individual items of encoded data obtained by the encoding are sequentially supplied to the code reordering buffer unit 501 and temporarily accumulated therein for reordering.

The code reordering unit 502 reads out the encoded data written in the code reordering buffer unit 501 in a desired order and outputs the encoded data to the outside of the encoding unit 500.

In the case of the example in FIG. 40, the entropy coding unit 155 performs encoding of the individual items of coefficient data in the order of output by the wavelet transform unit 150 and writes the obtained encoded data into the code reordering buffer unit 501. That is, the encoded data is stored in the code reordering buffer unit 501 in the order corresponding to the order of output of wavelet coefficients by the wavelet transform unit 150. In a normal case, when two items of coefficient data belonging to one precinct are compared, the wavelet transform unit 150 outputs the item of coefficient data that belongs to a higher frequency sub-band at an earlier time and outputs the item of coefficient that belongs to a lower frequency sub-band at a later time. That is, the individual items of encoded data are sequentially stored in the code reordering buffer unit 501 in order from encoded data obtained by performing entropy coding of coefficient data belonging to a high frequency sub-band toward encoded data obtained by performing entropy coding of coefficient data belonging to a low frequency sub-band.

In contrast, independently from this order, the code reordering unit 502 reads out the individual items of encoded data accumulated in the code reordering buffer unit 501 in an arbitrary order, thereby performing reordering of the encoded data.

For example, the code reordering unit 502 preferentially reads out encoded data obtained by encoding coefficient data belonging to a low frequency sub-band, and reads out, at last, encoded data obtained by encoding coefficient data belonging to the highest frequency sub-band. By reading out the encoded data from low frequency toward high frequency in this manner, the code reordering unit 502 enables the decoding unit 133 to decode the individual items of encoded data in the obtained order, and a delay time that occurs in a decoding process performed by the decoding unit 133 can be reduced.

The code reordering unit 502 reads out the encoded data accumulated in the code reordering buffer unit 501 and outputs this to the outside of the encoding unit 500.

Note that data encoded and output by the encoding unit 500 shown in FIG. 40 can be decoded by the decoding unit 133, which has already been described using FIG. 24, as with the case of encoded data output from the encoding unit 121 in FIG. 2.

Figure 41:
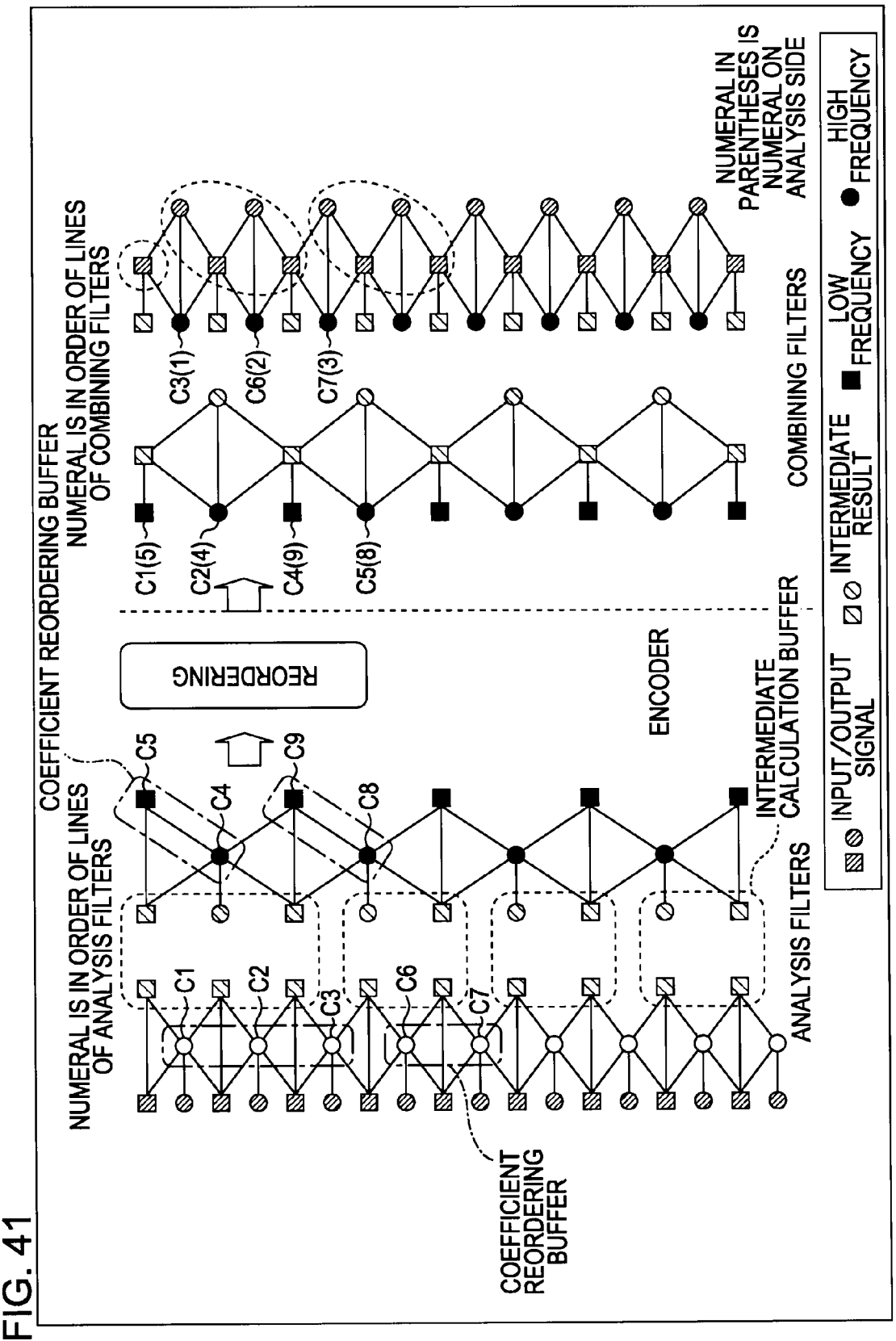
FIG. 41 is an outline diagram for describing the flow of a process in the case where a process of reordering wavelet coefficients is performed on the encoding unit side.

Also, the timing for performing a reordering process may be other than that described above. For example, reordering may be performed at the encoding unit, as shown in an example in FIG. 41, or may be performed at the decoding unit, as shown in an example in FIG. 42.

In a process of reordering coefficient data generated by wavelet transform, a relatively large capacity is necessary as the storage capacity of the coefficient reordering buffer, and a high processing capability is also required for the coefficient reordering process itself. Even in this case, no problem occurs at all when the processing capability of the encoding unit is higher than or equal to a certain level.

Here, the case in which the encoding unit is mounted on a device whose processing capability is relatively low, such as a so-called mobile terminal, e.g., a mobile phone terminal or a PDA (Personal Digital Assistant), will be considered. For example, products of mobile phone terminals to which an image capturing function is added (called mobile phone terminals with a camera function) have been widely spread in recent years. It is conceivable to perform compression and encoding of image data captured by such a mobile phone terminal with a camera function by using wavelet transform and entropy coding and to transmit the image data via wireless or wired communication.

Regarding such a mobile terminal by way of example, the processing capability of a CPU (Central Processing Unit) is limited, and there is a certain upper limit to memory capacity. Accordingly, a processing load and the like involved in the above-described coefficient reordering causes a problem that is not negligible.

Figure 42:
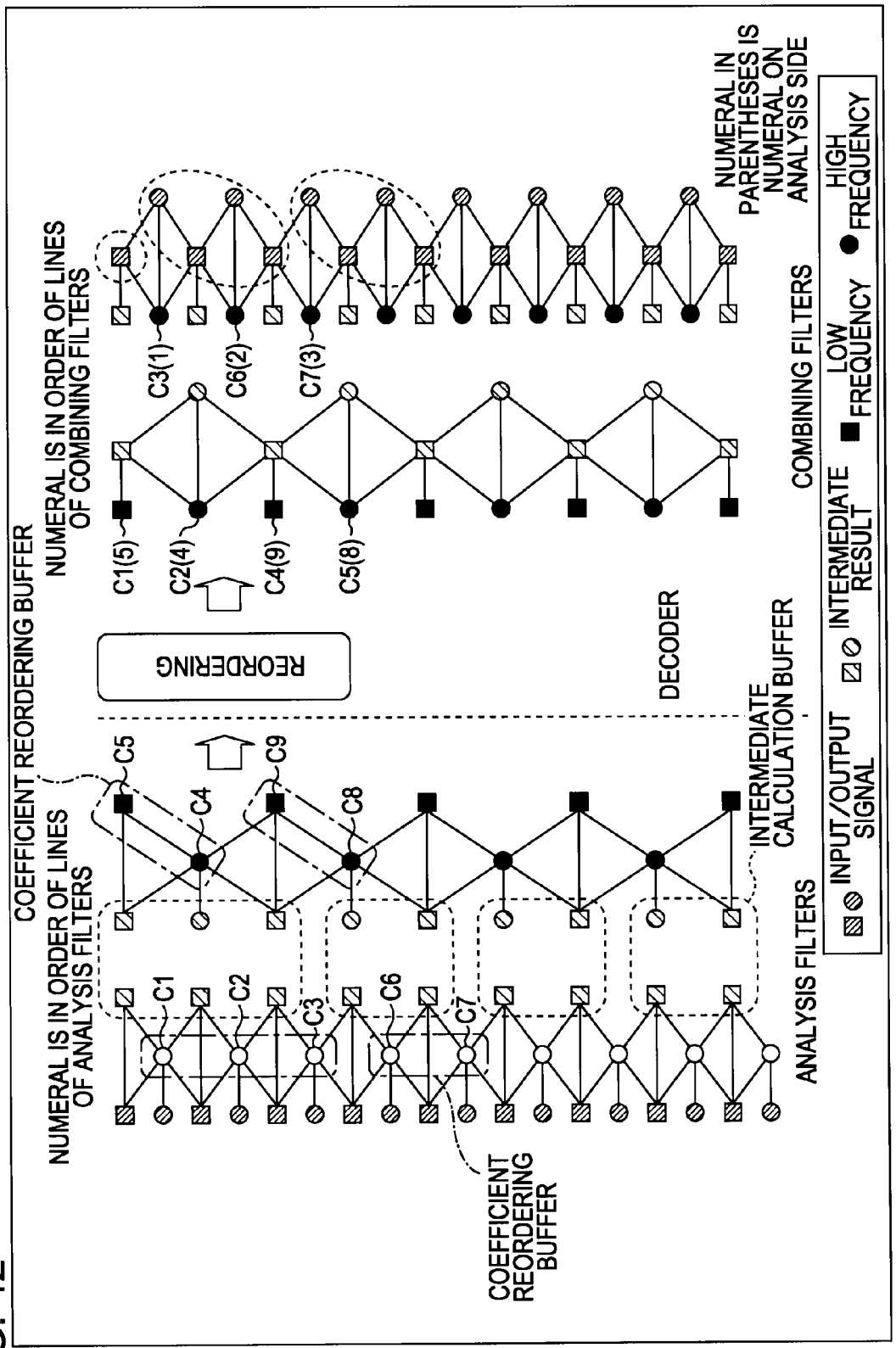
FIG. 42 is an outline diagram for describing the flow of a process in the case where a process of reordering wavelet coefficients is performed on the decoding unit side.

Therefore, as shown in an example in FIG. 42, the load on the encoding unit is alleviated by embedding a reordering process in the decoding unit, thereby enabling mounting of the encoding unit on a device whose processing capability is relatively low, such as a mobile terminal.

Figure 43:
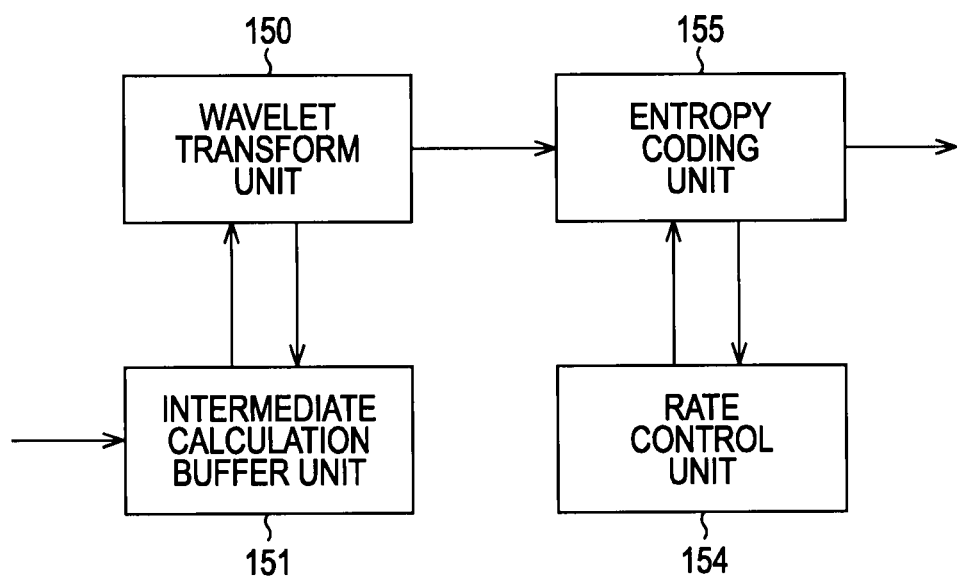
FIG. 43 is a block diagram showing another exemplary structure of the encoding unit in FIG. 1.

FIG. 43 is a block diagram showing an exemplary structure of the encoding unit in that case. Note that, in FIG. 43, portions common to the above-described FIG. 2 are given the same references, and detailed descriptions thereof are omitted.

The structure of an encoding unit 510 shown in this FIG. 43 is a structure obtained by removing the coefficient reordering unit 153 and the coefficient reordering buffer unit 152 from the structure of the encoding unit 121 shown in FIG. 2 described above. That is, the encoding unit 510 includes, as in the encoding unit 121, the wavelet transform unit 150, the intermediate calculation buffer unit 151, the rate control unit 154, and the entropy coding unit 155.

Input image data is temporarily accumulated in the intermediate calculation buffer unit 151. The wavelet transform unit 150 applies wavelet transform to the image data accumulated in the intermediate calculation buffer unit 151 and sequentially supplies items of generated coefficient data to the entropy coding unit 155 in the order in which the items of coefficient data are generated. That is, the generated coefficient data is supplied to the entropy coding unit 155 in order from high frequency components to low frequency components in accordance with the order of wavelet transform. The entropy coding unit 155 applies entropy coding to the supplied coefficients while the bit rate of output data is being controlled by the rate control unit 154. Encoded data obtained by performing entropy coding of the coefficient data generated by wavelet transform is output from the entropy coding unit 155.

Figure 44:
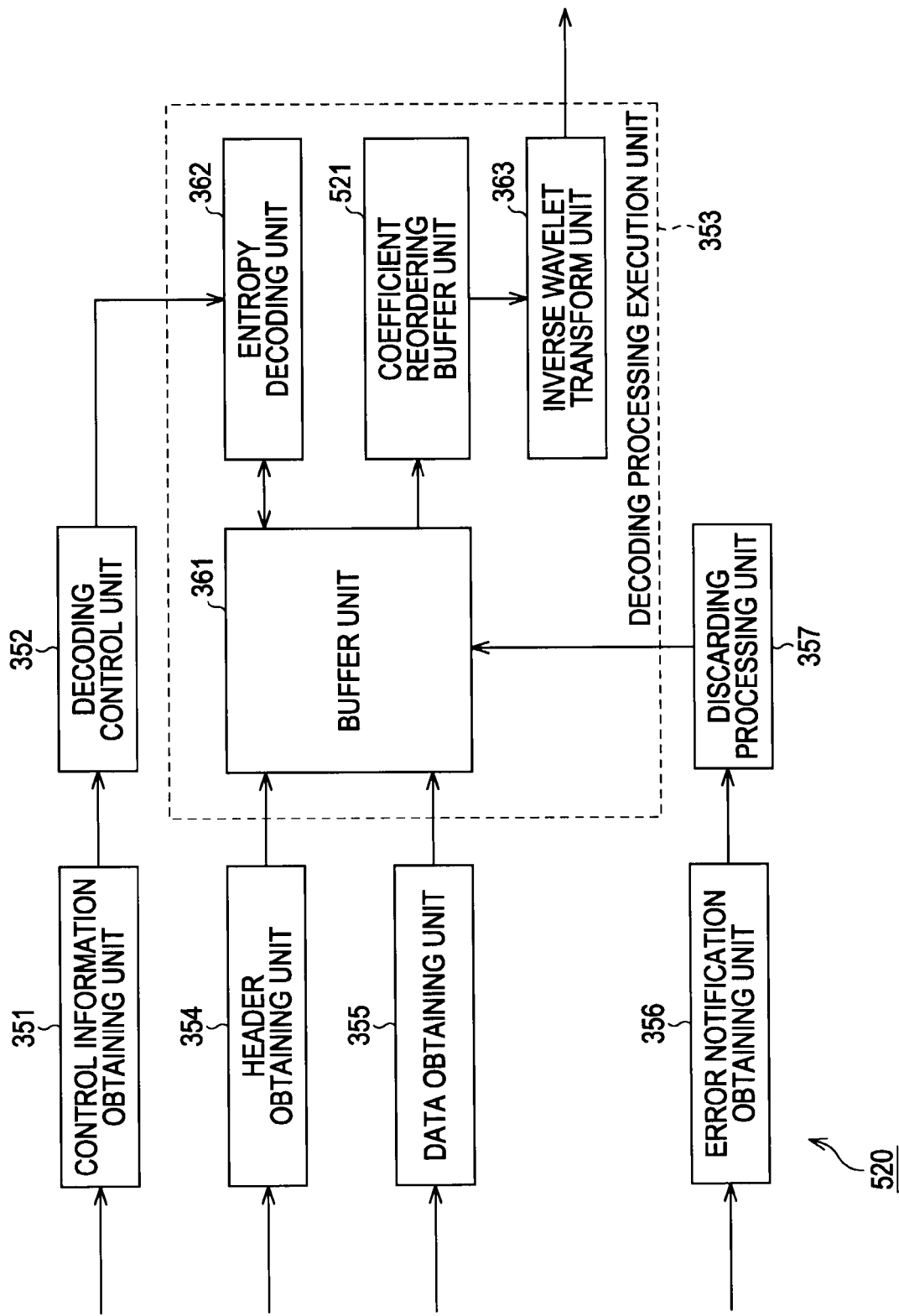
FIG. 44 is a block diagram showing an exemplary structure of the decoding unit corresponding to the encoding unit in FIG. 43.

FIG. 44 is a block diagram showing an exemplary structure of a decoding apparatus corresponding to this encoding unit 510. Note that, in FIG. 44, portions common to the above-described FIG. 24 are given the same references, and detailed descriptions thereof are omitted.

As shown in FIG. 44, a decoding unit 520 in this case includes, as in the decoding unit 133 in FIG. 24, the control information obtaining unit 351, the decoding control unit 352, the decoding processing execution unit 353, the header obtaining unit 354, the data obtaining unit 355, the error notification obtaining unit 356, and the discarding processing unit 357. The decoding processing execution unit 353 further includes a coefficient reordering buffer unit 521.

Encoded data output from the entropy coding unit 155 in the encoding unit 510 described with FIG. 43 is supplied to the entropy decoding unit 362 via the buffer unit 361 in the decoding unit 520 in FIG. 44, and entropy coding of the encoded data is decoded to generate coefficient data. This coefficient data is stored in the coefficient reordering buffer unit 521 via the buffer unit 361. When as many items of coefficient data as are needed to enable reordering of the coefficient data are accumulated in the coefficient reordering buffer unit 521, the inverse wavelet transform unit 363 reorders the coefficient data stored in the coefficient reordering buffer unit 521 in order from low frequency components to high frequency components to read out the coefficient data, and performs inverse wavelet transform using the coefficient data in the read-out order. In the case where a 5×3 filter is to be used, this will be such as that shown in FIG. 42 described above.

That is, for example, in the case of processing starting with the head of one frame, at the point of time at which the coefficient C1, the coefficient C4, and the coefficient C5 of which entropy coding has been decoded are stored in the coefficient reordering buffer unit 521, the inverse wavelet transform unit 363 reads out the coefficient data from the coefficient reordering buffer unit 521 and performs inverse wavelet transform. The items of data which have been inverse-wavelet-transformed by the inverse wavelet transform unit 363 are sequentially output as output image data.

Note that, in this case as well, as has already been described using FIG. 39, processes performed by the individual elements in the encoding unit 510, transmission of encoded data to the transmission line, and processes performed by the individual elements in the decoding unit 520 are executed in parallel.

The fact that the invention is applicable to various modes and can be easily applied to various applications (that is, highly versatile) as above are also great advantages.

Now, as has been described above, it frequently occurs that transmission errors occur in a communication process in digital video communication which transmits video and audio data and affect the reproducing quality.

It is desirable to reduce the effects of these transmission errors in one way or another. As a method therefor, for example, there is a method of attempting to restore the erroneous data itself (method of recovering the data). However, in the case of this method, while the entire image can be reproduced if the recovering is successful, this brings about the possibility of an increase in delay time, such as that the time for restoring the data becomes necessary, or the effective rate becomes dropped due to the error recovery.

In contrast, there is a method of, while leaving the erroneous data as it is, making an error after the decoding as less noticeable as possible by, for example, displaying an immediately previous image without error as it is or estimating an error portion from previous and subsequent images (error concealment method).

In the case of this error concealment method, although the entire image cannot be reproduced, there is no need to wait a data recovery time since the method simply involves replacement of data in which an error occurred with another item of data, such as a previous or subsequent frame. Therefore, processing can be performed with a shorter delay. However, such data replacement needs to be done in increments of a picture (frame or field) or at a granularity rougher than that.

For example, for an error that occurred in a portion of a picture (frame or field), when only that portion is replaced with a previous or subsequent picture, the pattern in that portion does not match patterns in other portions, and accordingly, an image may not be constructed from the whole picture. Thus, the whole picture (or the range of a plurality of the pictures) must be replaced. Therefore, a delay of one picture or more is needed for such data replacement, and it thus becomes difficult to realize a further reduction of delay in data transmission.

Accordingly, a method of reducing the effects of transmission errors while suppressing an increase in delay time will be described below.

Figure 45:
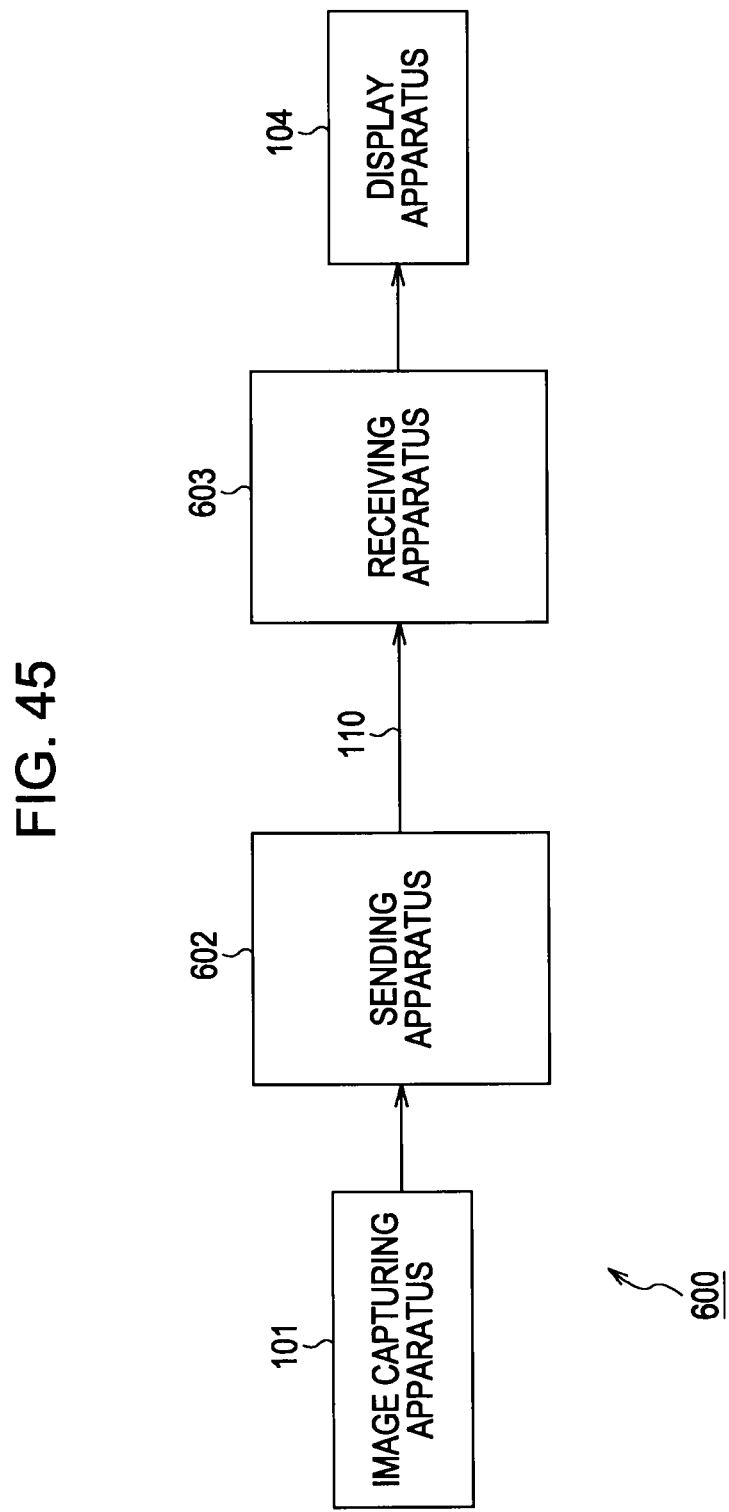
FIG. 45 is a block diagram showing another exemplary configuration of the transmission system to which the present invention is applied.

FIG. 45 is a diagram showing another exemplary structure of a transmission system to which the present invention is applied.

A transmission system 600 shown in FIG. 45 is basically a system similar to the transmission system 100 shown in FIG. 1. The transmission system 600 is a data transmission system in which a sending apparatus 602 compresses and encodes image data generated by the image capturing apparatus 101, and packetizes and sends the image data; a receiving apparatus 603 receives the packets transmitted via the line 110, and depacketizes and decodes the packets; and the display apparatus 104 displays an image based on the obtained image data.

Figure 46:
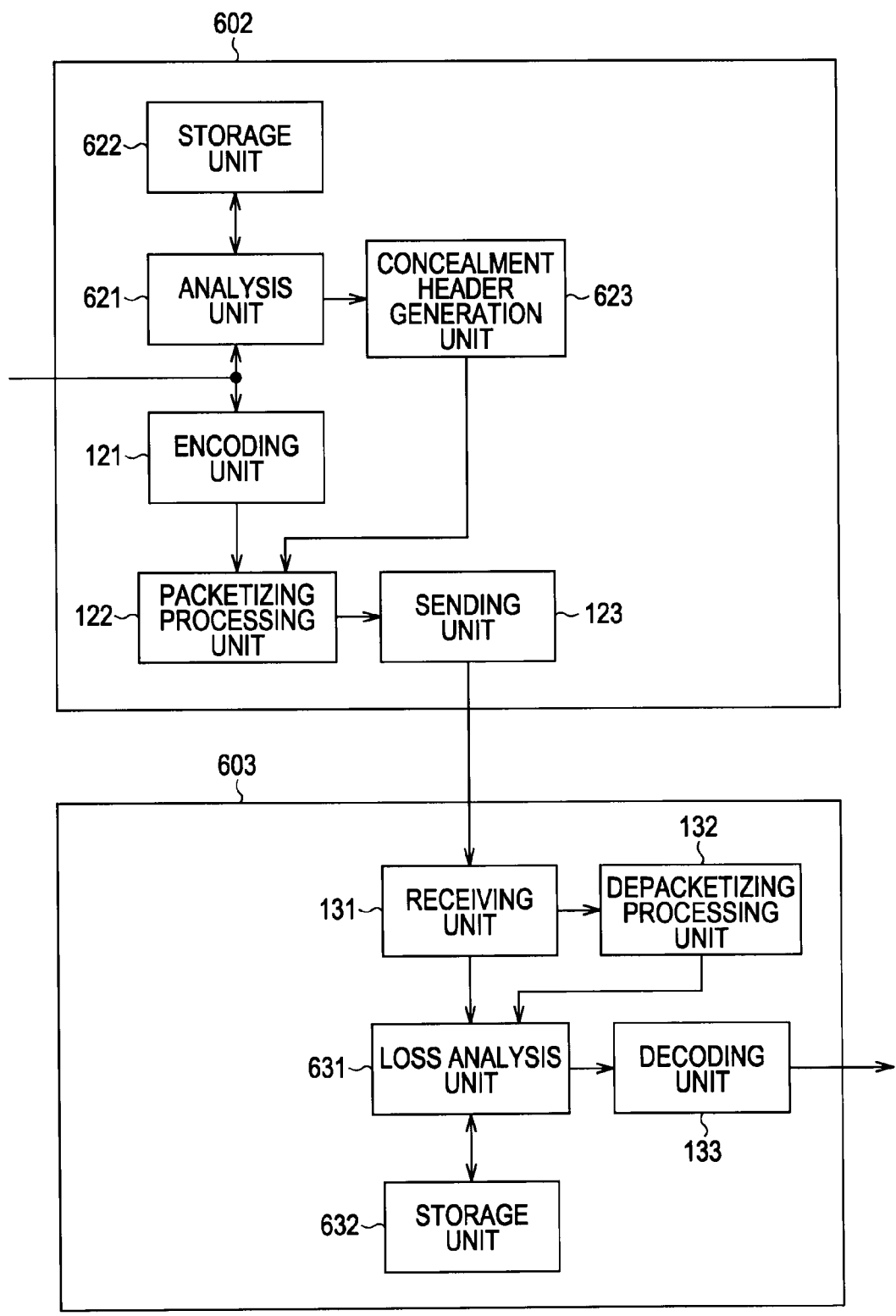
FIG. 46 is a block diagram showing detailed exemplary structures of the sending apparatus and the receiving apparatus in FIG. 45.

More detailed exemplary structures of the sending apparatus 602 and the receiving apparatus 603 are shown in FIG. 46.

As shown in FIG. 46, the sending apparatus 602 includes, besides the encoding unit 121, the packetizing processing unit 122, and the sending unit 123, an analysis unit 621, a storage unit 622, and a concealment header generation unit 623.

The analysis unit 621 performs analysis for error concealment of input image data. Note that error concealment is concealing transmission errors that occur at the time of data transmission. The storage unit 622 includes a storage medium, such as a hard disk or a semiconductor memory, and holds a required amount, one picture or more, of the input image data. The analysis unit 621 compares the input image data with image data of one previous picture read out from the storage unit 622. Note that it is assumed that the analysis unit 621 performs processing in increments of a precinct (line block) in order to reduce delay, although the analysis unit 621 can perform analysis in increments of any data unit. That is, the analysis unit 621 compares images of precincts at the same position in two successive pictures (frames or fields). The analysis unit 621 supplies the comparison result as an analysis result to the concealment header generation unit 623.

The concealment header generation unit 623 generates, on the basis of the analysis result, a concealment header which is concealment information indicating a method of concealing an error in a precinct. More specifically described, the concealment header generation unit 623 generates, at the time of an error concealment process performed by the receiving apparatus 603, header information (concealment header) including information indicating a precinct that can replace a precinct in which an error occurred (information indicating which item of data in which precinct of which picture can be used to perform replacement), and supplies this to the packetizing processing unit 122.

The packetizing processing unit 122 generates (packetizes) transmission packets from the encoded data supplied from the encoding unit 121 and the concealment header supplied from the concealment header generation unit 623. That is, the packetizing processing unit 122 adds (multiplexes) the concealment header to the encoded data and packetizes the multiplexed data. Packets generated in this manner are sent by the sending unit 123 to the receiving apparatus 603.

Also, as shown in FIG. 46, the receiving apparatus 603 includes, besides the receiving unit 131, the depacketizing processing unit 132, and the decoding unit 133, a loss analysis unit 631 and a storage unit 632.

The packets sent from the sending apparatus 602 are received by the receiving unit 131 and depacketized by the depacketizing processing unit 132 to extract the encoded data. The extracted encoded data is supplied to the loss analysis unit 631. Also, at this time, the depacketizing processing unit 132 extracts, together with the encoded data, the concealment header and supplies the concealment header to the loss analysis unit 631.

On the basis of the concealment header, the loss analysis unit 631 performs error concealment for the occurrence of a transmission error by suitably using the encoded data stored in the storage unit 632. Note that it is assumed that the loss analysis unit 631 performs processing in increments of a precinct in order to reduce delay, although the loss analysis unit 631 can perform analysis in increments of any data unit.

The storage unit 632 includes a storage medium, such as a hard disk or a semiconductor memory, and holds a required amount of encoded data transmitted in the past (past encoded data). With reference to the concealment header, the loss analysis unit 631 specifies the past encoded data that can be used for data replacement (that is, which item of data in which precinct of which picture is used for replacement). Then, the loss analysis unit 631 reads out the specified encoded data from the storage unit 632 and replaces a precinct in which a transmission error occurred with that data.

The decoding unit 133 decodes the error-concealment-processed encoded data supplied from the loss analysis unit 631 and outputs baseband image data.

Figure 47:
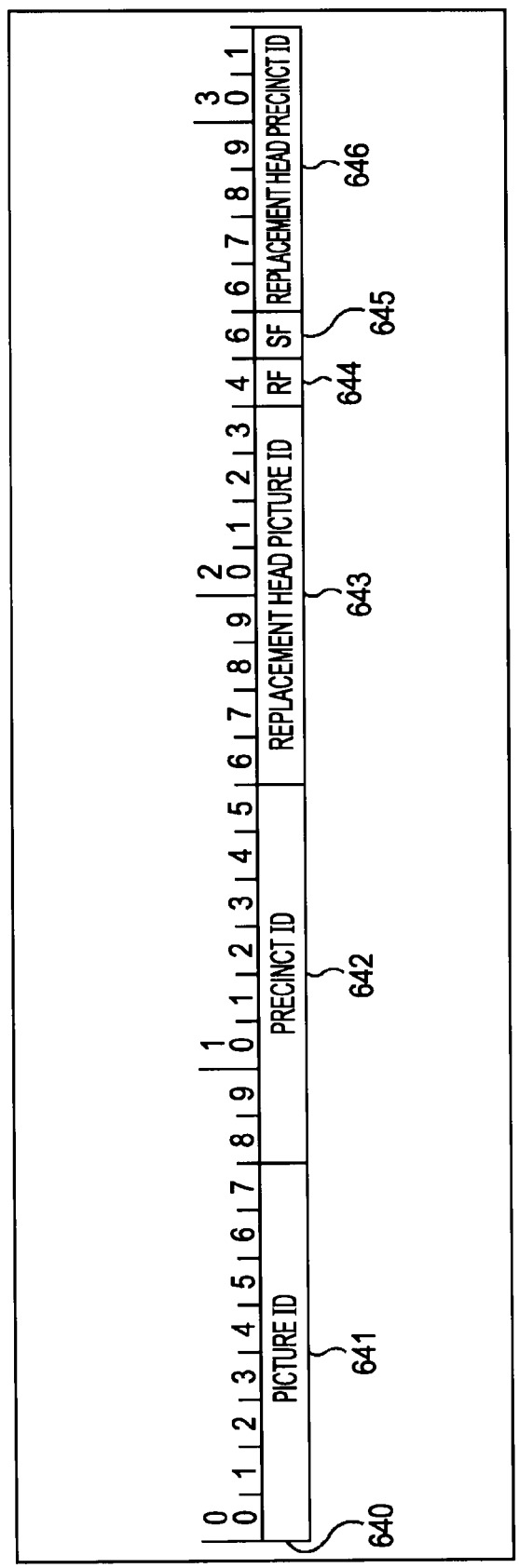
FIG. 47 is a schematic diagram showing an exemplary structure of a concealment header.

Next, a concealment header will be described. FIG. 47 is a diagram illustrating an exemplary structure of a concealment header. As shown in FIG. 47, a concealment header 640 is 32-bit information and includes a picture ID 641, a precinct ID 642, a replacement head picture ID 643, an RF (Replacement Flag) 644, an SF (Slide Flag) 645, and a replacement head precinct ID 646.

The picture ID 641 is 8-bit identification information that identifies the current picture (to be processed) in the whole moving image data. The precinct ID 642 is 8-bit identification information that identifies the current precinct (to be processed) in the picture. The replacement head picture ID 643 is 8-bit identification information that indicates the head picture of a group of pictures that each have a precinct that can replace the current precinct (to be processed) and that are successive in a time direction up to the current picture (to be processed). That is, the replacement head picture ID 643 is information indicating the extent of previous pictures that can be used to replace the current precinct (to be processed). Identification information (ID of the same type as the picture ID 641) that identifies the picture in the whole moving image data is set in this replacement head picture ID 643.

The RF 644 is 1-bit flag information and indicates whether or not the current precinct (to be processed) can be replaced with data of a picture subsequent to the replacement head picture ID 643. Needless to say, although whether or not replacement can be performed using a past picture can be determined by referring to the replacement head picture ID 643, the determination is facilitated by using the RF 644.

The SF 645 is 1-bit flag information and is a bit indicating whether or not the current precinct (to be processed) can be replaced with data of a past precinct in the same picture. The replacement head precinct ID 646 is 6-bit information indicating the head precinct of a group of precincts that are successive in a spatial direction up to the current precinct (to be processed) in the current picture (to be processed) and that can replace the current precinct (to be processed). That is, the replacement head precinct ID 646 is information indicating the extent of previous precincts that can be used to replace the current precinct (to be processed).

Identification information (ID of the same type as the precinct ID 642) that identifies the current precinct (to be processed) in the picture is compressed to six bits and set in this replacement head precinct ID 646.

Note that the bit length of this concealment header 640 is arbitrary. Therefore, the bit length of the replacement head precinct ID 646 can be the same bit length as the precinct ID 642. Also, the bit length of each item of the above-described information is arbitrary.

As above, information indicating the range of data that can replace the current precinct (to be processed) is included in the concealment header 640. The loss analysis unit 631 figures out that range on the basis of this information and replaces the data using encoded data included in the range, which is held in the storage unit 632.

With reference to FIG. 48, each item of information of the concealment header 640 will be described more specifically. FIG. 48 is a diagram showing an exemplary appearance of image data transmitted from the sending apparatus 602 to the receiving apparatus 603.

A picture 651 through a picture 653 shown in FIG. 48 schematically represent some pictures of image data transmitted from the sending apparatus 602 to the receiving apparatus 603. The picture 651 through the picture 653 are three pictures successive in this order in the time direction. That is, among the three pictures, the picture 651 is the temporally most previous (old) picture, and the picture 653 is the temporally most subsequent (new) picture.

Here, in order to simplify the description, it is assumed that each of the picture 651 through the picture 653 is constituted of three precincts. That is, the picture 651 is constituted of a precinct 651-1 through a precinct 651-3; the picture 652 is constituted of a precinct 652-1 through a precinct 652-3; and the picture 653 is constituted of a precinct 653-1 through a precinct 653-3.

Also, it is assumed that items of data of these precincts are transmitted in order from the upper portion to the lower portion in FIG. 48. That is, among the precincts shown in FIG. 48, the precinct 651-1 in the picture 651 is transmitted first, and the precinct 653-3 in the picture 653 is transmitted last.

Further, it is assumed that the precinct 653-3 is the current precinct (to be processed) and that a transmission error occurred in this precinct 653-3.

On this occasion, when the values of the RF 644 and the SF 645 in the concealment header 640 added to (all or some of) packets in the precinct 653-3 are off (for example, "0"), no precinct that can replace the precinct 653-3 exists.

Also, when the value of the RF 644 is off and the value of the SF 645 is on (for example, "1"), a precinct capable of being used for replacement exists in the picture 653. For example, when the replacement head precinct ID 646 is a value indicating the precinct 653-2, the precinct 653-3 can be replaced with the precinct 653-2. Alternatively, for example, when the replacement head precinct ID 646 is a value indicating the precinct 653-1, the precinct 653-3 can be replaced with either of the precinct 653-1 and the precinct 653-2.

Actually, in most cases, a precinct is constituted of pixels roughly equivalent to a few lines. In the case of a general image, adjacent precincts frequently have a high similarity and a small difference. That is, a nearer precinct in the same picture has a higher probability of being capable of being used for replacement. Therefore, in the concealment header 640, among precincts capable of being used for replacement, a precinct that is farthest from the current precinct (to be processed) (temporally earliest) is indicated by the replacement head precinct ID 646. In other words, it is ensured that a precinct subsequent to the precinct indicated by the replacement head precinct ID 646 (up to the current precinct) is capable of being used for replacement.

Also, when the value of the RF 644 is on, a precinct capable of being used for replacement exists in another picture. For example, when the replacement head picture ID 643 is a value indicating the picture 652, the precinct 653-3 can be replaced with the precinct 652-3 at the same position in the picture 652. Alternatively, for example, when the replacement head picture ID 643 is a value indicating the picture 651, the precinct 653-3 can be replaced with any of the precinct 651-3 at the same position in the picture 651 and the precinct 652-3 at the same position in the picture 652.

In the case of a normal moving image, basically patterns in successive pictures are similar, and differences therebetween are small, except for a peculiar point such as a scene change. That is, in the case of a general image, a temporally nearer picture has a higher probability of including a precinct capable of being used for replacement. Therefore, in the concealment header 640, among pictures including precincts capable of being used for replacement, a picture that is farthest from the current picture (to be processed) (temporally earliest) is indicated by the replacement head picture ID 643. In other words, it is ensured that a picture subsequent to the picture indicated by the replacement head picture ID 643 (up to the current picture) includes a precinct capable of being used for replacement.

Note that, actually, when the storage unit 632 does not hold that data, the loss analysis unit 631 cannot replace the precinct. For example, when the replacement head picture ID 643 is a value indicating the picture 651 and when the storage unit 632 holds data of the picture 652, the loss analysis unit 631 can replace the precinct 653-3 with the precinct 652-3.

As above, a position (range) at which data capable of being used for replacement exists is indicated by the concealment header 640. That is, the sending apparatus 602 which generates this concealment header 640 specifies this range. More specifically, the analysis unit 621 calculates a difference value between data in the currently input precinct and data in one previous precinct, which is held in the storage unit 622. Also, the analysis unit 621 calculates a difference value between data in the currently input precinct and data in a precinct at the same position in one previous picture, which is held in the storage unit 622. On the basis of these arithmetic results, the analysis unit 621 determines the similarity between the data in the currently input precinct and the one previous precinct in the same picture or the precinct at the same position which is one before, and determines whether replacement is possible.

When replacement is impossible on the basis of this determination result, the concealment header generation unit 623 suitably updates information of the replacement head picture ID 643 and the replacement head precinct ID 646.

Figure 49:
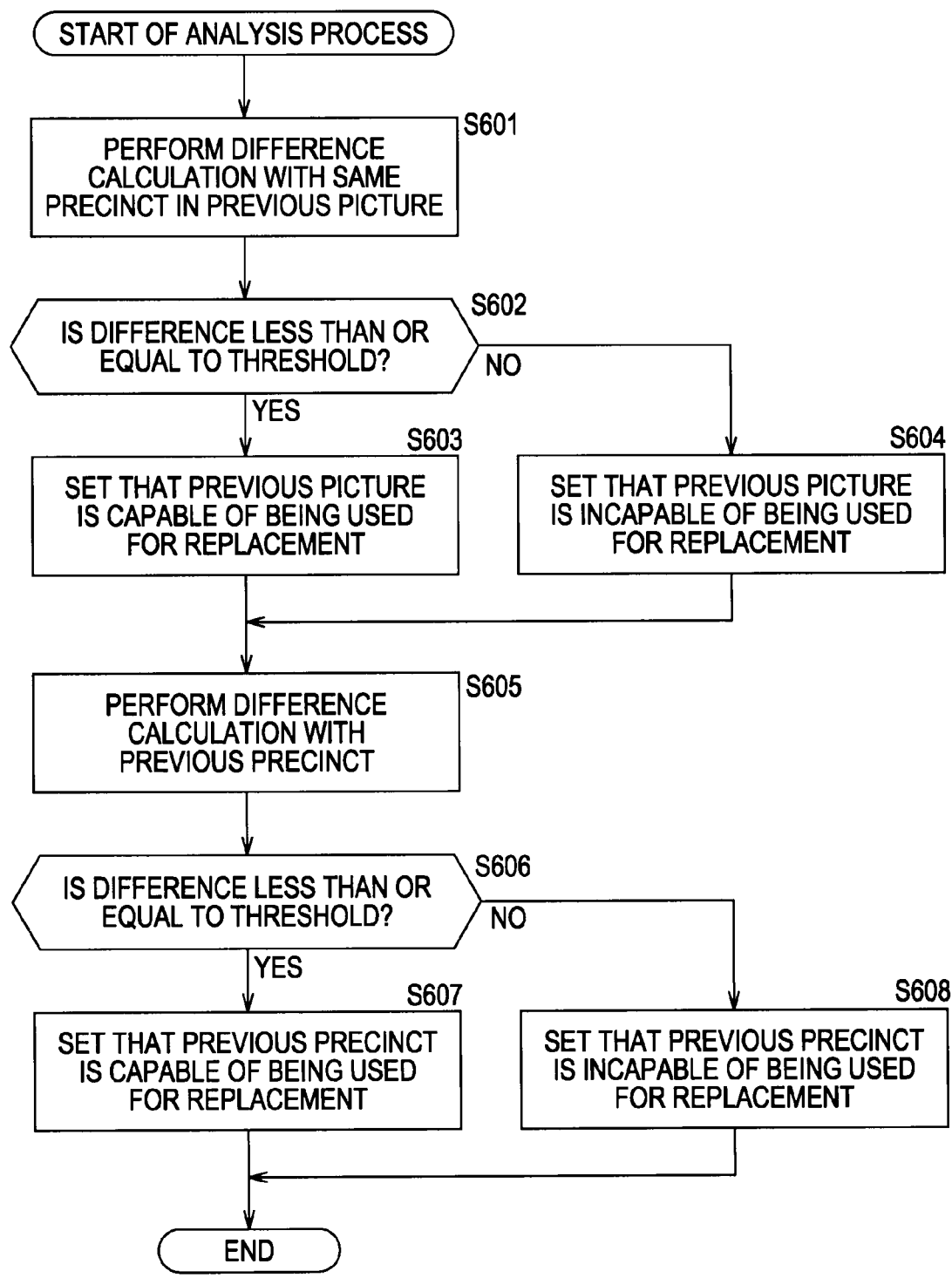
FIG. 49 is a flowchart describing an exemplary flow of an analysis process.

Next, the flow of these processes will be described. At first, with reference to the flowchart in FIG. 49, an exemplary flow of an analysis process executed by the analysis unit 621 in the sending apparatus 602 will be described.

When the analysis process starts, the analysis unit 621 performs a difference calculation in step S601 between the current precinct (to be processed) and the same precinct in a previous picture (precinct at the same position in one previous picture), which is read out from the storage unit 622, and determines in step S602 whether or not the difference is less than or equal to a predetermined threshold set in advance. When it is determined that the difference is less than or equal to the threshold, the analysis unit 621 advances the process to step S603, sets "the previous picture is capable of being used for replacement" as the analysis result, and advances the process to step S605. Alternatively, when it is determined in step S602 that the difference is greater than the threshold, the analysis unit 621 advances the process to step S604, sets "the previous picture is incapable of being used for replacement" as the analysis result, and advances the process to step S605.

The analysis unit 621 performs a difference calculation in step S605 between the current precinct (to be processed) and the previous precinct (one previous precinct) read out from the storage unit 622 and determines in step S606 whether or not the difference is less than or equal to a predetermined threshold set in advance. When it is determined that the difference is less than or equal to the threshold, the analysis unit 621 advances the process to step S607, sets "the previous precinct is capable of being used for replacement" as the analysis result, and ends the analysis process. Alternatively, when it is determined in step S606 that the difference is greater than the threshold, the analysis unit 621 advances the process to step S608, sets "the previous precinct is incapable of being used for replacement" as the analysis result, and ends the analysis process.

By executing each process as above, the analysis unit 621 can determine the similarity in images between frames and provide information needed to generate the concealment header 640 to the concealment header generation unit 623.

Figure 50:
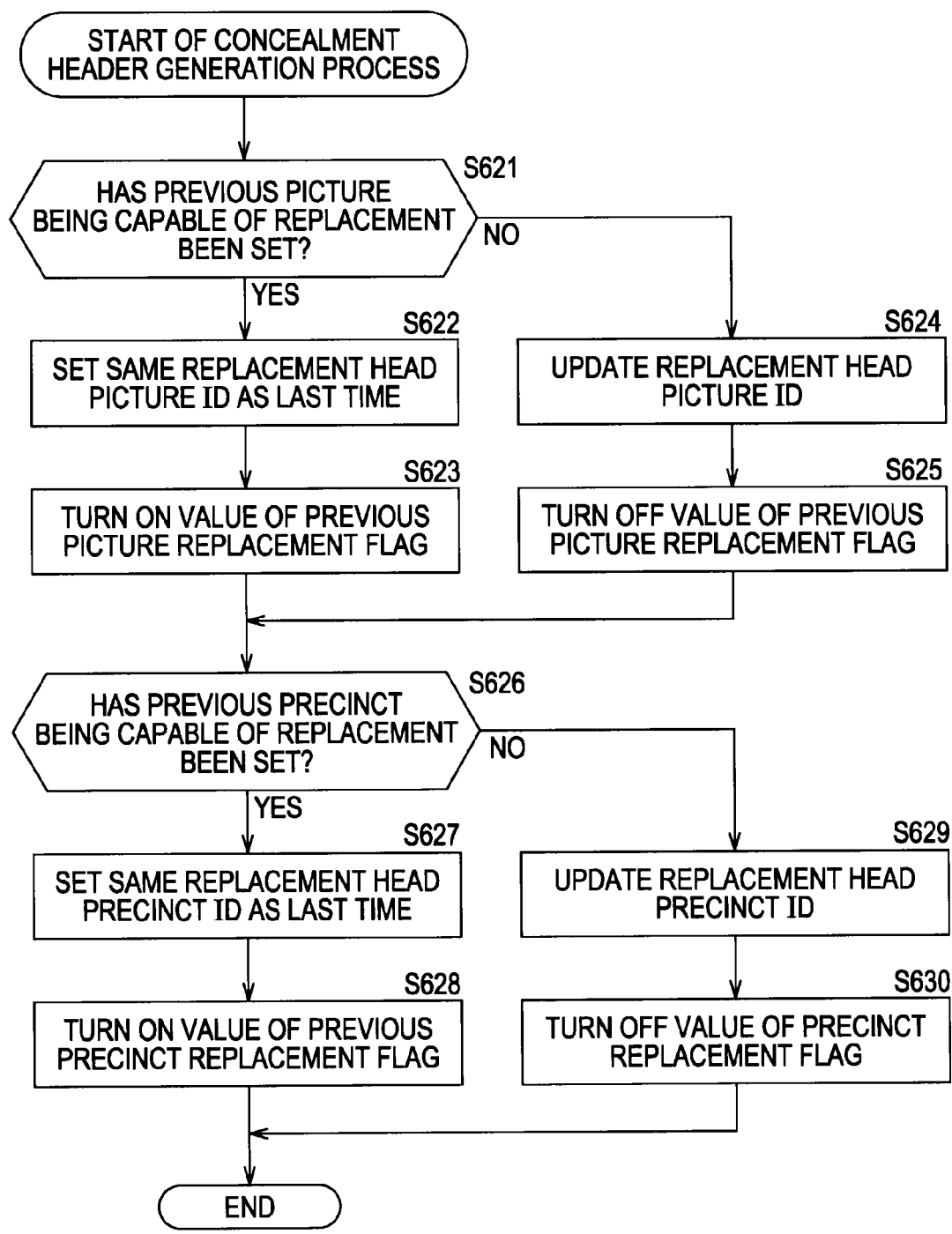
FIG. 50 is a flowchart describing an exemplary flow of a concealment header generation process.

Next, an exemplary flow of a concealment header generation process performed by the concealment header generation unit 623 will be described with reference to the flowchart in FIG. 50.

When the concealment header generation process starts, the concealment header generation unit 623 determines in step S621 whether or not "the previous picture is capable of being used for replacement" has been set as the analysis result.

When it is determined that "the previous picture is capable of being used for replacement" has been set, the concealment header generation unit 623 advances the process to step S622 and sets the value of the replacement head picture ID 643 to the same value as the last time. In step S623, the concealment header generation unit 623 turns on (for example, "1") the value of the RF 644, which is the previous picture replacement flag, and advances the process to step S626.

Alternatively, when it is determined in step S621 that "the previous picture is incapable of being used for replacement" has been set, the concealment header generation unit 623 advances the process to step S624 and updates the value of the replacement head picture ID 643 to the current picture identification information. In step S625, the concealment header generation unit 623 turns off (for example, "0") the value of the RF 644, which is the previous picture replacement flag, and advances the process to step S626.

In step S626, the concealment header generation unit 623 determines whether or not "the previous precinct is capable of being used for replacement" has been set as the analysis result.

When it is determined that "the previous precinct is capable of being used for replacement" has been set, the concealment header generation unit 623 advances the process to step S627 and sets the value of the replacement head precinct ID 646 to the same value as the last time. In step S628, the concealment header generation unit 623 turns on (for example, "1") the value of the SF 645, which is the previous precinct replacement flag, and ends the concealment header generation process.

Alternatively, when it is determined in step S626 that "the previous precinct is incapable of being used for replacement" has been set, the concealment header generation unit 623 advances the process to step S629 and updates the value of the replacement head precinct ID 646 to the current precinct identification information. In step S630, the concealment header generation unit 623 turns off (for example, "0") the value of the SF 645, which is the previous precinct replacement flag, and ends the concealment header generation process.

By executing each process as above, the concealment header generation unit 623 can generate the concealment header 640 referred to for reducing the effects of transmission errors, while suppressing an increase in delay time. Since this concealment header 640 is provided to the receiving apparatus 603, the receiving apparatus 603 becomes capable of appropriately performing an error concealment process in increments of a precinct which is smaller than in increments of a picture.

Figure 51:
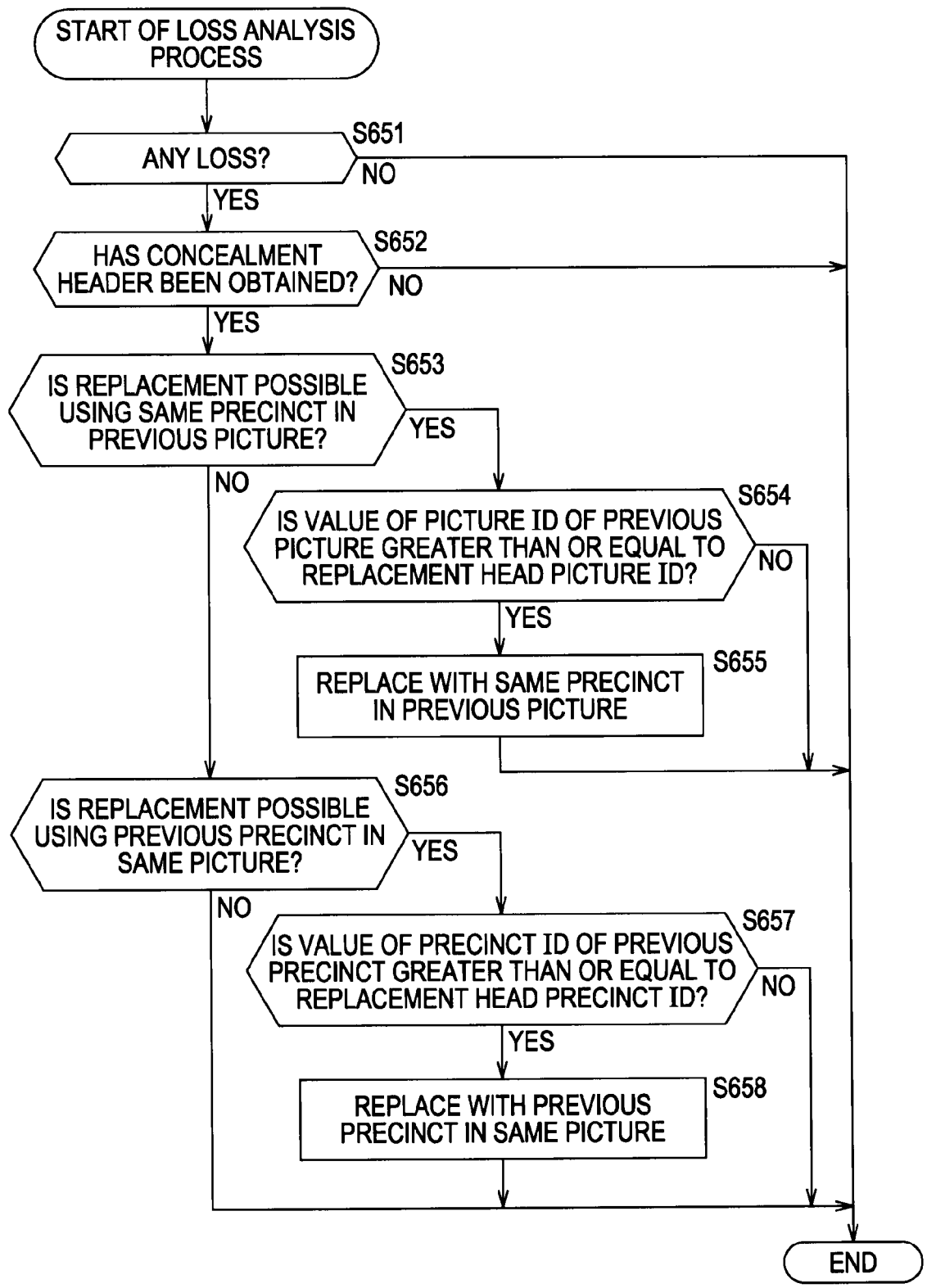
FIG. 51 is a flowchart describing a loss analysis process.

Next, an exemplary flow of a loss analysis process performed using this concealment header 640 will be described with reference to the flowchart in FIG. 51.

When the loss analysis process starts, the loss analysis unit 631 determines in step S651 whether or not a loss (error) occurred in the current precinct (to be processed) and, when it is determined that no loss occurred, ends the loss analysis process.

Alternatively, when it is determined in step S651 that a loss occurred, the loss analysis unit 631 advances the process to step S652 and determines whether or not the concealment header 640 has been obtained. When it is determined that the concealment header 640 has not been obtained, since it is difficult to perform correct error concealment, the loss analysis unit 631 ends the loss analysis process.

Alternatively, when it is determined in step S652 that the concealment header 640 has been obtained, the loss analysis unit 631 advances the process to step S653 and, on the basis of information of the concealment header 640, determines whether or not replacement is possible using the same precinct in the previous picture (precinct at the same position in one previous picture). When the value of the RF 644 is on (for example, "1") and it is thus determined that replacement is possible, the loss analysis unit 631 advances the process to step S654.

In step S654, the loss analysis unit 631 determines whether or not the value of the picture ID of the previous picture, which is read out from the storage unit 632, is greater than or equal to the replacement head picture ID 643, that is, whether the picture indicated by the replacement head picture ID is older than the previous picture read out from the storage unit 632. When it is determined that the previous picture read out from the storage unit 632 is subsequent to the picture indicated by the replacement head picture ID, the loss analysis unit 631 advances the process to step S655, replaces the current precinct (to be processed) with the precinct at the same position in the previous picture, which is read out from the storage unit 632, and ends the loss analysis process. Alternatively, when it is determined in step S654 that the value of the picture ID of the previous picture, which is read out from the storage unit 632, is smaller than the replacement head picture ID, since data of the picture capable of being used for replacement is not held in the storage unit 632, the loss analysis unit 631 ends the loss analysis process.

Alternatively, when it is determined in step S653 that replacement is impossible using the precinct at the same position in the previous picture, which is read out from the storage unit 632, the loss analysis unit 631 advances the process to step S656 and determines whether or not replacement is possible using the previous precinct in the same picture (one previous precinct in the same picture), which is read out from the storage unit 632. When the value of the SF 645 is off (for example, "0") and it is thus determined that replacement is not possible, the loss analysis unit 631 ends the loss analysis process.

Alternatively, when it is determined in step S656 that the value of the SF 645 is on (for example, "1") and replacement is possible using the previous precinct in the same picture, which is read out from the storage unit 632, the loss analysis unit 631 advances the process to step S657 and determines whether or not the value of the precinct ID of the previous precinct read out from the storage unit 632 is greater than or equal to the replacement head precinct ID 646.

When it is determined that the value of the precinct ID of the previous precinct read out from the storage unit 632 is less than the replacement head precinct ID 646, that is, when it is determined that the previous precinct read out from the storage unit 632 is a precinct prior to the precinct indicated by the replacement head precinct ID 646, since no precinct capable of being used for replacement is held in the storage unit 632, the loss analysis unit 631 ends the loss analysis process.

Alternatively, when it is determined that the value of the precinct ID of the previous precinct read out from the storage unit 632 is greater than or equal to the replacement head precinct ID 646, that is, when it is determined that the previous precinct read out from the storage unit 632 is a precinct subsequent to the precinct indicated by the replacement head precinct ID 646, the loss analysis unit 631 advances the process to step S658, replaces the current precinct (to be processed) with the previous precinct in the same picture, which is read out from the storage unit 632, and ends the loss analysis process.

As above, the loss analysis unit 631 performs the loss analysis process. Accordingly, by performing the process in the above-described manner, the loss analysis unit 631 can appropriately perform, on the basis of the concealment header 640, an error concealment process in increments of a precinct which is smaller than in increments of a picture. That is, the loss analysis unit 631 can reduce the effects of transmission errors while suppressing an increase in delay time.

Note that the receiving apparatus 603 may determine whether or not replacement is possible and may be capable of performing replacement in increments of a unit that is smaller than in increments of a picture without using the above-described concealment header 640. In that case, the amount of buffer in the receiving apparatus 603 increases, which brings about the possibility of an increase in delay time. Also, on the receiving apparatus 603 side, since there is a possibility of a data defect, correct determination might require a long time.

Therefore, as has been described above, in the sending apparatus 602 in which there is data in its entirety, it is determined whether or not replacement is possible, and, using the concealment header 640, that information is sent to the receiving apparatus 603, whereby the sending apparatus 602 becomes capable of causing the receiving apparatus 603 to reduce the effects of transmission errors while suppressing an increase in delay time.

The above-described series of processes can be executed by hardware or can be executed by software. When the series of processes is to be executed by software, a program configuring the software is installed from a program recording medium into a computer embedded in dedicated hardware, a general personal computer, for example, which can execute various functions using various programs being installed therein, or an information processing apparatus in an information processing system consisting of a plurality of apparatuses.

Figure 52:
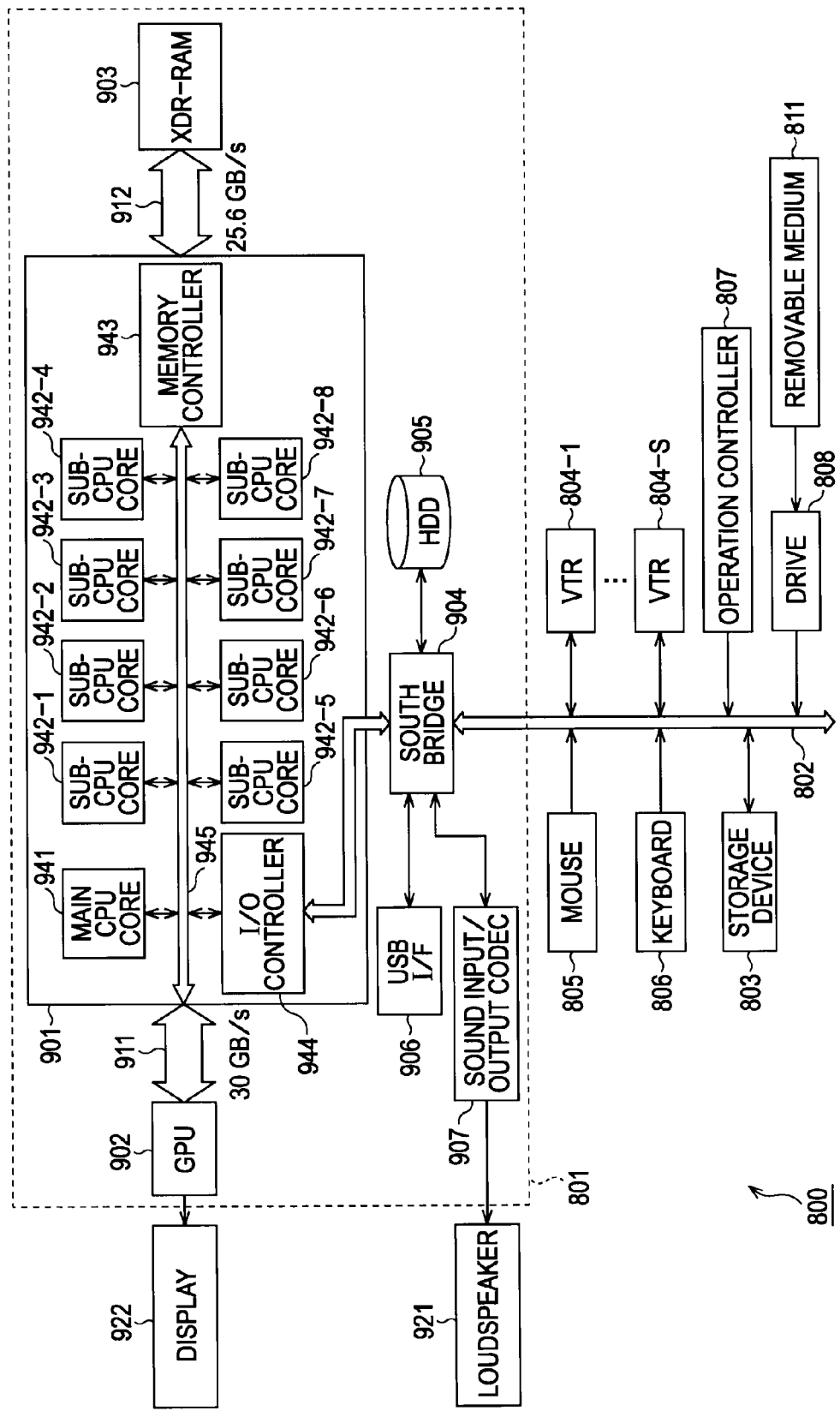
FIG. 52 is a diagram showing an exemplary configuration of an information processing system to which the present invention is applied.

FIG. 52 is a block diagram showing an exemplary configuration of an information processing system that executes the above-described series of processes based on a program.

As shown in FIG. 52, an information processing system 800 is a system configured with an information processing apparatus 801, a storage device 803 connected to the information processing apparatus 801 using a PCI bus 802, a VTR 804-1 through a VTR 804-S which are a plurality of video tape recorders (VTR), and a mouse 805, keyboard 806, and operation controller 807 for a user to perform operation input to these, and is a system which performs an image encoding process, an image decoding process, and the like as described above based on an installed program.

For example, the information processing apparatus 801 in the information processing system 800 can store encoded data obtained by encoding moving image content stored in the large-capacity storage device 803 constituted of RAID (Redundant Arrays of Independent Disks) in the storage device 803, store in the storage device 803 decoded image data (moving image content) obtained by decoding the encoded data stored in the storage device 803, and store the encoded data and the decoded image data on video tapes via the VTR 804-1 through the VTR 804-S. Also, the information processing apparatus 801 is arranged to be capable of bringing in moving image content recorded on video tapes mounted in the VTR 804-1 through the VTR 804-S into the storage device 803. On that occasion, the information processing apparatus 801 may encode the moving image content.

The information processing apparatus 801 has a microprocessor 901, a GPU (Graphics Processing Unit) 902, an XDR (Extreme Data Rate)-RAM 903, a south bridge 904, an HDD (Hard Disk Drive) 905, a USB interface (USB I/F) 906, and a sound input/output codec 907.

The GPU 902 is connected to the microprocessor 901 via a dedicated bus 911. The XDR-RAM 903 is connected to the microprocessor 901 via a dedicated bus 912. The south bridge 904 is connected to an I/O controller 944 of the microprocessor 901 via a dedicated bus. Also connected to the south bridge 904 are the HDD 905, the USB interface 906, and the sound input/output codec 907. A loudspeaker 921 is connected to the sound input/output codec 907. Also, a display 922 is connected to the GPU 902.

Furthermore, also connected to the south bridge 904 are the mouse 805, the keyboard 806, the VTR 804-1 through the VTR 804-S, the storage device 803, and the operation controller 807, via the PCI bus 802.

The mouse 805 and the keyboard 806 receive operation inputs from the user and supply signals indicating the contents of the operation inputs from the user to the microprocessor 901 via the PCI bus 802 and the south bridge 904. The storage device 803 and the VTR 804-1 through the VTR 804-S are configured to be capable of recording or reproducing predetermined data.

Further connected to the PCI bus 802 according to need is a drive 808, to which a removable medium 811 such as a magnetic disk, an optical disk, a magneto-optical disk, or a semiconductor memory is suitably mounted, and a computer program read out therefrom is installed in the HDD 905 according to need.

The microprocessor 901 is configured with a multi-core configuration in which a general-purpose main CPU core 941 that executes basic programs such as an OS (Operating System), a sub-CPU core 942-1 through a sub-CPU core 942-8 which are a plurality of (eight in this case) RISC (Reduced Instruction Set Computer) type signal processing processors connected to the main CPU core 941 via an internal bus 945, a memory controller 943 that performs memory control of the XDR-RAM 903 having a capacity of 256 [MByte], for example, and the I/O (In/Out) controller 944 which manages input and output of data with the south bridge 904 are integrated on one chip, and realizes an operation frequency of 4 [GHz], for example.

At the time of activation, the microprocessor 901 reads out necessary application programs stored in the HDD 905 on the basis of a control program stored in the HDD 905, unfolds the application programs in the XDR-RAM 803, and subsequently executes necessary control processes based on the application programs and operator operations.

Also, by executing the software, the microprocessor 901 can, for example, realize the above-described encoding process and decoding process, supply encoded streams obtained as a result of encoding via the south bridge 904 to the HDD 905 for storage, and perform data transfer of a video image reproduced from the moving image content obtained as a result of decoding to the GPU 902 for display on the display 922.

While a method of using each CPU core in the microprocessor 901 is arbitrary, for example, the main CPU core 941 may perform processing relating to control of an image encoding process and an image decoding process, and may control the eight sub-CPU core 942-1 through sub-CPU core 942-8 to perform processes, such as wavelet transform, coefficient reordering, entropy coding, entropy decoding, inverse wavelet transform, quantization, and dequantization, simultaneously in parallel as described with reference to FIG. 39, for example. On that occasion, when the main CPU core 941 is arranged to assign processing to each of the eight sub-CPU core 942-1 through sub-CPU core 942-8 on a precinct-by-precinct basis, an encoding process and a decoding process are executed simultaneously in parallel on a precinct-by-precinct basis, as with the case described with reference to FIG. 39. That is, the efficiency of an encoding process and a decoding process can be improved, the delay time of the overall processing can be reduced, and further, the load, processing time, and memory capacity necessary for the processing can be reduced. Needless to say, each process can be performed using other methods, as well.

For example, some of the eight sub-CPU core 942-1 through sub-CPU core 942-8 of the microprocessor 901 can be arranged to execute an encoding process and the rest can be arranged to perform a decoding process simultaneously in parallel.

Also, for example, when an independent encoder or decoder, or codec processing apparatus is connected to the PCI bus 802, the eight sub-CPU core 942-1 through sub-CPU core 942-8 of the microprocessor 901 may be arranged to control processes executed by these apparatuses via the south bridge 904 and the PCI bus 802. Further, when a plurality of such apparatuses are connected, or when these apparatuses include a plurality of decoders or encoders, the eight sub-CPU core 942-1 through sub-CPU core 942-8 of the microprocessor 901 may be arranged to control processes executed by the plurality of decoders or encoders in a sharing manner.

At this time, the main CPU core 941 manages the operation of the eight sub-CPU core 942-1 through sub-CPU core 942-8, assigns processes to the individual sub-CPU cores, and retrieves processing results. Further, the main CPU core 941 performs processes other than those performed by these sub-CPU cores. For example, the main CPU core 941 accepts commands supplied from the mouse 805, keyboard 806, or operation controller 807 via the south bridge 904 and executes various processes in response to the commands.

The GPU 902 governs functions for performing, in addition to a final rendering process regarding, for example, pasting textures when moving a video image reproduced from moving image content to be displayed on the display 922, a coordinate transformation calculation process when simultaneously displaying a plurality of video images reproduced from moving image content and still images of still image content on the display 922, an enlargement/reduction process of a video image reproduced from moving image content and a still image of still image content, and so forth, thereby alleviating the processing load on the microprocessor 901.

Under control of the microprocessor 901, the GPU 902 applies predetermined signal processing to video image data of supplied moving image content and image data of still image content, sends the video image data and image data obtained as a result thereof to the display 922, and displays image signals on the display 922.

Now, video images reproduced from a plurality of items of moving image content decoded simultaneously in parallel by the eight sub-CPU core 942-1 through sub-CPU core 942-8 of the microprocessor 901 are data-transferred to the GPU 902 via the bus 911. The transfer speed on this occasion is, for example, 30 [Gbyte/sec] at maximum, and accordingly, even complex reproduced video images with special effects can be displayed quickly and smoothly.

In addition, the microprocessor 901 applies audio mixing processing to audio data, of video image data and audio data of moving image content, and sends edited audio data obtained as a result thereof to the loudspeaker 921 via the south bridge 904 and the sound input/output codec 907, thereby outputting audio based on audio signals from the loudspeaker 921.

When the above-described series of processes is to be executed by software, a program configuring the software is installed from a network or a recording medium.

This recording medium is configured with, for example, as shown in FIG. 52, not only the removable medium 811 which has recorded thereon the program and is distributed, separately from a main body of the apparatus, to distribute the program to a user, such as a magnetic disk (including a flexible disk), an optical disk (including CD-ROM and DVD), a magneto-optical disk (including MD) or a semiconductor memory, but also the HDD 905, the storage device 803, and the like, which have recorded thereon the program and are distributed to the user in a state where they are embedded in advance in the main body of the apparatus. Needless to say, the recording medium may also be a semiconductor memory, such as a ROM or a flash memory.

In the above, it has been described that the eight sub-CPU cores are configured in the microprocessor 901. However, the present invention is not limited thereto. The number of sub-CPU cores is arbitrary. Also, the microprocessor 901 is not necessarily be configured with a plurality of cores such as a main CPU core and sub-CPU cores, and the microprocessor 901 may be configured using a CPU configured with a single core (one core). Also, instead of the microprocessor 901, a plurality of CPUs may be used, or a plurality of information processing apparatuses may be used (that is, a program that executes the processes of the present invention is executed in a plurality of apparatuses operating in conjunction with one another).

The steps describing the program recorded in the recording medium in the present specification may of course include processes performed time sequentially in accordance with the described order, but also include processes executed not necessarily time sequentially but in parallel or individually.

Also, the system in the present specification refers to the entirety of equipment constituted of a plurality of devices (apparatuses).

Note that a structure described above as being a single apparatus may be split so as to be configured as a plurality of apparatuses. Conversely, structures described above as being a plurality of apparatuses may be consolidated so as to be configured as a single apparatus. Also, needless to say, the structures of the individual apparatuses may have added thereto structures other than those described above. Further, a part of the structure of one apparatus may be included in the structure of another apparatus, as long as the structure and operation of the overall system are substantially the same.

INDUSTRIAL APPLICABILITY

The present invention described above is to easily perform data transmission at high speeds and is applicable to various apparatuses or systems as long as they compress, encode, and transmit images and, at a transmission destination, decode the compressed encoding and output the images. The present invention is particularly suitable to apparatuses or systems required to have a short delay from image compression and encoding to decoding and outputting.

For example, the present invention is suitable for use in applications of the medical remote medical analysis, such as operating a master-slave manipulator while looking at a video image captured by a video camera and performing a medical treatment. Also, the present invention is suitable for use in systems that encode and transmit images and decode and display or record the images in broadcasting stations and the like.

Additionally, the present invention can be applied to systems that perform distribution of live coverage of video images, systems that enable interactive communication between students and teachers in educational institutions, and the like.

Furthermore, the present invention can be applied to sending of image data captured by a mobile terminal having an image capturing function, such as a mobile phone terminal with a camera function, video conference systems, systems including a monitoring camera and a recorder that records a video image captured by the monitoring camera, and the like.

The invention claimed is:

1. An information processing apparatus that encodes image data, comprising:
    comparison means for comparing frames or fields constituting image data in increments of a line block including image data equivalent to a number of lines needed to generate coefficient data equivalent to one line of sub-bands of at least lowest frequency components, and the comparison means compares, with respect to the image data, a difference value between frames or a difference value between fields with a threshold;
    generation means for generating concealment information indicating a method of concealing an error in a line block in accordance with a comparison result received from the comparison means, the concealment information includes flag information indicating whether or not a line block constituting a frame or a field is replaceable with a line block constituting another frame or another field;
    encoding means for generating encoded data by encoding, using an entropy coding system, coefficient data reordered in advance in the order in which the coefficient data is used in executing a combining process of combining coefficient data of a plurality of sub-bands decomposed in frequency bands to generate image data;
    control means for controlling so as to multiplex, after the encoded data is generated, the concealment information with the encoded data.

2. The information processing apparatus according to claim 1, wherein the control means controls the encoding means so as to packetize the encoded data with the concealment information being used as a header.

3. The information processing apparatus according to claim 2,
    wherein the encoding means includes:
    coefficient encoding means for encoding the coefficient data to generate encoded data; and
    packetizing means for packetizing the encoded data.

4. The information processing apparatus according to claim 1,
    wherein the generation means sets the flag information to replaceable when the difference value between the frames or the difference value between the fields is less than or equal to the threshold.

5. The information processing apparatus according to claim 1, wherein the concealment information includes information indicating, when a line block constituting a frame or a field is replaceable with a line block constituting another frame or another field, the extent of previous pictures or fields that can be used for replacement.

6. The information processing apparatus according to claim 1, wherein the concealment information includes flag information indicating, when a line block constituting a frame or a field is replaceable with a line block constituting another frame or another field, whether or not replacement can be performed using a picture or field subsequent to a picture or field capable of being used for replacement.

7. The information processing apparatus according to claim 1, wherein the coefficient data is reordered in order from low frequency components to high frequency components in increments of a line block.

8. An information processing method for an information processing apparatus that encodes image data, the method comprising:
    comparing frames or fields constituting image data in increments of a line block including image data equivalent to a number of lines needed to generate coefficient data equivalent to one line of sub-bands of at least lowest frequency components, and comparing, with respect to the image data, a difference value between frames or a difference value between fields with a threshold;
    generating concealment information indicating a method of concealing an error in a line block in accordance with a comparison result, the concealment information includes flag information indicating whether or not a line block constituting a frame or a field is replaceable with a line block constituting another frame or another field;
    generating encoded data by encoding, using an entropy coding system, coefficient data reordered in advance in the order in which the coefficient data is used in executing a combining process of combining coefficient data of a plurality of sub-bands decomposed in frequency bands to generate image data;
    multiplexing, after the encoded data is generated, the concealment information with the encoded data.

9. An information processing apparatus that performs an error concealment process on encoded data obtained by encoding image data, comprising:
    obtaining means for obtaining, from frames or fields constituting image data, concealment information indicating a method of concealing an error in a line block, in increments of a line block including image data equivalent to a number of lines needed to generate coefficient data equivalent to one line of sub-bands of at least lowest frequency components, from encoded data obtained by encoding, using an entropy coding system, coefficient data reordered in advance in the order in which the coefficient data is used in executing a combining process of combining coefficient data of a plurality of sub-bands obtained by decomposing the image data in frequency bands to generate image data by extracting the concealment information from the encoded data, the concealment information having been multiplexed with the encoded data after the encoded data was generated and including flag information indicating whether or not a line block constituting a frame or a field is replaceable with a line block constituting another frame or another field; and
    concealment means for performing, in increments of a line block, a process of concealing an error included in the encoded data in accordance with the method of concealing an error indicated by error concealment information obtained by the obtaining means.

10. The information processing apparatus according to claim 9, wherein the encoded data is packetized with the concealment information being used as a header, and
    wherein the obtaining means obtains the concealment information as a header.

11. The information processing apparatus according to claim 9, further comprising:
    decoding means for decoding the encoded data which has been concealment-processed by the concealment means to generate image data.

12. The information processing apparatus according to claim 9, further comprising:
    recording means for recording the encoded data which has been concealment-processed by the concealment means in a recording medium.

13. An information processing method for an information processing apparatus that performs an error concealment process on encoded data obtained by encoding image data, the method comprising:

obtaining, from frames or fields constituting image data, concealment information indicating a method of concealing an error in a line block, in increments of a line block including image data equivalent to a number of lines needed to generate coefficient data equivalent to one line of sub-bands of at least lowest frequency components, from encoded data obtained by encoding, using an entropy coding system, coefficient data reordered in advance in the order in which the coefficient data is used in executing a combining process of combining coefficient data of a plurality of sub-bands obtained by decomposing the image data in frequency bands to generate image data by extracting the concealment information from the encoded data, the concealment information having been multiplexed with the encoded data after the encoded data was generated and including flag information indicating whether or not a line block constituting a frame or a field is replaceable with a line block constituting another frame or another field; and performing, in increments of a line block, a process of concealing an error included in the encoded data in accordance with error concealment information indicated by obtained error concealment.

14. The information processing apparatus according to claim 1, wherein the comparison means compares the input image data with image data of a previous picture stored in a storage unit.

15. The information processing apparatus according to claim 2, wherein the header is 32 bits.

16. The information processing apparatus according to claim 2, wherein the header includes a picture ID and a replacement picture ID.

17. The information processing apparatus according to claim 1, wherein the concealment information indicates a precinct that can replace a precinct in which an error occurred.

18. An information processing apparatus that encodes image data, comprising:

circuitry configured to:

compare frames or fields constituting image data in increments of a line block including image data equivalent to a number of lines needed to generate coefficient data equivalent to one line of sub-bands of at least lowest frequency components, and compare, with respect to the image data, a difference value between frames or a difference value between fields with a threshold;

generate concealment information indicating a method of concealing an error in a line block in accordance with a comparison result, the concealment information includes flag information indicating whether or not a line block constituting a frame or a field is replaceable with a line block constituting another frame or another field;

generate encoded data by encoding, using an entropy coding system, coefficient data reordered in advance in the order in which the coefficient data is used in executing a combining process of combining coefficient data of a plurality of sub-bands decomposed in frequency bands to generate image data;

multiplex, after the encoded data is generated, the concealment information with the encoded data.

* * * * *